US010683171B2

(12) United States Patent
Jarvis et al.

(10) Patent No.: US 10,683,171 B2
(45) Date of Patent: Jun. 16, 2020

(54) HYBRID MODULAR STORAGE FETCHING SYSTEM

(71) Applicant: Staples, Inc., Framingham, MA (US)

(72) Inventors: Daniel Jarvis, Orlando, FL (US); Paolo Gerli Amador, Framingham, MA (US); Michael Bhaskaran, Seattle, WA (US); Amit Kalra, Acton, MA (US); Rodney Gallaway, Little Rock, AR (US); Vikranth Gopalakrishnan, Hoboken, NJ (US)

(73) Assignee: Staples, Inc., Framingham, MA (US)

( * ) Notice: Subject to any disclaimer, the term of this patent is extended or adjusted under 35 U.S.C. 154(b) by 25 days.

(21) Appl. No.: 15/863,017

(22) Filed: Jan. 5, 2018

(65) Prior Publication Data

US 2018/0127212 A1 May 10, 2018

Related U.S. Application Data

(63) Continuation-in-part of application No. 15/721,472, filed on Sep. 29, 2017.
(Continued)

(51) Int. Cl.
*B60P 1/00* (2006.01)
*B60P 1/02* (2006.01)
(Continued)

(52) U.S. Cl.
CPC ............... *B65G 1/1375* (2013.01); *B60P 1/00* (2013.01); *B60P 1/02* (2013.01); *B65G 1/0435* (2013.01);
(Continued)

(58) Field of Classification Search
None
See application file for complete search history.

(56) References Cited

U.S. PATENT DOCUMENTS

| 3,450,276 A | 6/1969 | Ferrari |
| 3,474,877 A | 10/1969 | Wesener |

(Continued)

FOREIGN PATENT DOCUMENTS

| CA | 1196712 A | 11/1985 |
| CA | 1210367 A | 8/1986 |

(Continued)

OTHER PUBLICATIONS

US 9,342,073 B2, 05/2016, Bernstein et al. (withdrawn)
(Continued)

*Primary Examiner* — Tuan C To
*Assistant Examiner* — Kelly D Williams
(74) *Attorney, Agent, or Firm* — Patent Law Works, LLP

(57) ABSTRACT

A hybrid modular storage fetching system is described. In an example implementation, an automated guided vehicle of the hybrid modular storage fetching system includes a drive unit that provides motive force to propel the automated guided vehicle within an operating environment. The automated guided vehicle may also include a container handling mechanism including an extender and a carrying surface, the container handling mechanism having three or more degrees of freedom to move the carrying surface along three or more axes. The container handling mechanism may retrieve an item from a first target shelving unit using the carrying surface and the three or more degrees of freedom and place the item on a second target shelving unit. The automated guided vehicle may also include a power source coupled to provide power to the drive unit and the container handling mechanism.

17 Claims, 25 Drawing Sheets

Related U.S. Application Data

(60) Provisional application No. 62/403,001, filed on Sep. 30, 2016, provisional application No. 62/442,891, filed on Jan. 5, 2017.

(51) Int. Cl.
*B65G 1/04* (2006.01)
*B65G 1/137* (2006.01)
*B66F 9/06* (2006.01)
*G05D 1/02* (2020.01)
*G06Q 10/08* (2012.01)

(52) U.S. Cl.
CPC ............. *B65G 1/0492* (2013.01); *B66F 9/06* (2013.01); *G05D 1/0225* (2013.01); *G05D 1/0234* (2013.01); *B65G 1/1378* (2013.01); *B65G 2209/06* (2013.01); *G05D 1/0274* (2013.01); *G05D 2201/0216* (2013.01); *G06Q 10/087* (2013.01)

(56) References Cited

U.S. PATENT DOCUMENTS

| | | |
|---|---|---|
| 3,563,327 A | 2/1971 | Mier |
| 3,628,624 A | 12/1971 | Wesener |
| 3,970,840 A | 7/1976 | De Bruine |
| 4,010,409 A | 3/1977 | Waites |
| 4,077,535 A | 3/1978 | Oriol |
| 4,215,759 A | 8/1980 | Diaz |
| 4,258,813 A | 3/1981 | Rubel |
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | MacKinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki |
| 4,773,018 A | 9/1988 | Lundstroem |
| 4,777,601 A | 10/1988 | Boegli |
| 4,780,817 A | 10/1988 | Lofgren |
| 4,790,402 A | 12/1988 | Kasper |
| 4,802,096 A | 1/1989 | Hainsworth |
| 4,811,227 A | 3/1989 | Wikstroem |
| 4,811,229 A | 3/1989 | Wilson |
| 4,817,000 A | 3/1989 | Eberhardt |
| 4,846,297 A | 7/1989 | Kasper |
| 4,847,769 A | 7/1989 | Reeve |
| 4,847,773 A | 7/1989 | Peteri |
| 4,847,774 A | 7/1989 | Tomikawa |
| 4,852,677 A | 8/1989 | Okazaki |
| 4,857,912 A | 8/1989 | Gilbreath |
| 4,858,132 A | 8/1989 | Holmquist |
| 4,862,047 A | 8/1989 | Hosoi |
| 4,863,335 A | 9/1989 | Herigstad |
| 4,875,172 A | 10/1989 | Kanayama |
| 4,890,233 A | 12/1989 | Hosoi |
| 4,918,607 A | 4/1990 | Wible |
| 4,924,153 A | 5/1990 | Toru |
| 4,926,544 A | 5/1990 | Takao |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth |
| 4,947,324 A | 8/1990 | Kamimura |
| 4,950,118 A | 8/1990 | Mueller |
| 4,954,962 A | 9/1990 | Weiman |
| 4,982,329 A | 1/1991 | Onishi |
| 4,990,841 A | 2/1991 | Elder |
| 4,993,507 A | 2/1991 | Ohkura |
| 4,994,970 A | 2/1991 | Noji |
| 4,996,468 A | 2/1991 | Kasper |
| 5,000,279 A | 3/1991 | Yamauchi |
| 5,002,145 A | 3/1991 | Tsukagoshi |
| 5,005,128 A | 4/1991 | Roberts |
| 5,006,988 A | 4/1991 | Koren |
| 5,020,620 A | 6/1991 | Field |
| 5,023,790 A | 6/1991 | Luke, Jr. |
| 5,040,116 A | 8/1991 | Weiman |
| 5,052,882 A | 10/1991 | Harding |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett, Jr. |
| 5,125,783 A | 6/1992 | Kawasoe |
| 5,134,353 A | 7/1992 | Kita et al. |
| 5,138,560 A | 8/1992 | Kugler |
| 5,154,249 A | 10/1992 | Yardley |
| 5,164,648 A | 11/1992 | Kita et al. |
| 5,170,351 A | 12/1992 | Nemoto |
| 5,170,352 A | 12/1992 | Sharma |
| 5,179,329 A | 1/1993 | Onishi |
| 5,187,664 A | 2/1993 | Whatcott |
| 5,191,528 A | 3/1993 | Whatcott |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada |
| 5,216,605 A | 6/1993 | Whatcott |
| 5,239,249 A | 8/1993 | Ono |
| 5,249,157 A | 9/1993 | Taylor |
| 5,281,901 A | 1/1994 | Yardley |
| 5,305,217 A | 4/1994 | Kita |
| 5,341,130 A | 8/1994 | Yardley |
| 5,387,853 A | 2/1995 | Ono |
| 5,488,277 A | 1/1996 | Onishi |
| 5,505,473 A | 4/1996 | Radcliffe |
| 5,510,984 A | 4/1996 | Markin |
| 5,525,884 A | 6/1996 | Ike |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Onishi |
| 5,650,703 A | 7/1997 | Forman |
| 5,669,748 A | 9/1997 | Knudsen, Jr. |
| 5,875,408 A | 2/1999 | Bendett |
| 5,877,962 A | 3/1999 | Radcliffe |
| 5,911,767 A | 6/1999 | Ilic |
| 5,923,270 A | 7/1999 | Rintanen |
| 5,961,559 A | 10/1999 | Moriyama |
| 6,049,745 A | 4/2000 | Douglas |
| 6,058,339 A | 5/2000 | Wakisaka |
| 6,092,010 A | 7/2000 | Drenth |
| 6,246,930 B1 | 6/2001 | Hori |
| 6,256,560 B1 | 7/2001 | Kim |
| 6,345,217 B1 | 2/2002 | Ko |
| 6,370,452 B1 | 4/2002 | Pfister |
| 6,377,888 B1 | 4/2002 | Olch |
| 6,459,966 B2 | 10/2002 | Nakano |
| 6,477,463 B2 | 11/2002 | Hamilton |
| 6,481,521 B2 | 11/2002 | Ooishi |
| 6,493,614 B1 | 12/2002 | Jung |
| 6,602,037 B2 | 8/2003 | Winkler |
| 6,615,108 B1 | 9/2003 | Peleg |
| 6,629,028 B2 | 9/2003 | Paromtchik |
| 6,654,647 B1 | 11/2003 | Kal |
| 6,694,216 B1 | 2/2004 | Fujiki |
| 6,721,638 B2 | 4/2004 | Zeitler |

(56) References Cited

U.S. PATENT DOCUMENTS

| | | |
|---|---|---|
| 6,748,292 B2 | 6/2004 | Mountz |
| 6,772,062 B2 | 8/2004 | Lasky |
| 6,882,910 B2 | 4/2005 | Jeong |
| 6,885,912 B2 | 4/2005 | Peleg |
| 6,895,301 B2 | 5/2005 | Mountz |
| 6,904,343 B2 | 6/2005 | Kang |
| 6,950,722 B2 | 9/2005 | Mountz |
| 6,971,464 B2 | 12/2005 | Marino |
| 7,050,891 B2 | 5/2006 | Chen |
| 7,110,855 B2 | 9/2006 | Leishman |
| 7,155,309 B2 | 12/2006 | Peleg |
| 7,305,287 B2 | 12/2007 | Park |
| 7,333,631 B2 | 2/2008 | Park |
| 7,349,759 B2 | 3/2008 | Peleg |
| 7,402,018 B2 | 7/2008 | Amsbury |
| 7,403,120 B2 | 7/2008 | Bridgelall |
| 7,437,226 B2 | 10/2008 | Shim |
| 7,460,016 B2 | 12/2008 | Clott |
| 7,500,448 B1 | 3/2009 | Melhorn |
| 7,505,849 B2 | 3/2009 | Saarikivi |
| 7,548,166 B2 | 6/2009 | Clott |
| 7,557,714 B2 | 7/2009 | Clott |
| 7,599,777 B2 | 10/2009 | Passeri |
| 7,609,175 B2 | 10/2009 | Bonnefoy |
| 7,613,617 B2 | 11/2009 | McElroy |
| 7,616,127 B2 | 11/2009 | Clott |
| 7,634,332 B2 | 12/2009 | McElroy |
| 7,639,142 B2 | 12/2009 | Clott |
| 7,648,329 B2 | 1/2010 | Stevenson |
| 7,656,296 B2 | 2/2010 | Runyon |
| 7,681,796 B2 | 3/2010 | Zimmerman |
| 7,689,001 B2 | 3/2010 | Sihn |
| 7,693,757 B2 | 4/2010 | Zimmerman |
| 7,765,027 B2 | 7/2010 | Hong |
| 7,826,919 B2 | 11/2010 | Dingle |
| 7,835,821 B2 | 11/2010 | Kim |
| 7,840,328 B2 | 11/2010 | Baginski |
| 7,845,560 B2 | 12/2010 | Emanuel |
| 7,850,413 B2 | 12/2010 | Fontana |
| 7,871,234 B2 | 1/2011 | Yuyama |
| 7,873,469 B2 | 1/2011 | D Andrea |
| 7,890,228 B2 | 2/2011 | Werner |
| 7,894,932 B2 | 2/2011 | Mountz |
| 7,894,933 B2 | 2/2011 | Mountz |
| 7,894,939 B2 | 2/2011 | Allen |
| 7,894,951 B2 | 2/2011 | Norris |
| 7,912,574 B2 | 3/2011 | D Andrea |
| 7,912,633 B1 | 3/2011 | Kennedy |
| 7,920,962 B2 | 4/2011 | D Andrea |
| 7,925,514 B2 | 4/2011 | McElroy |
| 7,953,551 B2 | 5/2011 | Park |
| 7,980,808 B2 | 7/2011 | Chilson |
| 7,991,521 B2 | 8/2011 | Stewart |
| 7,996,109 B2 | 8/2011 | Allen |
| 8,010,230 B2 | 8/2011 | Allen |
| 8,020,657 B2 | 9/2011 | Catalfano |
| 8,031,086 B2 | 10/2011 | Dickson |
| 8,068,978 B2 | 11/2011 | D Andrea |
| 8,072,309 B2 | 12/2011 | Duckworth |
| 8,075,243 B2 | 12/2011 | Stevenson |
| 8,146,702 B2 | 4/2012 | Emond |
| 8,160,728 B2 | 4/2012 | Curtis |
| 8,170,711 B2 | 5/2012 | Dingle |
| 8,192,137 B2 | 6/2012 | Chilson |
| 8,193,903 B2 | 6/2012 | Duckworth |
| 8,196,835 B2 | 6/2012 | Emanuel |
| 8,200,423 B2 | 6/2012 | Kennedy |
| 8,204,624 B2 | 6/2012 | Allen |
| 8,210,791 B2 | 7/2012 | Chilson |
| 8,220,710 B2 | 7/2012 | D Andrea |
| 8,229,619 B2 | 7/2012 | Shim |
| 8,239,291 B2 | 8/2012 | Verminski |
| 8,265,873 B2 | 9/2012 | D Andrea |
| 8,269,643 B2 | 9/2012 | Chou |
| 8,271,132 B2 | 9/2012 | Walton |
| 8,280,546 B2 | 10/2012 | Dingle |
| 8,280,547 B2 | 10/2012 | Dingle |
| 8,311,902 B2 | 11/2012 | Mountz |
| 8,369,981 B2 | 2/2013 | Spaulding |
| 8,381,982 B2 | 2/2013 | Emanuel |
| 8,406,949 B2 | 3/2013 | Kondo |
| 8,412,400 B2 | 4/2013 | D Andrea |
| 8,417,444 B2 | 4/2013 | Smid |
| 8,418,919 B1 | 4/2013 | Beyda |
| 8,425,173 B2 | 4/2013 | Lert |
| 8,433,442 B2 | 4/2013 | Friedman |
| 8,433,469 B2 | 4/2013 | Day |
| 8,444,369 B2 | 5/2013 | Bragg |
| 8,452,464 B2 | 5/2013 | Schloemer |
| 8,457,978 B2 | 6/2013 | McElroy |
| 8,473,140 B2 | 6/2013 | Norris |
| 8,483,869 B2 | 7/2013 | Wurman |
| 8,498,734 B2 | 7/2013 | Dunsker |
| 8,515,612 B2 | 8/2013 | Shitamoto |
| 8,538,692 B2 | 9/2013 | D Andrea |
| 8,571,781 B2 | 10/2013 | Bernstein |
| 8,577,551 B2 | 11/2013 | Corbett |
| 8,587,455 B2 | 11/2013 | Porte |
| 8,594,834 B1 | 11/2013 | Clark et al. |
| 8,594,835 B2 | 11/2013 | Toebes |
| 8,606,392 B2 | 12/2013 | D Andrea |
| 8,626,332 B2 | 1/2014 | Dunsker |
| 8,626,335 B2 | 1/2014 | Barbehenn |
| 8,639,382 B1 | 1/2014 | Clark |
| 8,649,899 B2 | 2/2014 | Wurman |
| 8,653,945 B2 | 2/2014 | Lee |
| 8,670,892 B2 | 3/2014 | Yang |
| 8,676,426 B1 | 3/2014 | Murphy |
| 8,700,502 B2 | 4/2014 | Mountz |
| 8,718,814 B1 | 5/2014 | Clark |
| 8,718,815 B2 | 5/2014 | Shimamura |
| 8,725,286 B2 | 5/2014 | Dingle |
| 8,725,317 B2 | 5/2014 | Elston |
| 8,725,362 B2 | 5/2014 | Jensen |
| 8,725,363 B2 | 5/2014 | Jensen |
| 8,731,777 B2 | 5/2014 | Schloemer |
| 8,740,538 B2 | 6/2014 | Lert |
| 8,751,063 B2 | 6/2014 | Wilson |
| 8,751,147 B2 | 6/2014 | Colwell |
| 8,755,936 B2 | 6/2014 | Friedman |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark |
| 8,798,786 B2 | 8/2014 | Chaitin |
| 8,798,840 B2 | 8/2014 | Fong |
| 8,805,573 B2 | 8/2014 | Brunner |
| 8,805,574 B2 | 8/2014 | Watt |
| 8,825,257 B2 | 9/2014 | Ozaki |
| 8,825,367 B2 | 9/2014 | Nagasawa |
| 8,831,984 B2 | 9/2014 | Santini |
| 8,862,397 B2 | 10/2014 | Kubota |
| 8,874,300 B2 | 10/2014 | Catalfano |
| 8,874,360 B2 | 10/2014 | Davis |
| 8,880,416 B2 | 11/2014 | McElroy |
| 8,886,385 B2 | 11/2014 | Moriguchi |
| 8,892,240 B1 | 11/2014 | Vliet et al. |
| 8,892,241 B2 | 11/2014 | Weiss |
| 8,909,368 B2 | 12/2014 | D Andrea |
| 8,930,133 B2 | 1/2015 | Barbehenn |
| 8,948,956 B2 | 2/2015 | Takahashi |
| 8,954,188 B2 | 2/2015 | Sullivan et al. |
| 8,965,561 B2 | 2/2015 | Jacobus |
| 8,965,562 B1 | 2/2015 | Wurman |
| 8,965,578 B2 | 2/2015 | Linda |
| 8,970,363 B2 | 3/2015 | Schumacher |
| 8,972,045 B1 | 3/2015 | Wurman |
| 8,983,647 B1 | 3/2015 | Casteel |
| 8,988,285 B2 | 3/2015 | Smid |
| 8,989,918 B2 | 3/2015 | Sturm |
| 9,002,506 B1 | 4/2015 | Shareef |
| 9,002,581 B2 | 4/2015 | Wellman |
| 9,008,827 B1 | 4/2015 | Casteel |
| 9,008,828 B2 | 4/2015 | Worsley |

(56) References Cited

U.S. PATENT DOCUMENTS

| | | |
|---|---|---|
| 9,008,829 B2 | 4/2015 | Worsley |
| 9,008,830 B2 | 4/2015 | Worsley |
| 9,009,072 B2 | 4/2015 | Durham |
| 9,014,902 B1 | 4/2015 | Murphy |
| 9,020,679 B2 | 4/2015 | Allen |
| 9,026,301 B2 | 5/2015 | Allen |
| 9,043,016 B2 | 5/2015 | Schmaltz |
| 9,046,893 B2 | 6/2015 | Douglas |
| 9,051,120 B2 | 6/2015 | Toebes |
| 9,052,714 B2 | 6/2015 | Creasey |
| 9,056,719 B2 | 6/2015 | Tanahashi |
| 9,067,317 B1 | 6/2015 | Wurman |
| 9,073,736 B1 | 7/2015 | Goyal |
| 9,082,293 B2 | 7/2015 | Wellman |
| 9,087,314 B2 | 7/2015 | D Andrea |
| 9,090,214 B2 | 7/2015 | Wilson |
| 9,090,400 B2 | 7/2015 | Barbehenn |
| 9,096,375 B2 | 8/2015 | Lert et al. |
| 9,098,080 B2 | 8/2015 | Norris et al. |
| 9,110,464 B2 | 8/2015 | Holland et al. |
| 9,111,251 B1 | 8/2015 | Brazeau |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B1 | 11/2015 | Dwarakanath et al. |
| 9,188,982 B2 | 11/2015 | Thomson |
| 9,193,404 B2 | 11/2015 | Bernstein et al. |
| 9,202,382 B2 | 12/2015 | Klinger et al. |
| 9,206,023 B2 | 12/2015 | Wong et al. |
| 9,207,673 B2 | 12/2015 | Pulskamp et al. |
| 9,207,676 B2 | 12/2015 | Wu et al. |
| 9,211,920 B1 | 12/2015 | Bernstein et al. |
| 9,213,934 B1 | 12/2015 | Versteeg et al. |
| 9,216,745 B2 | 12/2015 | Beardsley et al. |
| 9,218,003 B2 | 12/2015 | Fong et al. |
| 9,218,316 B2 | 12/2015 | Bernstein et al. |
| 9,242,799 B1 | 1/2016 | O'Brien et al. |
| 9,244,463 B2 | 1/2016 | Pfaff et al. |
| 9,248,973 B1 | 2/2016 | Brazeau |
| 9,260,244 B1 | 2/2016 | Cohn |
| 9,266,236 B2 | 2/2016 | Clark et al. |
| 9,268,334 B1 | 2/2016 | Vavrick |
| 9,274,526 B2 | 3/2016 | Murai et al. |
| 9,280,153 B1 | 3/2016 | Palamarchuk et al. |
| 9,280,157 B2 | 3/2016 | Wurman et al. |
| 9,286,590 B2 | 3/2016 | Segawa et al. |
| 9,290,220 B2 | 3/2016 | Bernstein et al. |
| 9,304,001 B2 | 4/2016 | Park et al. |
| 9,310,802 B1 | 4/2016 | Elkins et al. |
| 9,317,034 B2 | 4/2016 | Hoffman et al. |
| 9,329,078 B1 | 5/2016 | Mundhenke et al. |
| 9,329,599 B1 | 5/2016 | Sun et al. |
| 9,330,373 B2 | 5/2016 | Mountz et al. |
| 9,341,720 B2 | 5/2016 | Garin et al. |
| 9,342,811 B2 | 5/2016 | Mountz et al. |
| 9,346,619 B1 | 5/2016 | O'Brien et al. |
| 9,346,620 B2 | 5/2016 | Brunner et al. |
| 9,352,745 B1 | 5/2016 | Theobald |
| 9,355,065 B2 | 5/2016 | Donahue |
| 9,365,348 B1 | 6/2016 | Agarwal et al. |
| 9,367,827 B1 | 6/2016 | Lively et al. |
| 9,367,831 B1 | 6/2016 | Besehanic |
| 9,371,184 B1 | 6/2016 | Dingle et al. |
| 9,378,482 B1 | 6/2016 | Pikler et al. |
| 9,389,609 B1 | 7/2016 | Mountz et al. |
| 9,389,612 B2 | 7/2016 | Bernstein et al. |
| 9,389,614 B2 | 7/2016 | Shani |
| 9,394,016 B2 | 7/2016 | Bernstein et al. |
| 9,395,725 B2 | 7/2016 | Bernstein et al. |
| 9,404,756 B2 | 8/2016 | Fong et al. |
| 9,405,016 B2 | 8/2016 | Yim |
| 9,427,874 B1 | 8/2016 | Rublee |
| 9,429,940 B2 | 8/2016 | Bernstein et al. |
| 9,429,944 B2 | 8/2016 | Filippov et al. |
| 9,436,184 B2 | 9/2016 | D'Andrea et al. |
| 9,440,790 B2 | 9/2016 | Mountz et al. |
| 9,448,560 B2 | 9/2016 | D'Andrea et al. |
| 9,451,020 B2 | 9/2016 | Liu et al. |
| 9,452,883 B1 | 9/2016 | Wurman et al. |
| 9,457,730 B2 | 10/2016 | Bernstein et al. |
| 9,463,927 B1 | 10/2016 | Theobald |
| 9,469,477 B1 | 10/2016 | Palamarchuk et al. |
| 9,471,894 B2 | 10/2016 | Palamarchuk et al. |
| 9,481,410 B2 | 11/2016 | Bernstein et al. |
| 9,493,184 B2 | 11/2016 | Castaneda et al. |
| 9,493,303 B2 | 11/2016 | Wurman et al. |
| 9,495,656 B2 | 11/2016 | Adler et al. |
| 9,501,756 B2 | 11/2016 | Stevens et al. |
| 9,511,934 B2 | 12/2016 | Wurman et al. |
| 9,517,899 B2 | 12/2016 | Watt et al. |
| 9,519,284 B2 | 12/2016 | Wurman et al. |
| 9,519,880 B1 | 12/2016 | Cohn |
| 9,522,817 B2 | 12/2016 | Castaneda et al. |
| 9,523,582 B2 | 12/2016 | Chandrasekar et al. |
| 9,527,710 B1 | 12/2016 | Hussain et al. |
| 9,533,828 B1 | 1/2017 | Dwarakanath et al. |
| 9,536,767 B1 | 1/2017 | Adler et al. |
| 9,540,171 B2 | 1/2017 | Elazary et al. |
| 9,547,945 B2 | 1/2017 | McCabe et al. |
| 9,551,987 B1 | 1/2017 | Mountz et al. |
| 9,563,206 B2 | 2/2017 | Zini et al. |
| 9,568,917 B2 | 2/2017 | Jones et al. |
| 9,582,783 B2 | 2/2017 | Mountz et al. |
| 9,592,961 B2 | 3/2017 | Weiss |
| 9,645,968 B2 | 5/2017 | Elston et al. |
| 9,663,295 B1 | 5/2017 | Wurman et al. |
| 9,663,296 B1 | 5/2017 | Dingle et al. |
| 9,676,552 B2 | 6/2017 | Agarwal et al. |
| 9,679,270 B2 | 6/2017 | Zini et al. |
| 9,694,975 B2 | 7/2017 | Lert et al. |
| 9,694,976 B1 | 7/2017 | Wurman et al. |
| 9,725,239 B2 | 8/2017 | Lert et al. |
| 9,731,896 B2 | 8/2017 | Elazary et al. |
| 9,738,449 B1 | 8/2017 | Palamarchuk et al. |
| 9,740,212 B2 | 8/2017 | D'Andrea et al. |
| 9,766,620 B2 | 9/2017 | Bernstein et al. |
| 9,771,217 B2 | 9/2017 | Lert et al. |
| 9,783,364 B2 | 10/2017 | Worsley |
| 9,785,152 B2 | 10/2017 | Chandrasekar et al. |
| 9,792,577 B2 | 10/2017 | Mountz et al. |
| 9,802,762 B1 | 10/2017 | Pikler et al. |
| 9,836,046 B2 | 12/2017 | Wilson et al. |
| 9,841,758 B2 | 12/2017 | Bernstein et al. |
| 9,856,084 B1 | 1/2018 | Palamarchuk et al. |
| 9,873,561 B2 | 1/2018 | Agarwal et al. |
| 2001/0018637 A1 | 8/2001 | Hamilton |
| 2001/0027360 A1 | 10/2001 | Nakano |
| 2002/0021954 A1 | 2/2002 | Winkler |
| 2002/0027652 A1 | 3/2002 | Paromtchik et al. |
| 2002/0074172 A1 | 6/2002 | Sugiyama et al. |
| 2002/0165648 A1 | 11/2002 | Zeitler |
| 2003/0046021 A1 | 3/2003 | Lasky et al. |
| 2003/0106731 A1 | 6/2003 | Marino et al. |
| 2003/0208304 A1 | 11/2003 | Peless et al. |
| 2004/0006415 A1 | 1/2004 | Kang |
| 2004/0006416 A1 | 1/2004 | Jeong |
| 2004/0010337 A1 | 1/2004 | Mountz |
| 2004/0010339 A1 | 1/2004 | Mountz |
| 2004/0024489 A1 | 2/2004 | Fujiki et al. |
| 2004/0062419 A1 | 4/2004 | Roh et al. |
| 2004/0093116 A1 | 5/2004 | Mountz |
| 2004/0243278 A1 | 12/2004 | Leishman |
| 2005/0065655 A1 | 3/2005 | Hong et al. |
| 2005/0080524 A1 | 4/2005 | Park |
| 2005/0113990 A1 | 5/2005 | Peless et al. |
| 2005/0222722 A1 | 10/2005 | Chen |
| 2005/0228555 A1 | 10/2005 | Roh et al. |

(56) References Cited

U.S. PATENT DOCUMENTS

| | | |
|---|---|---|
| 2005/0244259 A1 | 11/2005 | Chilson et al. |
| 2006/0071790 A1 | 4/2006 | Duron |
| 2006/0149465 A1 | 7/2006 | Park et al. |
| 2006/0184013 A1 | 8/2006 | Emanuel et al. |
| 2006/0210382 A1 | 9/2006 | Mountz et al. |
| 2006/0245893 A1 | 11/2006 | Schottke |
| 2006/0255948 A1 | 11/2006 | Runyon et al. |
| 2006/0255949 A1 | 11/2006 | Roeder et al. |
| 2006/0255950 A1 | 11/2006 | Roeder et al. |
| 2006/0255951 A1 | 11/2006 | Roeder et al. |
| 2006/0255954 A1 | 11/2006 | Sorenson, Jr. et al. |
| 2006/0271274 A1 | 11/2006 | Saarikivi |
| 2006/0280585 A1 | 12/2006 | Passeri et al. |
| 2007/0017984 A1 | 1/2007 | Mountz et al. |
| 2007/0021863 A1 | 1/2007 | Mountz et al. |
| 2007/0021864 A1 | 1/2007 | Mountz et al. |
| 2007/0096922 A1 | 5/2007 | Sorenson, Jr. et al. |
| 2007/0112461 A1 | 5/2007 | Zini et al. |
| 2007/0112463 A1 | 5/2007 | Roh et al. |
| 2007/0123308 A1 | 5/2007 | Kim et al. |
| 2007/0129849 A1 | 6/2007 | Zini et al. |
| 2007/0136152 A1 | 6/2007 | Dunsker et al. |
| 2007/0150109 A1 | 6/2007 | Peless et al. |
| 2007/0152057 A1 | 7/2007 | Cato et al. |
| 2007/0152845 A1 | 7/2007 | Porte et al. |
| 2007/0179690 A1 | 8/2007 | Stewart |
| 2007/0193798 A1 | 8/2007 | Allard et al. |
| 2007/0198144 A1 | 8/2007 | Norris et al. |
| 2007/0198145 A1 | 8/2007 | Norris et al. |
| 2007/0198174 A1 | 8/2007 | Williams et al. |
| 2007/0198175 A1 | 8/2007 | Williams et al. |
| 2007/0198282 A1 | 8/2007 | Williams et al. |
| 2007/0208477 A1 | 9/2007 | Baginski et al. |
| 2007/0219666 A1 | 9/2007 | Filippov et al. |
| 2007/0269299 A1 | 11/2007 | Ross et al. |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0294029 A1 | 12/2007 | D'Andrea et al. |
| 2007/0297879 A1 | 12/2007 | Yuyama et al. |
| 2008/0001372 A1 | 1/2008 | Hoffman et al. |
| 2008/0051984 A1 | 2/2008 | Wurman et al. |
| 2008/0051985 A1 | 2/2008 | D'Andrea et al. |
| 2008/0071429 A1 | 3/2008 | Kraimer et al. |
| 2008/0077511 A1 | 3/2008 | Zimmerman |
| 2008/0129445 A1 | 6/2008 | Kraimer et al. |
| 2008/0157972 A1 | 7/2008 | Duron et al. |
| 2008/0166217 A1 | 7/2008 | Fontana |
| 2008/0167753 A1 | 7/2008 | Peless et al. |
| 2008/0167884 A1 | 7/2008 | Mountz et al. |
| 2008/0167933 A1 | 7/2008 | Hoffman et al. |
| 2008/0189005 A1 | 8/2008 | Chilson et al. |
| 2008/0199298 A1 | 8/2008 | Chilson et al. |
| 2009/0099716 A1 | 4/2009 | Roh et al. |
| 2009/0138151 A1 | 5/2009 | Smid et al. |
| 2009/0185884 A1 | 7/2009 | Wurman et al. |
| 2009/0198376 A1 | 8/2009 | Friedman et al. |
| 2009/0198381 A1 | 8/2009 | Friedman et al. |
| 2009/0234499 A1 | 9/2009 | Nielsen et al. |
| 2010/0039293 A1 | 2/2010 | Porte et al. |
| 2010/0114405 A1 | 5/2010 | Elston et al. |
| 2010/0127883 A1 | 5/2010 | Chou |
| 2010/0138095 A1 | 6/2010 | Redmann, Jr. et al. |
| 2010/0141483 A1 | 6/2010 | Thacher et al. |
| 2010/0145551 A1 | 6/2010 | Pulskamp et al. |
| 2010/0234990 A1 | 9/2010 | Zini et al. |
| 2010/0234991 A1 | 9/2010 | Zini et al. |
| 2010/0266381 A1 | 10/2010 | Chilson et al. |
| 2010/0300841 A1 | 12/2010 | O'Brien |
| 2010/0316468 A1 | 12/2010 | Lert et al. |
| 2010/0316469 A1 | 12/2010 | Lert et al. |
| 2010/0316470 A1 | 12/2010 | Lert et al. |
| 2010/0322746 A1 | 12/2010 | Lert et al. |
| 2010/0322747 A1 | 12/2010 | Lert et al. |
| 2011/0010023 A1 | 1/2011 | Kunzig et al. |
| 2011/0015779 A1 | 1/2011 | D'Andrea et al. |
| 2011/0046813 A1 | 2/2011 | Castaneda et al. |
| 2011/0056760 A1 | 3/2011 | Schendel et al. |
| 2011/0060449 A1 | 3/2011 | Wurman et al. |
| 2011/0066284 A1 | 3/2011 | Curtis |
| 2011/0071718 A1 | 3/2011 | Norris et al. |
| 2011/0103924 A1 | 5/2011 | Watt et al. |
| 2011/0112758 A1 | 5/2011 | D'Andrea et al. |
| 2011/0118903 A1 | 5/2011 | Kraimer et al. |
| 2011/0121068 A1 | 5/2011 | Emanuel et al. |
| 2011/0125312 A1 | 5/2011 | D'Andrea et al. |
| 2011/0130866 A1 | 6/2011 | D'Andrea et al. |
| 2011/0130954 A1 | 6/2011 | D'Andrea et al. |
| 2011/0137457 A1 | 6/2011 | Zini et al. |
| 2011/0153063 A1 | 6/2011 | Wurman et al. |
| 2011/0160949 A1 | 6/2011 | Kondo |
| 2011/0163160 A1 | 7/2011 | Zini et al. |
| 2011/0166721 A1 | 7/2011 | Castaneda et al. |
| 2011/0166737 A1 | 7/2011 | Tanaka et al. |
| 2011/0191135 A1 | 8/2011 | Williams et al. |
| 2011/0208745 A1 | 8/2011 | Dietsch et al. |
| 2011/0270438 A1 | 11/2011 | Shimamura |
| 2012/0038455 A1 | 2/2012 | Kraimer et al. |
| 2012/0041677 A1 | 2/2012 | D'Andrea et al. |
| 2012/0046820 A1 | 2/2012 | Allard et al. |
| 2012/0078471 A1 | 3/2012 | Siefring et al. |
| 2012/0139715 A1 | 6/2012 | Yamazato |
| 2012/0143427 A1 | 6/2012 | Hoffman et al. |
| 2012/0168240 A1 | 7/2012 | Wilson et al. |
| 2012/0168241 A1 | 7/2012 | Bernstein et al. |
| 2012/0173047 A1 | 7/2012 | Bernstein et al. |
| 2012/0173048 A1 | 7/2012 | Bernstein et al. |
| 2012/0173049 A1 | 7/2012 | Bernstein et al. |
| 2012/0173050 A1 | 7/2012 | Bernstein et al. |
| 2012/0176222 A1 | 7/2012 | Baek et al. |
| 2012/0176491 A1 | 7/2012 | Garin et al. |
| 2012/0197477 A1 | 8/2012 | Colwell |
| 2012/0232739 A1 | 9/2012 | Takahashi et al. |
| 2012/0239191 A1 | 9/2012 | Versteeg et al. |
| 2012/0239224 A1 | 9/2012 | McCabe et al. |
| 2012/0239238 A1 | 9/2012 | Harvey et al. |
| 2012/0255810 A1 | 10/2012 | Yang |
| 2012/0282070 A1 | 11/2012 | D'Andrea et al. |
| 2012/0321423 A1 | 12/2012 | MacKnight et al. |
| 2012/0323746 A1 | 12/2012 | Mountz et al. |
| 2012/0330458 A1 | 12/2012 | Weiss |
| 2012/0330492 A1 | 12/2012 | Douglas et al. |
| 2013/0006442 A1 | 1/2013 | Williams et al. |
| 2013/0054005 A1 | 2/2013 | Stevens et al. |
| 2013/0058743 A1 | 3/2013 | Rebstock |
| 2013/0103185 A1 | 4/2013 | Wurman et al. |
| 2013/0103552 A1 | 4/2013 | Hoffman et al. |
| 2013/0105570 A1 | 5/2013 | Dunsker et al. |
| 2013/0110279 A1 | 5/2013 | Dunsker et al. |
| 2013/0110281 A1 | 5/2013 | Jones et al. |
| 2013/0124013 A1 | 5/2013 | Elston et al. |
| 2013/0124014 A1 | 5/2013 | Elston et al. |
| 2013/0131895 A1 | 5/2013 | Elston et al. |
| 2013/0131910 A1 | 5/2013 | Takahashi et al. |
| 2013/0158773 A1 | 6/2013 | Wu et al. |
| 2013/0166108 A1 | 6/2013 | Sturm |
| 2013/0173049 A1 | 7/2013 | Brunner et al. |
| 2013/0173089 A1 | 7/2013 | Bernstein et al. |
| 2013/0190963 A1 | 7/2013 | Kuss et al. |
| 2013/0197720 A1 | 8/2013 | Kraimer et al. |
| 2013/0197760 A1 | 8/2013 | Castaneda et al. |
| 2013/0204429 A1 | 8/2013 | D'Andrea et al. |
| 2013/0204480 A1 | 8/2013 | D'Andrea et al. |
| 2013/0211626 A1 | 8/2013 | Nagasawa |
| 2013/0238170 A1 | 9/2013 | Klinger |
| 2013/0246229 A1 | 9/2013 | Mountz et al. |
| 2013/0251480 A1 | 9/2013 | Watt et al. |
| 2013/0275045 A1 | 10/2013 | Tsujimoto et al. |
| 2013/0282222 A1 | 10/2013 | Ozaki et al. |
| 2013/0297151 A1 | 11/2013 | Castaneda et al. |
| 2013/0302132 A1 | 11/2013 | D'Andrea et al. |
| 2013/0304253 A1 | 11/2013 | Wurman et al. |
| 2013/0325243 A1 | 12/2013 | Lipkowski et al. |
| 2013/0338874 A1 | 12/2013 | Donahue |

(56) References Cited

U.S. PATENT DOCUMENTS

| | | |
|---|---|---|
| 2013/0338885 A1 | 12/2013 | Kirk et al. |
| 2013/0338886 A1 | 12/2013 | Callea et al. |
| 2014/0005933 A1 | 1/2014 | Fong et al. |
| 2014/0020964 A1 | 1/2014 | Bernstein et al. |
| 2014/0032035 A1 | 1/2014 | Thomson |
| 2014/0067184 A1 | 3/2014 | Murphy |
| 2014/0072392 A1 | 3/2014 | Tanahashi |
| 2014/0081505 A1 | 3/2014 | Klinger et al. |
| 2014/0088758 A1 | 3/2014 | Lert et al. |
| 2014/0100690 A1 | 4/2014 | Wurman et al. |
| 2014/0100715 A1 | 4/2014 | Mountz et al. |
| 2014/0100998 A1 | 4/2014 | Mountz et al. |
| 2014/0100999 A1 | 4/2014 | Mountz et al. |
| 2014/0107833 A1 | 4/2014 | Segawa et al. |
| 2014/0124462 A1 | 5/2014 | Yamashita |
| 2014/0135977 A1 | 5/2014 | Wurman et al. |
| 2014/0172223 A1 | 6/2014 | Murphy |
| 2014/0188671 A1 | 7/2014 | Mountz et al. |
| 2014/0195040 A1 | 7/2014 | Wurman et al. |
| 2014/0195121 A1 | 7/2014 | Castaneda et al. |
| 2014/0214195 A1 | 7/2014 | Worsley |
| 2014/0214196 A1 | 7/2014 | Worsley |
| 2014/0214234 A1 | 7/2014 | Worsley |
| 2014/0228999 A1 | 8/2014 | D'Andrea et al. |
| 2014/0236393 A1 | 8/2014 | Bernstein et al. |
| 2014/0236413 A1 | 8/2014 | D'Andrea et al. |
| 2014/0238762 A1 | 8/2014 | Berberian et al. |
| 2014/0244097 A1 | 8/2014 | Colwell |
| 2014/0271063 A1 | 9/2014 | Lert et al. |
| 2014/0277691 A1 | 9/2014 | Jacobus et al. |
| 2014/0297093 A1 | 10/2014 | Murai et al. |
| 2014/0303773 A1 | 10/2014 | Wurman et al. |
| 2014/0330425 A1 | 11/2014 | Stevens et al. |
| 2014/0330426 A1 | 11/2014 | Brunner et al. |
| 2014/0343714 A1 | 11/2014 | Clark et al. |
| 2014/0343758 A1 | 11/2014 | Kraimer et al. |
| 2014/0345957 A1 | 11/2014 | Bernstein et al. |
| 2014/0350768 A1 | 11/2014 | Filippov et al. |
| 2014/0350831 A1 | 11/2014 | Hoffman et al. |
| 2014/0371973 A1 | 12/2014 | Pfaff et al. |
| 2015/0012209 A1 | 1/2015 | Park et al. |
| 2015/0019043 A1 | 1/2015 | Creasey et al. |
| 2015/0022400 A1 | 1/2015 | Smid et al. |
| 2015/0025713 A1 | 1/2015 | Klinger et al. |
| 2015/0057843 A1 | 2/2015 | Kraimer et al. |
| 2015/0066283 A1 | 3/2015 | Wurman et al. |
| 2015/0073586 A1 | 3/2015 | Weiss |
| 2015/0073589 A1 | 3/2015 | Khodl et al. |
| 2015/0088302 A1 | 3/2015 | Mountz et al. |
| 2015/0117995 A1 | 4/2015 | D'Andrea et al. |
| 2015/0142168 A1 | 5/2015 | Holland et al. |
| 2015/0151912 A1 | 6/2015 | Mountz et al. |
| 2015/0183581 A1 | 7/2015 | Worsley |
| 2015/0224941 A1 | 8/2015 | Bernstein et al. |
| 2015/0226560 A1 | 8/2015 | Chandrasekar et al. |
| 2015/0226561 A1 | 8/2015 | Chandrasekar et al. |
| 2015/0227862 A1 | 8/2015 | Chandrasekar et al. |
| 2015/0227885 A1 | 8/2015 | Zini et al. |
| 2015/0234386 A1 | 8/2015 | Zini et al. |
| 2015/0261223 A1 | 9/2015 | Fong et al. |
| 2015/0266672 A1 | 9/2015 | Lert et al. |
| 2015/0284010 A1 | 10/2015 | Beardsley et al. |
| 2015/0286218 A1 | 10/2015 | Shani |
| 2015/0301532 A1 | 10/2015 | Norris et al. |
| 2015/0307278 A1 | 10/2015 | Wickham et al. |
| 2015/0344085 A1 | 12/2015 | Bernstein et al. |
| 2015/0355639 A1 | 12/2015 | Versteeg et al. |
| 2015/0362919 A1 | 12/2015 | Bernstein et al. |
| 2015/0370257 A1 | 12/2015 | Bernstein et al. |
| 2015/0371181 A1 | 12/2015 | Palamarchuk et al. |
| 2016/0004253 A1 | 1/2016 | Bernstein et al. |
| 2016/0021178 A1 | 1/2016 | Liu et al. |
| 2016/0033967 A1 | 2/2016 | Bernstein et al. |
| 2016/0033971 A1 | 2/2016 | Thomson |
| 2016/0042314 A1 | 2/2016 | Mountz et al. |
| 2016/0048130 A1 | 2/2016 | Vavrick |
| 2016/0054734 A1 | 2/2016 | Bernstein et al. |
| 2016/0069691 A1 | 3/2016 | Fong |
| 2016/0090133 A1 | 3/2016 | Bernstein et al. |
| 2016/0097862 A1 | 4/2016 | Yim |
| 2016/0101741 A1 | 4/2016 | Bernstein et al. |
| 2016/0101937 A1 | 4/2016 | Adler et al. |
| 2016/0103014 A1 | 4/2016 | Mundhenke et al. |
| 2016/0117936 A1 | 4/2016 | Klinger et al. |
| 2016/0147231 A1 | 5/2016 | Sun et al. |
| 2016/0171441 A1 | 6/2016 | Lively et al. |
| 2016/0176637 A1 | 6/2016 | Ackerman et al. |
| 2016/0185526 A1 | 6/2016 | Lert et al. |
| 2016/0187886 A1 | 6/2016 | Jones et al. |
| 2016/0202696 A1 | 7/2016 | Bernstein et al. |
| 2016/0203543 A1 | 7/2016 | Snow |
| 2016/0232477 A1 | 8/2016 | Cortes et al. |
| 2016/0232490 A1 | 8/2016 | Mountz et al. |
| 2016/0246299 A1 | 8/2016 | Berberian et al. |
| 2016/0264357 A1 | 9/2016 | Agarwal et al. |
| 2016/0282871 A1 | 9/2016 | Bernstein et al. |
| 2016/0291591 A1 | 10/2016 | Bernstein et al. |
| 2016/0304280 A1 | 10/2016 | Elazary et al. |
| 2016/0304281 A1 | 10/2016 | Elazary et al. |
| 2016/0334799 A1 | 11/2016 | D'Andrea et al. |
| 2016/0339587 A1 | 11/2016 | Rublee |
| 2016/0347545 A1* | 12/2016 | Lindbo ............... B65G 61/00 |
| 2016/0349748 A1 | 12/2016 | Bernstein et al. |
| 2016/0379161 A1 | 12/2016 | Adler et al. |
| 2017/0011336 A1 | 1/2017 | Stevens et al. |
| 2017/0022010 A1 | 1/2017 | D'Andrea et al. |
| 2017/0038770 A1 | 2/2017 | Wurman et al. |
| 2017/0043953 A1 | 2/2017 | Battles et al. |
| 2017/0052033 A1 | 2/2017 | Fong et al. |
| 2017/0057798 A1 | 3/2017 | Dues et al. |
| 2017/0060138 A1 | 3/2017 | Chandrasekar et al. |
| 2017/0080352 A1 | 3/2017 | Bernstein et al. |
| 2017/0174431 A1* | 6/2017 | Borders ............... B65G 65/00 |
| 2017/0183005 A1 | 6/2017 | Elston et al. |
| 2017/0183159 A1 | 6/2017 | Weiss |
| 2017/0269608 A1 | 9/2017 | Chandrasekar et al. |
| 2017/0286908 A1 | 10/2017 | Lively et al. |
| 2017/0313517 A1 | 11/2017 | Agarwal et al. |
| 2017/0362032 A1 | 12/2017 | Sullivan et al. |
| 2018/0016098 A1 | 1/2018 | Lert et al. |

FOREIGN PATENT DOCUMENTS

| | | |
|---|---|---|
| CA | 1228142 A | 10/1987 |
| CA | 1238103 A | 6/1988 |
| CA | 1264490 A | 1/1990 |
| CA | 1267866 A | 4/1990 |
| CA | 1269740 A | 5/1990 |
| CA | 1271544 A | 7/1990 |
| CA | 1275721 C | 10/1990 |
| CA | 1276264 C | 11/1990 |
| CA | 2029773 A1 | 5/1991 |
| CA | 1291725 C | 11/1991 |
| CA | 2036104 A1 | 11/1991 |
| CA | 2042133 A1 | 1/1992 |
| CA | 2049578 A1 | 2/1992 |
| CA | 2296837 A1 | 2/1992 |
| CA | 2094833 A1 | 4/1992 |
| CA | 1304043 C | 6/1992 |
| CA | 2095442 A1 | 6/1992 |
| CA | 1304820 C | 7/1992 |
| CA | 1323084 C | 10/1993 |
| CA | 2189853 A1 | 11/1995 |
| CA | 2244668 A1 | 3/1999 |
| CA | 2469652 A1 | 6/2003 |
| CA | 2514523 A1 | 8/2004 |
| CA | 2565553 A1 | 11/2005 |
| CA | 2577346 A1 | 4/2006 |
| CA | 2613180 A1 | 1/2007 |
| CA | 2921584 A1 | 1/2007 |
| CA | 2625885 A1 | 4/2007 |
| CA | 2625895 A1 | 4/2007 |
| CA | 2837477 A1 | 4/2007 |
| CA | 2864027 A1 | 4/2007 |

(56) References Cited

FOREIGN PATENT DOCUMENTS

| | | |
|---|---|---|
| CA | 2636233 A1 | 7/2007 |
| CA | 2640769 A1 | 8/2007 |
| CA | 2652114 A1 | 12/2007 |
| CA | 2654258 A1 | 12/2007 |
| CA | 2654260 A1 | 12/2007 |
| CA | 2654263 A1 | 12/2007 |
| CA | 2654295 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781624 A1 | 12/2007 |
| CA | 2781857 A1 | 12/2007 |
| CA | 2838044 A1 | 12/2007 |
| CA | 2866664 A1 | 12/2007 |
| CA | 2921134 A1 | 12/2007 |
| CA | 2663578 A1 | 4/2008 |
| CA | 2860745 A1 | 4/2008 |
| CA | 2671955 A1 | 7/2008 |
| CA | 2673025 A1 | 7/2008 |
| CA | 2674241 A1 | 7/2008 |
| CA | 2691710 A1 | 12/2008 |
| CA | 2721345 A1 | 10/2009 |
| CA | 2760127 A1 | 11/2009 |
| CA | 2760225 A1 | 11/2009 |
| CA | 2743706 A1 | 6/2010 |
| CA | 2754626 A1 | 9/2010 |
| CA | 2765565 A1 | 1/2011 |
| CA | 2932535 A1 | 1/2011 |
| CA | 2932537 A1 | 1/2011 |
| CA | 2770139 A1 | 2/2011 |
| CA | 2773963 A1 | 3/2011 |
| CA | 2778111 A1 | 5/2011 |
| CA | 2784874 A1 | 7/2011 |
| CA | 2868578 A1 | 7/2011 |
| CA | 2806852 A1 | 2/2012 |
| CA | 2823715 A1 | 7/2012 |
| CA | 2827281 A1 | 8/2012 |
| CA | 2827735 A1 | 8/2012 |
| CA | 2770715 A1 | 9/2012 |
| CA | 2770918 A1 | 9/2012 |
| CA | 2831832 A1 | 10/2012 |
| CA | 2836933 A1 | 12/2012 |
| CA | 2851774 A1 | 4/2013 |
| CA | 2799871 A1 | 6/2013 |
| CA | 2866708 A1 | 9/2013 |
| CA | 2938894 A1 | 9/2013 |
| CA | 2813874 A1 | 12/2013 |
| CA | 2824189 A1 | 2/2014 |
| CA | 2870381 A1 | 4/2014 |
| CA | 2935223 A1 | 4/2014 |
| CA | 2894546 A1 | 6/2014 |
| CA | 2845229 A1 | 9/2014 |
| CA | 2899553 A1 | 10/2014 |
| CA | 2882452 A1 | 8/2015 |
| CA | 2886121 A1 | 10/2015 |
| WO | 2012154872 A2 | 11/2012 |
| WO | 2016015000 A2 | 1/2016 |

OTHER PUBLICATIONS

US 9,791,858 B2, 10/2017, Wilson et al. (withdrawn)
International Search Report and Written Opinion, PCT/US2017/054627, dated Jan. 5, 2018 (15 pages).
International Search Report and Written Opinion, PCT/US2018/012645, dated Mar. 7, 2018 (13 pages).
International Search Report and Written Opinion, PCT/US2018/012641, dated Mar. 7, 2018 (17 pages).
US 7,460,017, 12/2008, (withdrawn).
US 9,050,932, 06/2015, (withdrawn).
"Warehouse Robots at Work", IEEE Spectrum,. Jul. 21, 2008, YouTube https://www.youtube.com/watch?v=IWsMdN7HMuA.

\* cited by examiner

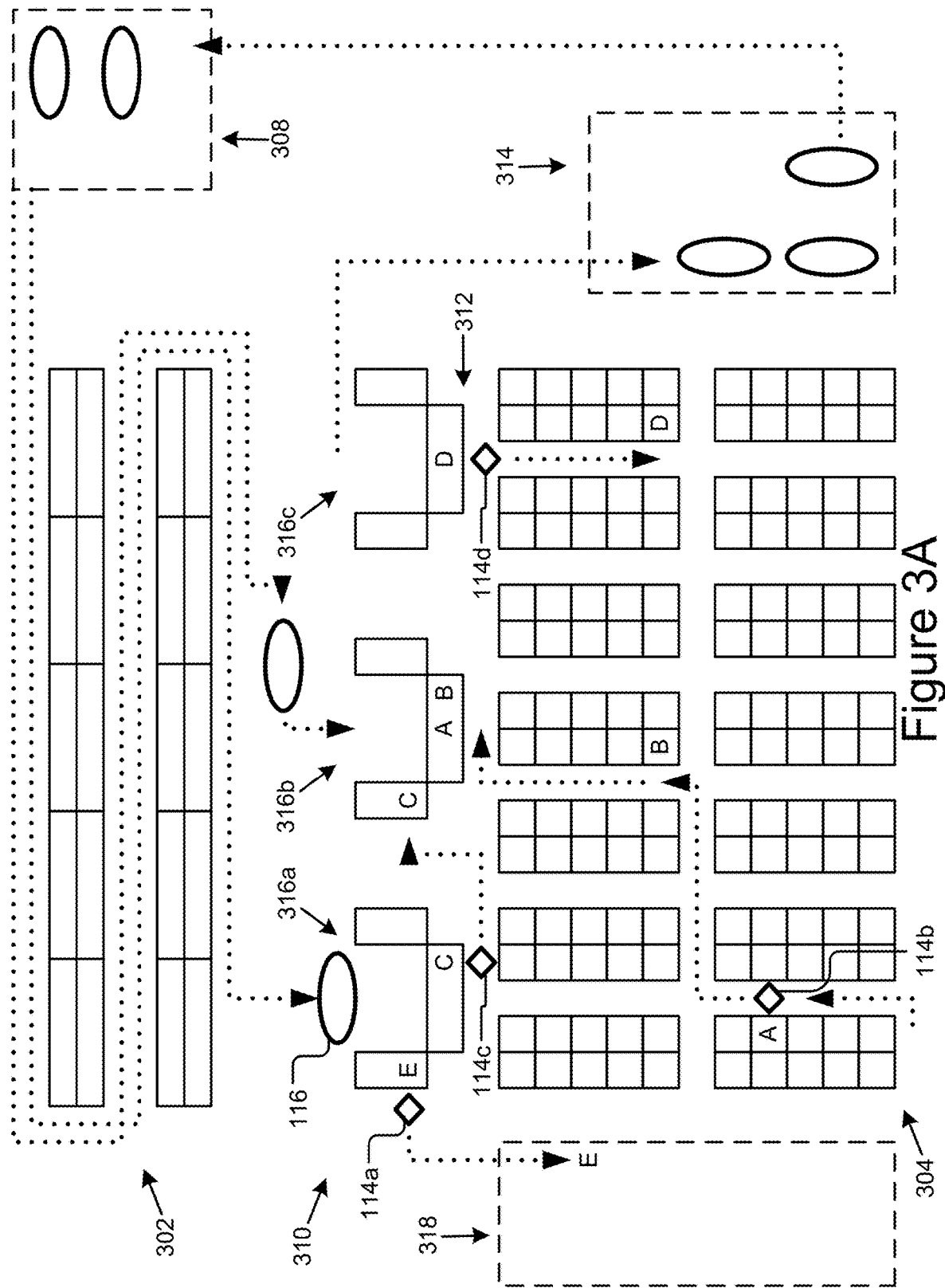

HYBRID MODULAR STORAGE FETCHING SYSTEM

CROSS-REFERENCE TO RELATED APPLICATION

This application is a continuation-in-part of U.S. application Ser. No. 15/721,472, entitled "Hybrid Modular Storage Fetching System," filed Sep. 29, 2017, which claims the benefit under 35 U.S.C. § 119(e) of U.S. Provisional Application No. 62/403,001, entitled "Modular Storage Fetching System (MSFS)," filed on Sep. 30, 2016, the entire contents of each of which are incorporated herein by reference. This application also claims the benefit under 35 U.S.C. § 119(e) of U.S. Provisional Application No. 62/442,891, entitled "Modular Storage Fetching System (MSFS)," filed on Jan. 5, 2017, the entire contents of which are incorporated herein by reference.

BACKGROUND

This application relates to inventory management systems (e.g., order distribution or fulfillment systems). For example, this application relates to automated guided vehicles used in inventory management systems.

Some current inventory management systems use drag-along carts on which human agents (pickers) place items they select (pick) to fulfill orders. In a zone-less pick-to-cart system, an agent drags his/her cart from location to location as instructed by the computer system of the facility. The cart can accommodate multiple orders and typically is equipped with dedicated cartons that are keyed to the orders being fulfilled by the agent during that cart load. In some cases, the agent wears a headset and/or is provided a terminal, such as a mobile computing device, via which the agent is provided ordered, item-by-item instructions on which items to pick. As the agent walks around the facility among the different fixed shelving units, he/she drags or pushes his/her cart manually. During a given shift, the agent may end up considerably fatigued from having to propel the cart around the warehouse.

Further, some current inventory management systems divide inventory into a series of zones and assign a human agent to a zone. The systems may use a conveyor belt to move orders across the zones as controlled by the computer system of the facility. In some cases, the agent wears a headset and/or is provided a terminal, such as a mobile computing device, via which the agent is provided ordered, item-by-item instructions on which items to pick. In some cases, pick-to-light systems use light displays to direct operators to product locations. Each product location may have a numeric or alphanumeric display with a light, an acknowledgement button, and a digital readout for indicating quantity.

Further, some current inventory management or distribution systems use a "goods-to-person" approach where the items to be picked by a human agent are brought to a predetermined location to eliminate the amount of walking the human agent must do within a facility and/or expedite the picking of the items by the picker. Once picked, these items are packaged and dispatched.

While these systems may, in certain use cases, adequately maneuver the items to the stations at which they are to be picked, they are less effective for high-volume and/or high-velocity goods because they have to continually return the same goods to the picking stations during the course of a day.

Some current inventory management or distribution systems use a "goods-to-person" approach using robots to retrieve items to be picked from storage. For example, in these systems, robots may retrieve entire shelving units from storage and bring them to agents, who pick items from the shelving units. However, these robots bring many more items in the shelving units to the agents than are actually picked by the agents. Further, each robot can only retrieve items in a single shelving unit at a time because they bring entire shelving units to the agents.

Some current inventory management or distribution systems use forklifts to move pallets of items, however these systems are often not practical when fulfilling small orders, because small orders may include, for instance, only a few items while a pallet may include tens or hundreds of items. Further, traditional forklifts are not able to navigate through narrow aisles to retrieve items on shelves in those aisles, because traditional forklifts require substantial space to turn to face a shelving unit to retrieve a pallet.

SUMMARY

An automated guided vehicle (AGV) system can be configured to perform particular operations or actions by virtue of having software, firmware, hardware, or a combination of them installed on the system that in operation causes or cause the system to perform the actions. One general aspect of the AGV includes a drive unit that provides motive force to propel the AGV within an operating environment; a container handling mechanism (CHM) including an extender and a carrying surface, the CHM having three or more degrees of freedom to move the carrying surface along three or more axes, the CHM retrieving an item from a first target shelving unit using the carrying surface and the three or more degrees of freedom and placing the item on a second target shelving unit; and a power source coupled to provide power to the drive unit and the CHM.

Implementations of the AGV may include one or more of the following features. The AGV further including: an item storage rack positioned proximate the CHM, the item storage rack including a plurality of shelves, at least one shelf of the plurality of shelves capable of storing the item during transit of the AGV, the CHM being capable of moving the item between the first target shelving unit, one or more of the shelves from the plurality of shelves of the item storage rack, and the second target shelving unit. The AGV further including: an item storage rack including a plurality of shelves that are vertically arranged on the item storage rack, a first shelf of the plurality of shelves having an adjustable height on the item storage rack, and one or more controllers that determine a current height of the first shelf of the plurality of shelves, and instruct the CHM to place the item on the first shelf of the plurality of shelves at the current height. The AGV where the extender of the CHM includes: a mast; and an extendible arm connecting the carrying surface to the mast, the mast moving the carrying surface vertically, via the extendible arm. The AGV where the item includes a modular container or modular storage unit having a coupling portion, and the carrying surface is compatibly engageable with the coupling portion of the modular carton to lift the modular container from the first target shelving unit, retain the modular container during handling, and place the modular container on the second target shelving unit. The AGV further including: one or more controllers communicatively coupled to the CHM and the drive unit, the one or more controllers signaling the CHM to retrieve the item from the first target shelving unit, signaling the drive unit to propel the AGV from a first location to a second location in the operating environment, the first target shelving unit being located at the first location and the second target shelving unit being located at the second location, and signaling the CHM to place the item on the second target shelving unit. The AGV where the one or more controllers determine a current location of the item within the operating environment, the current location indicating a current placement of the first target shelving unit within the operating environment, and instruct the drive unit to position the CHM adjacent to the first target shelving unit using the current location. The AGV where: the AGV has a front, a rear opposing the front, a left side extending from the front to the rear, and a right side opposing the left side and extending from the front to the rear, the second target shelving unit includes an item storage rack mounted to the AGV, and while the AGV is positioned such that the left side or right side faces a face of the first target shelving unit, one or more controllers instruct the CHM to engage, by the extender, the carrying surface with the item on a first target shelf of the first target shelving unit, lift the item off the first target shelf by the carrying surface and the extender, move the item, by the carrying surface and the extender, from the first target shelf to a second target shelf of the item storage rack, set the item on the second target shelf by the carrying surface and the extender, and disengage, by the extender, the carrying surface from the item. The AGV further including: a guidance system that determines a location of the AGV within the operating environment, the guidance system including one or more sensors that detect and process navigation markers to locate the AGV as the AGV traverses the operating environment. The AGV further including: an optical scanner coupled to the CHM that scans a shelf marker on one or more of the first target shelving unit and the second target shelving unit, the shelf marker indicating a position of the one or more of the first target shelving unit and the second target shelving unit.

Another general aspect includes a method including: navigating an AGV in an operating environment to a location proximate a storage shelving unit having a storage shelf supporting an item; extending a carrying surface of a CHM of the AGV along a second axis relative to a forward direction of travel of the AGV, the CHM having three degrees of freedom corresponding to three axes of movement relative to a housing of the AGV, a first axis of the three axes extending along the forward direction of travel, the second axis of the three axes extending along a horizontal direction perpendicular to the first axis, and a third axis of the three axes extending along a vertical direction perpendicular to both the first axis and the second axis; lifting the carrying surface to lift the item along at least the third axis from the storage shelf, the carrying surface supporting the item; retracting the carrying surface along at least the second axis from the storage shelf; raising the carrying surface along at least the third axis to situate the item proximate to an AGV shelf included on the AGV; moving the carrying surface along at least the first axis until the item is positioned above the AGV shelf; and lowering the carrying surface along at least the third axis to place the item on the AGV shelf.

Implementations of the method may include one or more of the following features. The method further including: determining, by a guidance system, a location of the AGV within the operating environment, the guidance system including one or more sensors that detect and process navigation markers to locate the AGV as the AGV traverses the operating environment; and navigating, using the guidance system, the AGV from the location to a different location in the operating environment using the guidance system. The method further including: determining a location of the storage shelf by scanning a shelf marker on the storage shelf by an optical scanner coupled to the CHM. The method where the AGV includes a storage rack including a plurality of AGV shelves, the plurality of AGV shelves including the AGV shelf. The method further including: extending the carrying surface along the second axis toward a second storage shelf of a second storage unit, the second storage shelf supporting a second item; lifting the carrying surface to lift the second item along at least the third axis from the second storage shelf, the carrying surface supporting the second item; retracting the carrying surface along at least the second axis from the second storage shelf; raising the carrying surface along at least the third axis to situate the second item proximate to a second AGV shelf of the plurality of AGV shelves of the storage rack; moving the carrying surface along at least the first axis until the second item is positioned above the second AGV shelf; and lowering the carrying surface along at least the third axis to place the second item on the second AGV shelf. The method further including: adjusting a height of the AGV shelf to accommodate a height of the item. The method further including navigating the AGV to a different location within the operating environment, the different location within the operating environment including a pick-cell station, the pick-cell station receiving items from a plurality of AGVs; and issuing instructions to a picker at the pick-cell station to place the item in a given carton with one or more other items.

Another general aspect includes a system including: An item handling and storage mechanism for an AGV, including: an item storage rack mountable to a frame of the AGV, the item storage rack including a plurality of shelves, each shelf of the plurality of shelves capable of storing an item; an extender mountable at a proximal end to the frame of an AGV proximate to the item storage rack, the extender having three or more degrees of freedom; and a carrying surface connected at a distal end of the extender, the carrying surface being movable by the extender vertically parallel relative to a face of the item storage rack, perpendicularly relative to the face of the item storage rack, and horizontally parallel relative to the face of the item storage rack, the carrying surface being extendable by the extender using the three or more degrees of freedom to retrieve a certain item from a separate shelving unit located within reaching distance of the extender and retractable using the three or more degrees of freedom to place the certain item on one of the shelves of the item storage rack.

Implementations of the item handling and storage mechanism may include one or more of the following features. The item handling and storage mechanism for AGV further including an optical scanner coupled to the extender that scans a shelf marker on the separate shelving unit, the shelf marker indicating a position of a shelf of the separate shelving unit. The item handling and storage mechanism for AGV where: the item includes a modular container having a coupling portion, and the carrying surface is compatibly engageable with the coupling portion of the modular container to lift the modular container from the separate shelving unit, retain the modular container during handling, and place the modular container on the one of the shelves of the item storage rack.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 3A is a schematic of an example configuration of a distribution facility layout in a hybrid modular storage fetching system.

DESCRIPTION

Figure 1:
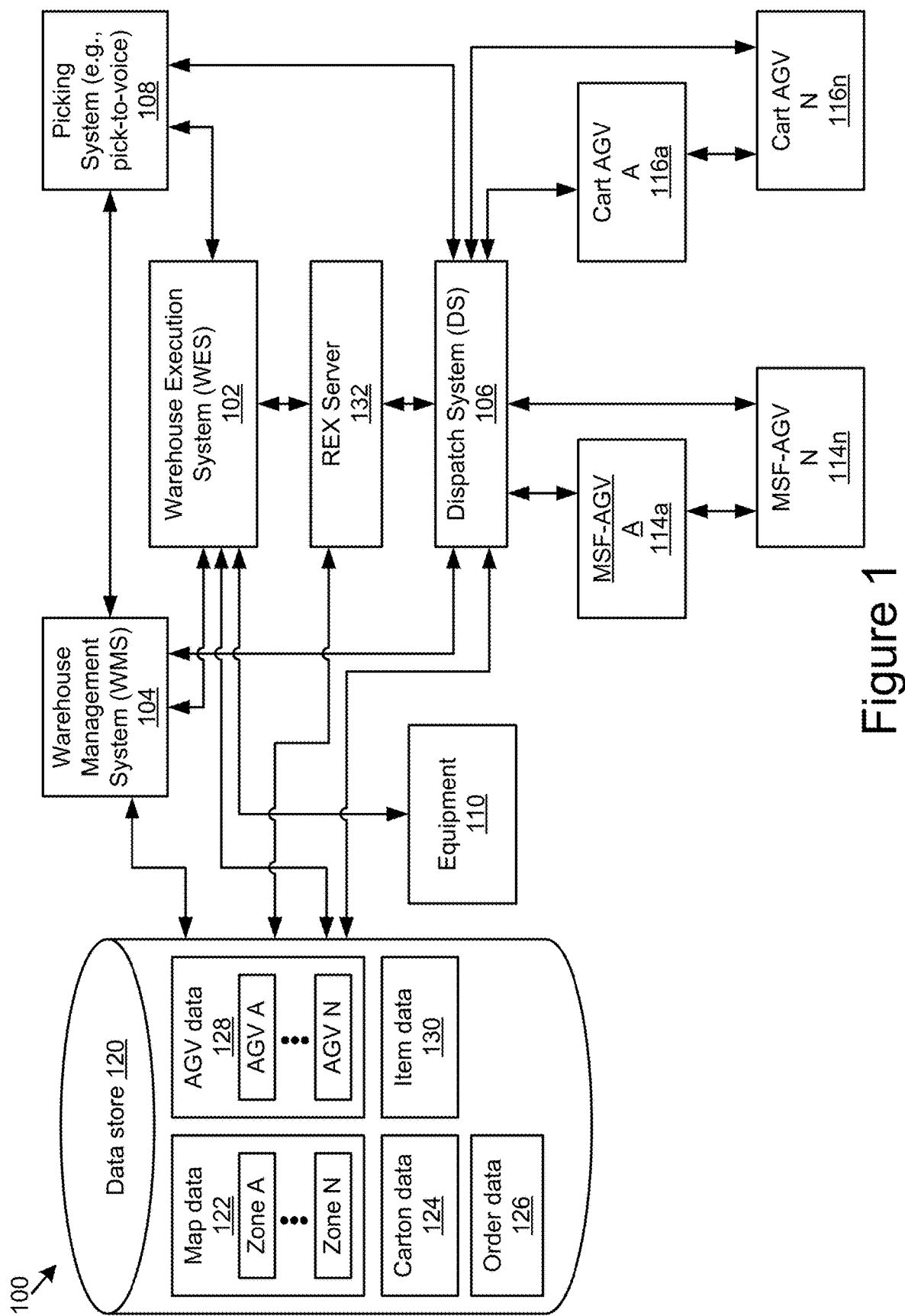
FIG. 1 is a block diagram of an example system and data communication flow for a hybrid modular storage fetching system.

Among other benefits, the technology described herein improves upon that described in the Background Section. For instance, the technology provides robotic devices, systems, methods, and other aspects that can more efficiently process goods (e.g., items or items in a distribution facility) based on demand. Further, the technology can reduce the amount of irrelevant items carried simultaneously with relevant items by providing automated guided vehicle(s) (AGV(s)) that are configured to efficiently carry items.

The technology described herein includes example AGVs that efficiently carry items. In some implementations, a cart AGV may autonomously transport a cart loaded with cartons into which items may be picked in a pick-to-cart area. The use of the cart AGV is beneficial, for example, for high velocity items (e.g., having a threshold frequency of being picked) by allowing the cartons, into which the high velocity items are to be placed, to travel to the locations of the items.

In some implementations, a picking AGV may autonomously retrieve items from storage and transport them to a picker, for example, at a pick-cell station. A picking AGV may autonomously retrieve items from shelving units in a high density storage area, transport them (e.g., on a shelf of the picking AGV) to a picker, and, in some instances, place the items on shelves at a pick-cell station for access by the picker. The technologies described in reference to the picking AGV are beneficial over the previous solutions described in the Background Section at least because they allow the picking AGV to retrieve individual items or containers of items from shelving units in a high density storage area rather than having to retrieve entire shelving units.

Features of the technology described herein can be integrated into any logistics system, dispatch system 106, warehouse execution system 102, warehouse management system 104, a robot execution server 132, etc., to coordinate the provision of to-be-picked items in a hybrid modular storage fetching system. This technology beneficially improves productivity and throughput, increases asset utilization, and lowers cycle time and labor costs. These benefits, in turn, lead to shorter delivery times and result in significant savings and business value.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 depicts an example system 100 and data communication flow for implementing a hybrid modular storage fetching system. The system 100 includes a warehouse execution system (WES) 102. The WES 102 is coupled to equipment 110 (e.g., conveyor controls, conveyor scanners, conveyors, automated induction equipment, other warehouse equipment, etc.), a warehouse management system (WMS) 104, a data store 120 storing warehouse management, execution, dispatch, picking, carton, order, item, AGV, map, and/or other data, a picking system 108 (e.g., pick-to-voice, pick-to-light, etc.), a robot execution server (REX) 132, and a dispatch system 106.

The WES 102 may, in some implementations, include one or more hardware and/or virtual servers programmed to perform the operations, acts, and/or functionality described herein. The components of the WES 102 may comprise software routines storable in one or more non-transitory memory devices and executable by one or more computer processors of the WES 102 to carry out the operations, acts, and/or functionality described herein. In further implementations, these routines, or a portion thereof, may be embodied in electrical hardware that is operable to carry out the operations, acts, and/or functionality described herein.

The REX 132 may, in some implementations, include one or more hardware and/or virtual servers programmed to perform the operations, acts, and/or functionality described herein. The REX 132 may generate a schedule that defines the route for an AGV during a picking session, as described herein. For a given cart AGV 116a . . . 116n, depending on the items (e.g., identified by stock keeping units or SKUs) to be placed in the cartons of that cart, the REX 132 generates a schedule and transmits it to the dispatch system 106, which in turn deploys a cart AGV 116 according to the schedule, for instance. In some implementations, the dispatch system 106 instructs the AGV to proceed through one or more of the picking zones of the distribution facility according to the schedule. The schedule of each of the AGVs may be coordinated such that an optimal flow can be achieved, as discussed elsewhere herein.

In some implementations, the REX 132 may include or may communicate with a SKU (e.g., a stock keeping unit or unique identifier identifying an item) routing engine. The SKU routing engine is executable to route items into different storage zones depending based on picking profiles of the items, which may be stored and maintained as item data 130. The SKU routing engine dynamically monitors the picking activity in the distribution facility, tracks which items have the highest volume or velocity for a given timeframe, stores the tracking data in the data store 120, and can instruct the REX 132 to have items relocated by AGVs to different storage locations in the distribution facility based on the tracked picking activity.

A picking profile of a given item can change over time as demand for the item changes. The demand for a given item may be random or predicable (e.g., seasonal), and may change based on time of day, week, month, year, etc. The item routing engine may maintain the picking profile in the database as item data 130, and utilize that data to determine in which zone of the distribution facility to store the item.

Advantageously, based on the picking profiles (e.g., velocity and volume), the SKU routing engine may provide a distinct automated application for picking. In some implementations, the SKU routing engine may continually algorithmically evaluate the picking profile of each SKU and instruct the WES 102 and dispatch system 106 to transfer/relocate items to another storage location and/or picking area, swap item locations, etc., when necessary to maintain the most expedient flow in the facility. This advantageously reduces capital associated with fully automated high velocity items and reduces replenishment complexity.

The WES 102 may store productivity information for points in the distribution facility in a database (e.g., a non-transitory data store 120). The productivity information may reflect mechanical capacity of that given point of the AGV system. In some cases, the mechanical capacity may be dynamic based on current conditions (e.g., system health, staffing levels (e.g., number of associates working in zone), stock levels, operational state, etc.).

In some implementations, the WMS 104 and/or WES 102 may algorithmically analyze the configuration of a cart AGV 116 depending on items that are set for distribution/fulfillment in the next picking time window. The WMS 104 and/or WES 102 may generate a stocking list for the cart based on hub, priority, pick density, pick zone demand, and item-to-item affinity, etc. The REX 132 may use the stocking list when generating the schedule for the cart AGV 116.

The dispatch system 106 may be electronically communicatively coupled to a plurality of AGVs. In some implementations, the dispatch system 106, or elements thereof, may be integrated with or communicatively coupled with the REX 132. The dispatch system 106 includes hardware and software configured to dispatch the AGVs, and is coupled for communication the components of the system 100 to receive instructions and provide data. The dispatch system 106 may calculate a route to execute the task considering traffic and resources. In some cases it adjusts the route or the task in order to keep the route optimum.

The AGVs are robotic vehicles including drive units providing motive force for moving the AGVs (and, in some instances, carts, modular storage units 602, AGV racks, AGV shelves, etc.), guidance systems for determining position of the AGVs within the distribution facility, and equipment for carrying items. The equipment for carrying items may include carton holders, AGV shelves, modular storage unit holders, etc., such as carts, shelves, etc., as described in further detail in reference to FIGS. 5A-7J, for example. FIGS. 5A-7J depict various types of AGVs, such as a picking AGV 114 (also referred to as a modular storage fetching (MSF) AGV) and cart AGVs 116.

A cart AGV 116 is an automated guided vehicle or robot configured to autonomously transport pick-to-cart items from a pick-to-cart area 302 of the distribution facility to a pick-cell station 316 and/or finalizing area 314 (e.g., as described in reference to FIG. 3A). The cart AGV 116 may include a drive unit adapted to provide motive force to the cart AGV 116 and a guidance system adapted to locate the cart AGV 116 in the distribution facility. In some implementations, the cart AGV 116 is adapted to autonomously transport a carton holder (e.g., a cart or shelves) that is, in turn, adapted to hold cartons. Cartons may include, for instance, a box (e.g., a shipping box) adapted to hold items. For example, a cart AGV 116 may push/pull a cart (e.g., a carton holder) holding cartons around a pick-to-cart area 302 and may automatically stop at storage bays of the pick-to-cart area 302 where items to be picked are stored, so that a picker in the pick-to-cart area 302 can easily place items into one or more of the cartons. In some instances, the cart AGV 116 may transport the cart to a pick-cell station 316 to receive additional items into the cartons from high-density storage (e.g., from modular storage units 602 in high-density storage, as described below). In some instances, the cart AGV 116 may move at walking speed next to, behind, or in front of a picker walking through the pick-to-cart area 302 of the distribution facility. Additional details of example cart AGVs 116 are shown and described in reference to FIGS. 5A-5D.

A picking AGV 114a . . . 114n is an automated guided vehicle or robot that may be configured to autonomously transport items from a high-density storage area 304 of the distribution facility to a pick-cell station 316, replenishment area 318, and/or finalizing area 314. The picking AGV 114 may include a drive unit adapted to provide motive force to the picking AGV 114, a guidance system adapted to locate the picking AGV 114 in the distribution facility, and a shelving unit, which may be adapted to hold modular storage units 602. The picking AGV 114 may include a container handling mechanism (CHM) 716 (e.g., as shown in FIGS. 7A-7J) that retrieves items or modular storage units 602 from storage shelves (e.g., in the high-density storage area), places items on an item holder (e.g., an AGV shelf) coupled with the picking AGV, and replaces items on storage shelves or at a pick-cell station. In some implementations, a picking AGV 114 may autonomously retrieve modular storage unit(s) 602 containing items to be picked in an order from the high-density storage area. For instance, the picking AGV 114 may transport the modular storage unit(s) 602 to a pick-cell station 316, so that a picker at the pick-cell station 316 can pick items from the modular storage unit(s) 602 and place them into cartons in a cart. For example, a cart AGV 116 may transport a carton to a bay in the pick-to-cart area 302 having a first item in an order, then to a pick-cell station 316 where a separate picking AGV 114 has delivered or will deliver a second item (e.g., in a modular storage unit 602) in the order, so that a picker can place the second item into the carton with the first item, and so on and so forth. The process may be repeated as necessary, depending on the number of items to be placed in the carton(s) of the pick cell station 316. The system 100 may coordinate the timing, placement, and movement of the cartons, modular storage units 602, pick-cell station 316 workload, and AGVs to bring cartons and modular storage units 602 having items corresponding to an order to the same pick-cell station 316 during the same time window, as described in further detail herein. Additional details of example picking AGVs 114 are described in reference to FIGS. 7A-7J.

The WMS 104 may, in some implementations, include one or more hardware and/or virtual servers or software routines storable in one or more non-transitory memory devices and executable by one or more processors to perform the operations, acts, and/or functionality described herein. The WMS 104 may be configured to store and maintain carton data 124 in the data store 120. The carton data 124 includes information about cartons and/or containers in the system, such as a unique identifier for each carton or container, a carton or container type, the zones a carton will visit, the number of pick lines a carton proceeds through, and the priority for the carton. Some cartons may have a higher priority relative to other cartons and the system 100 may expedite handling of those cartons with higher priority relative to other cartons by the system 100. The carton data 124 may include a picklist defining the items the carton will contain. The WMS 104 may store data mapping items to the different pick zones (e.g., the pick-to-cart area 302, the high-density storage area 304, a particular modular storage unit 602, a particular location at a particular pick-cell station 316, etc.). In some implementations, the WMS 104 may be configured to communicate the carton data 124 with the WES 102, the picking system 108, and/or dispatch system 106 in real time, in batches, as requested by these components, etc.

The picking system 108 may, in some implementations, include one or more hardware and/or virtual servers or software routines storable in one or more non-transitory memory devices and executable by one or more processors to perform the operations, acts, and/or functionality described herein. The picking system 108 may receive pick confirmations, for example, from pickers or operators (e.g., using barcode scanners, NFC, RFID chips, or other sensors or input methods) working within a pick zone (e.g., a pick-to-cart area 302, pick-cell station 316, etc.) confirming that picks for a given carton have been performed, as described in further detail below. An example picking system 108 may include an available pick-to-voice or a pick-to-light system. The picking system 108 may be configured to communicate the pick confirmation data with the WES 102, WMS 104, or other components of the system in real time, in batches, as requested by the components of the system, etc.

The picking system 108 may receive confirmatory input (e.g., pick confirmations) from pickers working within a pick zone. The confirmatory input confirms that all picks for a given carton have been completed. The picking system 108 transmits the confirmatory input to the WES 102. The confirmatory input may include the time stamp reflecting completion of the picks in the zone, a unique identifier identifying the picker (operator), a unique identifier identifying the pick zone, a unique identifier identifying the AGV, and/or a unique identifier identifying the carton (e.g. a carton number).

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, AGV data 128, carton data 124, order data 126, modular storage unit data, etc. In some instances, the data store 120 may also include, conveying system attributes, picking data, picker attributes, sensor data, etc.

The data store 120 may be included in the WES 102, WMS 104, REX 132, or in another computing system and/or storage system distinct from but coupled to or accessible by the WES 102, WMS 104, REX 132, or other components of the system 100. The WES 102, picking system 108, REX 132, and/or dispatch system 106, for example, may store and maintain map data 122, order data 126, carton data 124, and AGV data 128. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 122 may include data reflecting the 2 or 3 dimensional layout of the facility including the location of modular storage units 602, picking areas, lanes, equipment 110, storage shelving units, items, AGVs, etc. Map data 122 may indicate the attributes of the distribution facility, including attributes of zones (e.g., one or more pick-to-cart areas 302, high-density storage areas 304, induction areas 308, finalizing areas 314, pick-cell stations 316, replenish stations, etc.). For example, attributes of zones may include the number, quantity, and location of shelving units or bays, modular storage units 602, items, guidance system locators or markers, etc.

The order data 126 includes data about picking including orders, items picked, items to be picked, picking performance, picker identities, pick confirmations, locations items are picked from, etc. Order data 126 may indicate the quantity and identity of items in orders, shipping addresses, order priority, progress of order fulfillment, number of cartons in an order, etc.

Item data 130 may describe items available for picking in a distribution facility. The item data 130 may include unique identifiers for these items, the item volume (e.g., the total amount picked in given window (e.g., in an hour, day, etc.)), the item velocity (e.g., number of different times item picked in given window (e.g., per hour, day etc.), the unique location of the items within the distribution facility (aisle, shelf, shelf position, etc.), other attributes of the item (e.g., size, description, weight, quantity of items in a package, color, etc.), item inventory, mapping of items of modular storage units 602, etc. In some implementations, the item data 130 may include the quantity of particular items a modular storage unit 602 contains, the current location of a modular storage unit 602, a preferred storage location of items and/or modular storage units 602, a threshold inventory level of items to be satisfied before autonomously transporting the modular storage unit 602 to a replenishment area 318 by a picking AGV 114 (e.g., to restock the items in the modular storage unit 602).

The AGV data 128 may describe the state of an AGV (operational state, health, location, battery life, storage capacity, items being carried, cartons, etc.), whether picker assigned to it, etc.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

Figure 2A:
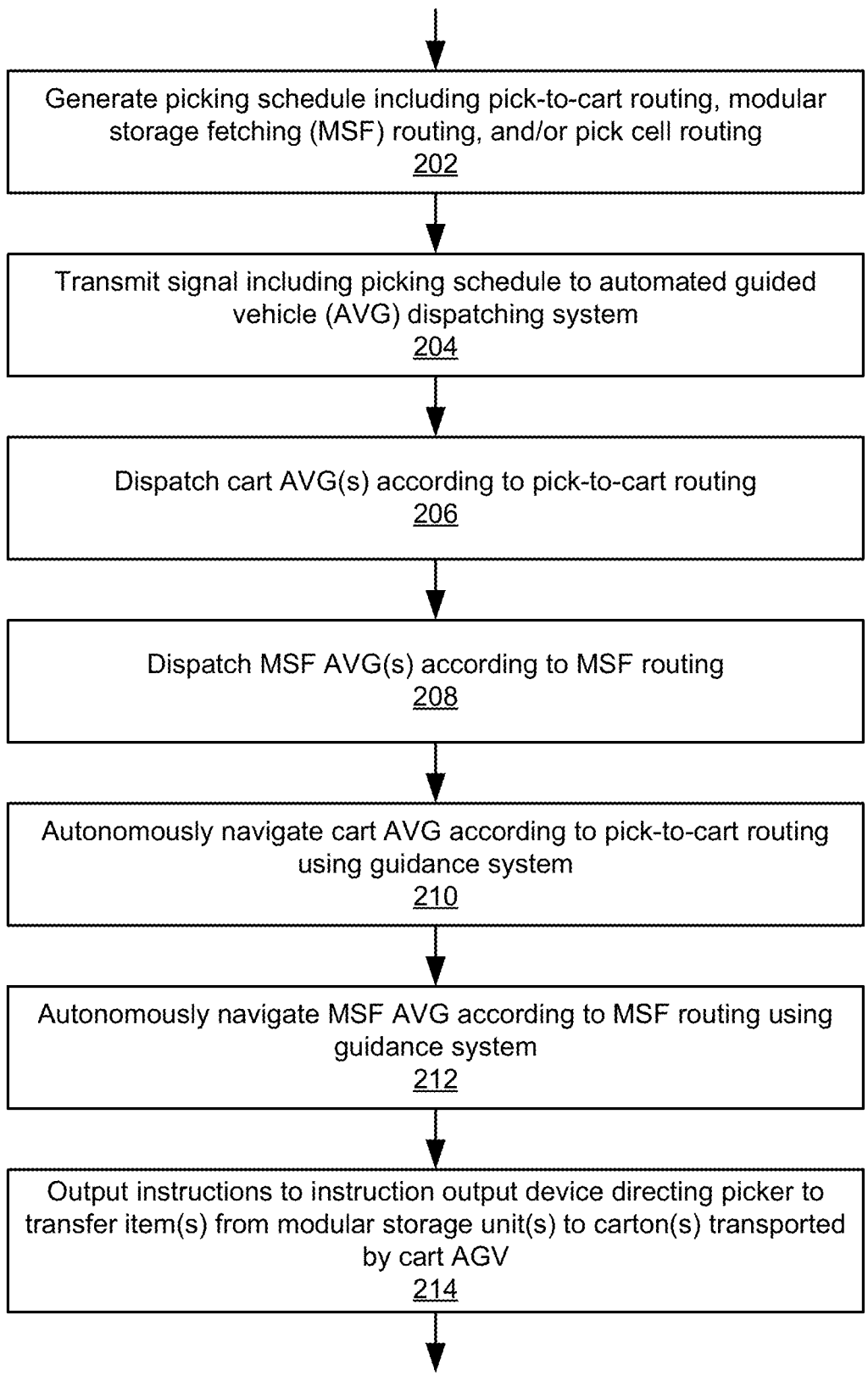
FIG. 2A is a flowchart of an example method for picking an order in a hybrid modular storage fetching system.

FIG. 2A is a flowchart of an example method for picking an order in a hybrid modular storage fetching system. At 202, the WES 102 may generate a picking schedule including pick-to-cart routing, modular storage fetching (MSF) routing, and/or pick-cell routing based on order data 126. The order data 126 may include one or more first unique identification codes representing one or more first items located in a pick-to-cart area 302 of a distribution facility. In some instances, the order data 126 may also include one or more second unique identification codes representing one or more second items located in a high-density storage area 304 of the distribution facility.

The pick-to-cart routing describes routing of a particular cart AGV 116a . . . 116n through a pick-to-cart area 302. For example, the pick-to-cart routing may include a picking list of pick-to-cart items to be picked to the cartons transported by the cart AGV 116. The pick-to-cart routing may indicate the location of the storage units, shelves, or bays in which an item in the picking list is located. In some implementations, the pick-to-cart routing may also include a defined route of a cart AGV 116 through these locations and an indication of locations at which to stop the cart AGV 116, so that a picker can pick items from adjacent storage units, shelves, or bays into the cartons transported by the cart AGV 116. The pick-to-cart routing may also include a schedule indicating when to pick items and when to deliver cartons to a particular pick-cell station 316.

The MSF routing describes routing of a particular picking AGV 114 through a high-density storage area 304. For example, the MSF routing may include a picking list of items stored in modular storage units 602, unique identification codes of the modular storage units 602, and the current locations of the modular storage units 602. In some instances, the current location of the modular storage units 602 may be in the high-density storage area 304, in a replenishment area 318, or at a pick-cell station 316. The MSF routing may also include a defined route of a picking AGV 114 through the distribution facility to retrieve one or more modular storage units 602 including items from one or more orders and deliver those modular storage units 602 to assigned pick-cell stations 316. The defined route may be calculated to most efficiently retrieve one or a series of modular storage units 602, maximize a quantity of modular storage units 602 for the picking AGV 114 to retrieve in a single trip, to avoid traffic of other AGVs, and/or to cause the modular storage unit(s) 602 to arrive at a pick-cell station 316 at a minimized time difference from a carton (e.g., transported by a separate cart AGV 116) arriving at the same pick-cell station 316 to which the item in the modular storage unit 602 is to be placed, for example. The MSF routing may also include a schedule indicating when to retrieve modular storage units 602 and when to deliver the modular storage units 602 to a particular pick-cell station 316.

Pick-cell routing may describe routing of AGVs among pick-cell stations 316. For instance, a modular storage unit 602 may be transferred by a picking AGV 114 from one pick-cell station 316 to another pick-cell station 316, as described elsewhere herein.

In some implementations, the WES 102, or another component of the system 100, may determine, based on load information in one or more of the pick zones, that a particular zone, picker, path, pick-cell station 316, etc., has a high traffic load. In response to such a determination, the WES 102 may dynamically adjust the routing schedule, for example, dictating which cart AGVs 116 or picking AGVs 114 are sent into different zones of the distribution facility. For example, the WES 102 may determine that there is a threshold level of traffic (e.g., by cart AGVs 116) in the pick-to-cart area 302, in response to which determination, the WES 102 may induct AGVs (e.g., cart AGVs 116 with particular orders to be filled) into the hybrid modular storage fetching system that bypass the pick-to-cart area 302 and proceed directly to pick-cell stations 316 to receive items from modular storage units 602. In another example implementation, the WES 102 may determine, for instance, that there is a threshold level of traffic in a staging area 312 or that no picking AGVs 114 are available to retrieve items from high-density storage 304 and may, in response, induct cart AGVs into the system that do not stop at a pick-cell station 316 or that require fewer modular storage units 602 to be retrieved from high-density storage. Accordingly, in some implementations, the WES my dynamically balance the load of various zones, AGVs, pick-cell stations, etc., in the system by adapting the composition (e.g., items from pick-to-cart versus from high-density storage) of orders/cartons on a particular AGV (e.g., a cart AGV), for example.

At 204, the REX 132 may transmit a signal including the picking schedule (or components thereof) to the dispatch system 106.

At 206, the dispatch system 106 may dispatch a cart AGV 116 according to the picking schedule. In some implementations, dispatching a cart AGV 116 may include creating cartons, assigning the cartons to a cart to be transported by a cart AGV 116, placing the cartons on the cart, and, in some instances, coupling the cart AGV 116 with the cart. For instance, the WES 102 may assign orders (or items thereof) to cartons. Labels with unique identification codes identifying the cartons may be printed, placed on cartons, and the cartons may be placed on the cart at an induction area 308. The unique identification codes of the cartons may match, in the data store 120, the carton (and therefor the cart/cart AGV 116) with items to be picked.

At 208, the dispatch system 106 may dispatch a picking AGV 114 according to the MSF routing.

At 210, the cart AGV 116 may autonomously navigate along a path through the pick-to-cart area 302 according to the pick-to-cart routing to retrieve one or more items located in the pick-to-cart area 302. As described elsewhere herein, the cart AGV 116 may follow the guidance system through the pick-to-cart area 302 and stop at designated areas for items stored in those areas to be picked to the designated cartons. In some implementations, the cart, carton, container, cart AGV 116, storage area, or separate computing device (e.g., a mobile device of a picker) may include an output device that provides output indicating items to be picked at a particular location and, in some implementations, the output device may also include an input to receive pick confirmations. Once the pick confirmation has been received, the cart AGV 116 may autonomously move to the next area to pick a subsequent item assigned to a carton on the cart.

Once items in the pick-to-cart storage area have been picked to the cart AGV 116, the cart AGV 116 may autonomously navigate to an assigned pick-cell station 316 or to a finalizing area 314 according to the pick-to-cart routing. In some implementations, the cart AGV 116 may decouple from the cart and leave the cart at the pick-cell station 316 (or at a finalizing area 314) so that the cart AGV 116 may transport another cart while the first cart is being filled with items from modular storage units 602, for example.

At 212, the picking AGV 114 may autonomously navigate to a location of the one or more modular storage units 602 in the high-density storage area 304 (or a replenishment area 318, pick-cell station 316, etc.), the one or more modular storage units 602 containing one or more items in an order, for example, an order with a carton transported by a cart AGV 116, as described above. The picking AGV 114 may autonomously retrieve the one or more modular storage units 602 from the high-density storage area 304, for example. The picking AGV 114 may then autonomously navigate from the location of the modular storage unit(s) 602 to the pick-cell station 316 according to the MSF routing to transport the modular storage unit(s) 602 to the pick-cell station 316. In some implementations, the picking AGV 114 may hold a plurality of modular storage units 602 and may deliver each of the modular storage units 602 to the same pick-cell station 316 or to separate pick-cell stations 316. In some implementations, the picking AGV 114 may also retrieve modular storage units 602 that are no longer needed at a particular pick-cell station either separately or while delivering new modular storage units 602 to the pick-cell station.

At 214, the picking system 108 outputs instructions to an output device (e.g., on the cart, pick-cell station, modular storage unit 602, or separate computing device, etc.), the instructions directing a picker at a pick-cell station to transfer items from modular storage unit(s) 602 at the pick-cell station to carton(s) on the cart.

Figure 2B:
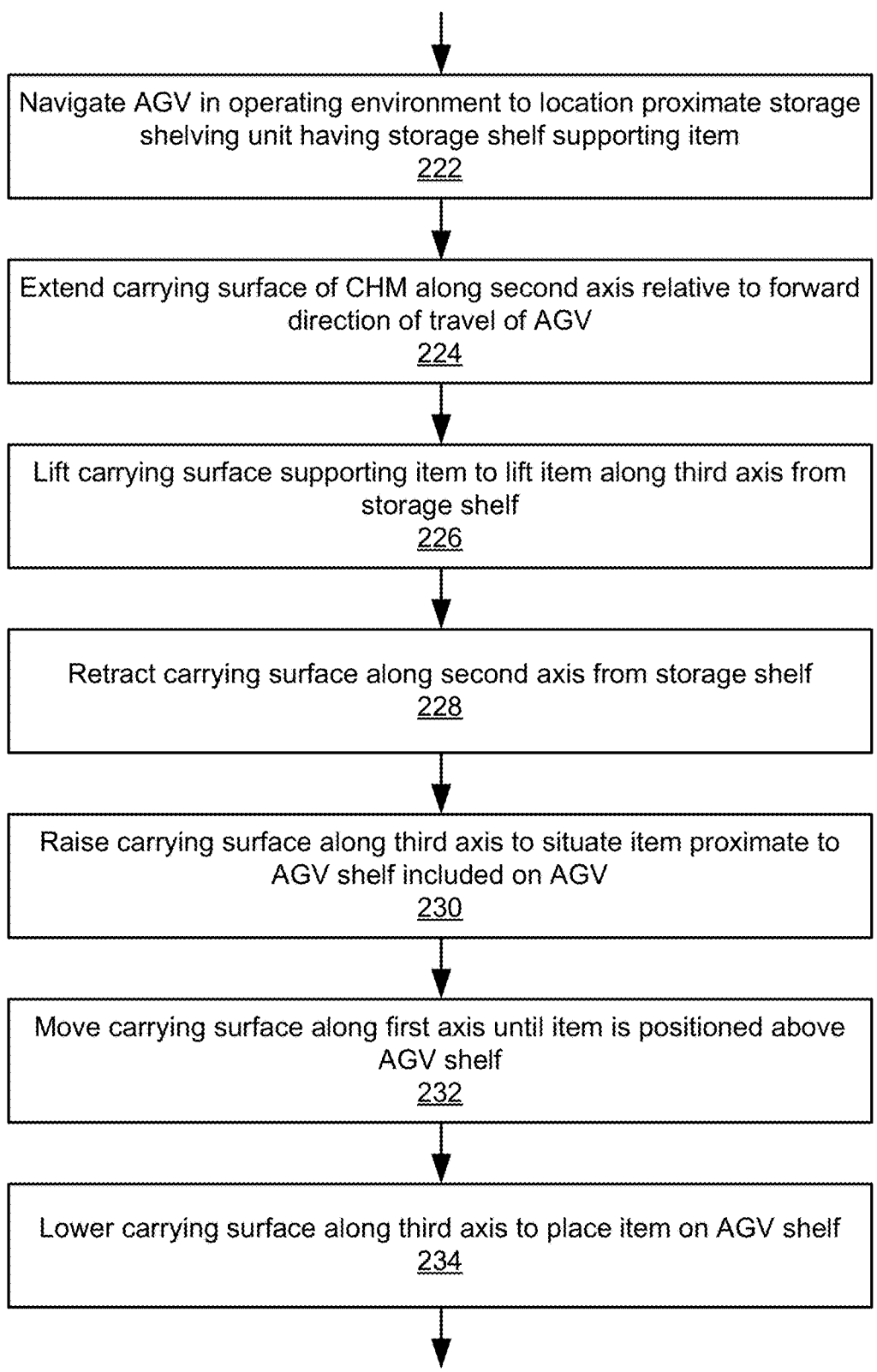
FIG. 2B is a flowchart of an example method for controlling a container handling mechanism of a picking automated guided vehicle.

FIG. 2B is a flowchart of an example method for controlling a CHM 716 of a picking AGV 114. At 222, the picking AGV 114 may navigate in an operating environment, such as a distribution facility, to a location proximate to a storage shelving unit having a storage shelf supporting an item, such as a modular storage unit 602. In some implementations, the picking AGV 114 may determine its location within the operating environment using a guidance system and navigate from a first location to a second location in the operating environment. The guidance system may include sensors that detect and process navigation indicators or markers to locate the picking AGV 114 as it traverses the operating environment. For example, the guidance system may include an optical scanner on a body of the picking AGV 114 that reads visual markers (e.g., QR codes) on a floor of the distribution facility. A controller of the picking AGV 114 may look the visual marker up in an accessible database, such as the map data 122.

At 224, the picking AGV 114 may extend a carrying surface 396 of a CHM 716 (e.g., as described in reference to FIGS. 7A-7J) along at least a second axis relative to a forward direction of travel of the picking AGV 114. The CHM 716 may be coupled to the picking AGV 114 and may extend the carrying surface 396 horizontally perpendicular to a direction of travel of the picking AGV 114 and toward an adjacent storage shelving unit in the high-density storage area. For example, the CHM 716 may have three or more degrees of freedom corresponding to three axes of movement relative to a direction of travel or housing of the picking AGV 114. For example, a first of the three axes may extend along the forward direction of travel of the pick AGV 114, the second axis may extend along a horizontal direction perpendicular to the first axis, and a third axis may extend along a vertical direction perpendicular to both the first axis and the second axis. An example of these three axes are shown and described in more detail in reference to FIG. 7A.

In some implementations, the picking AGV 114 may determine a presence or location of an item, modular storage unit 602, or storage shelf on the storage shelving unit using a scanner coupled with the CHM 716 (e.g., on the carrying surface 396, on the CHM 716, or elsewhere on the picking AGV 114). For instance, the picking AGV may determine a location of the storage shelf by scanning a shelf marker (e.g., a barcode, QR code, etc.) by an optical scanner coupled with the CHM 716. In some implementations, the picking AGV 114 may use a shelf identifier linked in a database to an item or container to determine a height of the storage shelf and may adjust a height of the carrying surface 396 along at least the third axis to interact with (e.g., slide between the storage shelf and the item) the item in order to lift the item from the storage shelf. In some implementations, the picking AGV 114 may alternatively or additionally use a placement of a handling component of an item or container to determine the coordinates at which to extend the carrying surface 396 in order to interact with the handling component.

At 226, the CHM 716 may lift the carrying surface 396, which in turn lifts the item vertically along at least the third axis from the storage shelf. The carrying surface 396 may support the item directly by engaging with the item (e.g., sliding underneath the item on the storage shelf before lifting it, coupling to the sides or front of the item, etc.). In some instances, the carrying surface 396 may be configured to interact with a container (e.g., a modular storage unit 602 or mini pallet, as described in reference to FIGS. 6A and 6B) holding one or more items of the type of item to be picked in order to lift the container from the storage shelf.

At 228, the CHM 716 may retract the carrying surface 396, and thereby the item, along at least the second axis from the storage shelf. For instance, the CHM 716 may retract the carrying surface 396 until the carrying surface 396 is fully retracted or until the item has cleared a front edge of the storage shelving unit. For example, in some implementations, the picking AGV may use a known or determined (e.g., based on an optical sensor and/or attributes stored in the data store 120) size of the item to know a minimum distance at which the carrying surface 396 should be retracted to cause the item and carrying surface 396 to clear the front edge of the storage shelving unit to allow the item and carrying surface 396 to move vertically.

At 230, the CHM 716 may raise the carrying surface 396 along at least the third axis to situate the item proximate to an AGV shelf included (e.g., coupled with) the picking AGV. For example, the CHM 716 may raise the carrying surface 396 to place a bottom surface of the item above a height of the AGV shelf and, in some instances, the CHM 716 may also raise the carrying surface 396, so that the carrying surface 396 is also above the height of the AGV shelf, depending on the implementation.

In some implementations, the picking AGV may include, or have coupled thereto, a storage rack including a plurality of AGV shelves. In some such implementations, the CHM 716 may raise the carrying surface 396 along at least the third axis until the item is above a particular shelf, but below the shelf above the particular shelf to fit the item between the shelves. Upon placing an item on one of multiple shelves in the rack, the picking AGV may store an identifier of the item in association with an identifier of the AGV shelf in order to recall later which item is placed on which AGV shelf of the rack.

In some implementations, the AGV item storage rack of the picking AGV 114 may include a plurality of AGV shelves, one or more of which may have an adjustable height on the rack to accommodate items of various dimensions. The heights and/or widths of the storage shelves may be stored in the data store 120, so that the picking AGV 114, REX 132, or another component of the system 100 may use the available heights of the shelves to determine which picking AGVs 114 and/or shelves of a picking AGV to use to transport a particular item. In some implementations, the adjustable AGV shelf(ves) may be motorized to dynamically adjust their height to accommodate items of various sizes. While various vertical implementations are described, it should be understood that the AGV storage rack may include vertically and/or horizontally arranged slots and/or shelves in which items may be adjacently situated and retained, and from which items may be retrieved.

At 232, the CHM 716 may move the carrying surface 396 along at least the first axis until the item is positioned above the AGV shelf and, at 234, may lower the carrying surface 396 along at least the third axis to place the item on the AGV shelf. For example, the CHM 716 may lower the carrying surface 396 until the weight of item is resting on the AGV shelf. In some implementations, the carrying surface 396 may detach from the item (e.g., release a handling mechanism of the item) or slide out from underneath the item on the AGV shelf, so that the CHM 716 and carrying surface 396 may be used to retrieve another item.

In some implementations, the picking AGV 114 may navigate to a different location within the operating environment, for example, to a pick-cell station 316 which may be configured to receive items from a plurality of AGVs. The REX 132, or another component of the system 100, may issue instructions to a pick cell picker at the pick-cell station 316 instructing the picker to place an item from the picking AGV 114 (e.g., in a container delivered to the pick-cell station 316 by the picking AGV 114) into a given carton with one or more other items (e.g. a carton and/or items delivered by a cart AGV 116).

In some implementations, such as where the picking AGV 114 includes a rack with a plurality of AGV shelves, responsive to a CHM 716 of a picking AGV 114 storing a first item on a first AGV shelf of the picking AGV 114, the picking AGV may retrieve a second item from a second storage unit in the high-density storage area. For example, the picking AGV 114 may navigate to a second location within the operating environment to retrieve the second item. This process may be repeated as appropriate and/or needed for any suitable number of items.

In some implementations, the CHM 716 may extend the carrying surface 396 along at least the second axis toward a second storage shelf of a second storage unit (e.g., at the different location of the operating environment) where a second item is stored. The CHM 716 may lift the carrying surface 396 and thereby lift the second item (the carrying surface 396 supporting the second item) along at least the third axis from the second storage shelf. The CHM 716 may then retract the carrying surface 396 along at least the second axis from the storage shelf. The CHM 716 may then raise the carrying surface 396 along at least the third axis to situate the second item proximate to a second AGV shelf of the plurality of AGV shelves of the AGV storage rack. Once the carrying surface 396 and the item are situated at the correct height along the third axis, the CHM 716 may move the carrying surface 396 along at least the first axis until the second item is positioned above the second AGV shelf. The CHM 716 may then lower the carrying surface 396 along at least the third axis to place the second item on the second AGV shelf. Accordingly, the picking AGV 114 may retrieve a plurality of items from different storage shelving units within the operating environment at the same time and simultaneously transport them to a pick-cell station or other location within the operating environment.

FIG. 3A depicts a schematic of an example configuration of a distribution facility, which may be an operating environment of one or more picking AGVs 114 and cart AGVs 116. It should be understood that various distribution facilities may include different picking zones having different stocking infrastructure and picking configurations. For instance, high-volume and/or velocity items (e.g., items appearing above a defined threshold of frequency in orders) may be stored in a pick-to-cart area 302 and be available for immediate picking, and relatively moderate and/or low-volume and/or velocity items may be stored in high-density storage area 304 on modular storage units 602 which may be retrieved by picking AGVs 114 for an upcoming pick.

The layout depicted in FIG. 3A includes various areas: an induction area 308, a pick-to-cart area 302, a pick-cell area 310, a pick-cell staging area 312, a high-density storage area 304, a finalizing area 314, and a freight or modular storage unit elevator (not shown) for multi-level access when the layout includes multiple floors. In some cases, the layout may include multiple levels of mezzanine with one or more of the different zones/areas. In some implementation, cart AGVs 116 are staged in the induction area 308 and are set up for picking sessions. In some implementations, cartons are assembled, labeled with unique scannable visual identifiers to associate them with specific orders, and are placed on the supports (e.g., cart shelves) of the cart AGVs 116 in the induction area 308.

The pick-to-cart area 302 is configured for high-velocity and/or volume items and advantageously reduces capital associated to handle this type of item class. Inventory may be stored in high-volume storage in cartons or pallets, for example. High velocity items may be divided into pick zones, each zone may include a plurality of bays (e.g., 4, 5, 6+), which may be balanced by the SKU routing engine based on demand by the SKU routing engine. Cart AGVs 116 may be scheduled by the REX 132 to autonomously visit these zones, and pickers accompanying the cart AGVs 116 may be guided by the picking hardware (e.g., pick-to-voice and/or pick-to-light) controlled by the picking system 108. In an example, a cart AGV 116 is instructed by the REX 132 to stop directly in front of a bay location. The cart AGV 116 may self-locate using a guidance system. For example, the guidance system may include guidance system locators or markers, such as guide tape (magnetic, colored, etc.), laser target navigation, inertial navigation, vision guidance, geo-location, QR codes on the floor of the distribution facility, RFID (radio frequency identification) tags, beacons, etc., that can be used to locate and navigate AGVs in the distribution facility. Further, the AGVs may include guidance system components configured to read the guidance system locators, such as a QR code reader, wireless radio, etc.

After the picker picks the item and confirms the pick with the picking hardware, the cart AGV 116 autonomously moves to the next sequential bay until the picks are complete. As shown in FIG. 3A, a cart AGV 116 has the capability to bypass zones, bays, shelves, etc., without picks.

Each zone can have dedicated cart AGV 116 accumulation or queue before the zone to reduce cycle time.

The picking station area may include pick-cell stations 316a, 316b, and 316c situated along primary path(s) via which the cart AGVs 116 are routed. In FIG. 3A, the pick-cell stations 316 are situated opposing a portion of the pick-to-cart area 302 and the cart AGVs 116 may be routed to visit one or more of these pick-cell stations 316 depending on the items that need to be picked and placed in the cartons of these cart AGVs 116. In the case that in given cart AGV 116 does not require any items from the picking station area, it may bypass it entirely and proceed to the finalizing area 314.

In some implementations, for a given picking session, the REX 132 may establish a single line picking configuration in which the picker and the cart travel through an inventory pick path along a single line until the picks are fulfilled. In further implementations, based on demand, a fast moving area may be established by the REX 132 that includes multiple routes: a higher speed line that includes single line picking for low-demand items and another area for high demand items. This combination can advantageously balance daily labor.

The layout may also include a replenishment area 318 in which modular storage units 602 are replenished with items. For instance, item inventory in a given modular storage unit 602 may be replenished by a picking AGV 114 that picks the modular storage unit 602 from static shelves and transports them to the replenishment area 318 where a case may be opened and items from the case placed directly into the modular storage units 602. One or more items (whether of the same type of item or different types) can be placed in a given modular storage unit 602. In some cases the modular storage unit 602 may be replenished while it is in the static shelf. Having multiple options (manual or AGV) for replenishment has more flexibility to adjust to resource allocation and schedule. Additionally or alternatively, the picking AGV 114 can swap out the modular storage unit 602 with another containing the same SKUs which has been prepared ahead of time and staged for that purpose.

In some implementations, the REX 132 may instruct picking AGVs 114 to replenish and distribute modular storage units 602 in different locations of the high-density storage area 304 based on order history. In these implementations, items with high order frequency orders may be distributed in more locations than items with lower order frequency. The WES 102 may maintain a moving minimum based on order quantity minimizing the need to use inventory from two locations to fulfill an order, and the REX 132 may schedule the AGVs accordingly.

The modular storage units 602 storing items may be moved by picking AGVs 114 from high-density storage area 304 into a staging area 312 and staged for movement into a pick-cell station for an upcoming pick. In some implementations, the storage units of faster-moving items may be moved directed to a pick cell 382 in a given pick-cell station 316.

In further implementations, the REX 132 may instruct a picking AGV 114 to transfer a modular storage unit 602 between cells of a pick-cell station 316, or between pick-cell stations 316 (e.g., 316a and 316b) without having to expend the time to return the modular storage unit 602 to the high-density storage area 304.

FIG. 3A also illustrates example paths of AGVs through the distribution facility. The paths are represented by dotted lines, cart AGVs 116 are represented by ovals, and picking AGVs 114a . . . 114d are represented by diamonds.

Example cart AGV paths are illustrated in FIG. 3A, for example, a cart AGV 116 may navigate from an induction area 308, on a path through the pick-to-cart area 302, and then to one or more pick-cell stations 316. Once the picks for the cart AGV 116 have been completed, it may navigate to a finalizing area 314 where cartons are prepared for shipment, for example. Once the cartons have been removed from the cart AGV 116, the cart AGV 116 may return to the induction area 308 to start through the process again.

Example picking AGV paths are also illustrated in FIG. 3A, for example, a picking AGV 114a may transport a modular storage unit E from a first pick-cell station 316a to a replenishment area 318 for replenishment. A picking AGV 114b may retrieve a first modular storage unit A from a first location, navigate to a second location, retrieve a second modular storage unit B, and transport both the first and second modular storage units A and B to a pick-cell station 316b. A picking AGV 114c may retrieve a modular storage unit C from a first pick-cell station 316a and transport it to a second pick-cell station 316b. A picking AGV 114d may retrieve a modular storage unit D and transport it back to the high-density storage area 304. It should be understood that these paths and implementations are provided as examples and that other combinations are possible and contemplated herein. For example, one or more picking AGVs 114 may perform some or all of the paths illustrated as well as others not illustrated in FIG. 3A. Further, as described elsewhere herein, the automation of the picking AGV 114 may be performed in synchronization with other actions (e.g., automation of cart AGVs 116, picking sessions or windows, movement of other AGVs or pickers, etc.) in the hybrid modular storage fetching system.

Figure 3B:
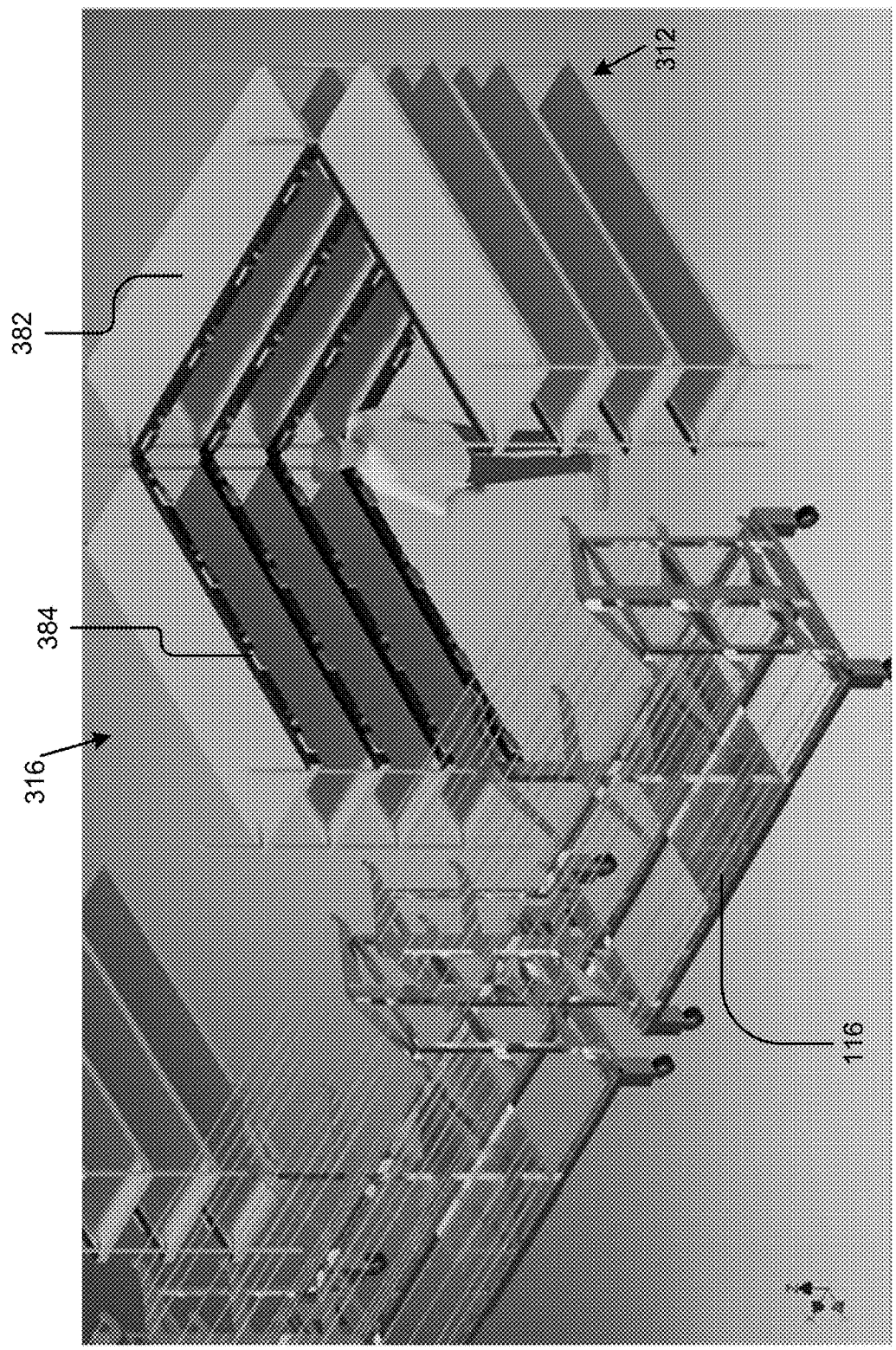
FIG. 3B is an illustration of an example pick-cell station.

FIG. 3B is an illustration of an example pick-cell station 316. Each pick-cell station 316 may include one or more pick cells 382. The pick cells 382 are a temporary storage mediums (e.g., shelves, bays, etc.) for the modular storage units 602 (e.g., mini pallets, totes, modular storage racks, etc.) and modular storage units 602 may be storage containers that can be picked up or tugged and transported by a picking AGV 114. In some cases the pick-cell station 316 may include an output device, such as a pick-to-light frame, for carts, that matches the locations of the cartons in the cart and/or a pick-to-light frame 384 for the pick cells 382 to indicate the locations of modular storage units 602 to use for a particular pick. For instance, a pick-cell station 316 may include an output device configured to provide picking instructions to a picker, the picking instructions indicating to the picker which of the items in the modular storage units 602 to place in a carton held on the carton holder of the cart AGV 116.

One or multiple of the pick cells 382 may be organized into a staging area 312 around a picker in a pick-cell station 316, so that modular storage units 602 can be easily accessed by the picker. In some implementations, a picking AGV 114 may be configured to stage the modular storage units 602 at the staging area 312. For instance, a picking AGV 114 may approach from the rear of a pick cell 382 and stage (e.g., place, deliver, etc.) a modular storage unit 602 on the pick cell 382. In some implementations, a modular storage unit 602 may be associated by the picking system 108 with a particular location in the staging area 312 to more precisely direct a picker to the location of the modular storage unit 602 (e.g., using a pick-to-light or other output system).

At a given pick-cell station 316, a cart AGV 116 may arrive and situate itself on one side of the station with the cartons on the cart AGV 116 facing the picker. On the other sides of the station are pick cells 382 in which modular storage units 602 situated and from which the picker may select items to fulfill the orders associated with the cartons. The modular storage units 602 may contain one or more items, types of items (e.g., represented by different universal product codes or stock keeping units), etc.

Figure 3C:
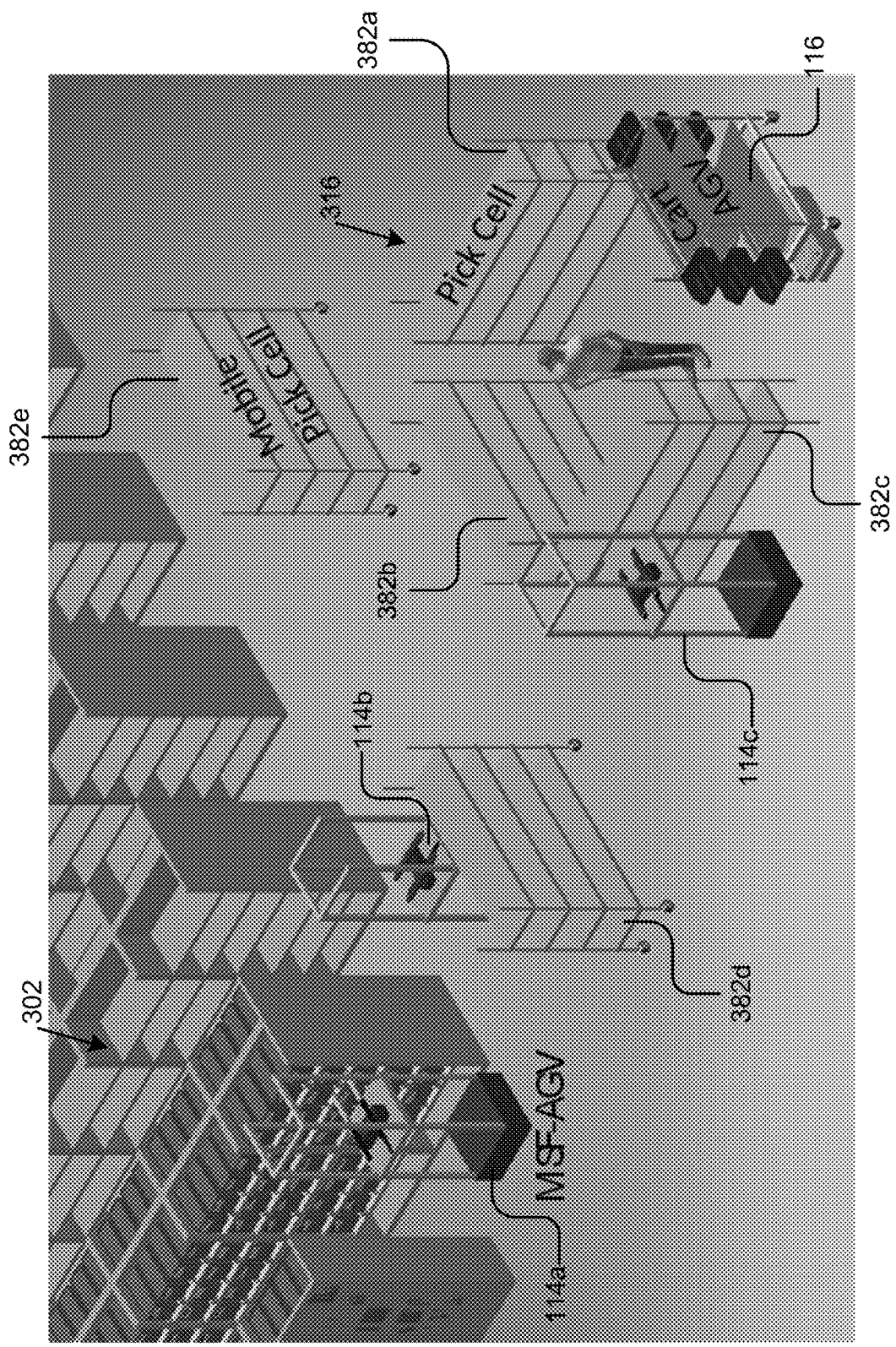
FIG. 3C is an illustration of an example pick-cell station in a distribution facility.

FIG. 3C is an illustration of an example pick-cell station 316 in a distribution facility. As illustrated, the distribution facility may include a pick-cell station 316 with stationary pick cell 382a, 382b, and 382c, one or more mobile pick cells 382d and 382e, and a plurality of AGVs 114a, 114b, 114c, and 116.

In some implementations, a pick cell 382 (e.g., 382d and 382e) may be a device that is mobile and can be transported by an AGV (e.g., a cart AGV 116). A mobile pick cell 382d or 382e can be preconfigured with modular storage units 602 prior to picking and then transported to the pick-cell station 316. For example, a particular pick-cell station 316 may accordingly fulfill orders with the items from the modular storage units 602 preconfigured or staged in one of the pick cells 382a, 382b, and 382c of the pick-cell station 316.

A first picking AGV 114a is illustrated in FIG. 3C interacting with a storage shelf in the high-density storage area 304 to retrieve a modular storage unit 602 from the storage shelf. A second picking AGV 114b is interacting with a mobile pick cell 382d, for example, to preconfigure the mobile pick cell 382d for use in a pick-cell station 316, while a second mobile pick cell 382e is in queue to be preconfigured by one or more picking AGVs 114. As illustrated in FIG. 3C, another picking AGV 114c is interacting with a pick cell 382c at a pick-cell station 316, for example to bring/retrieve a modular storage unit 602 to/from the pick cell 382c.

Figure 3D:
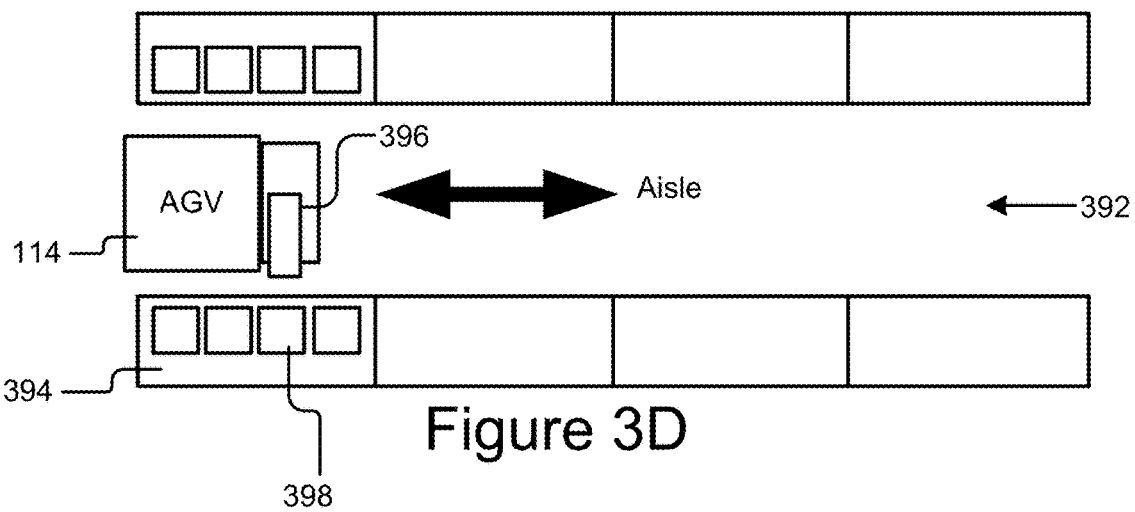
FIGS. 3D-3F are illustrations of example arrangements of storage shelves and interaction with the storage shelves by a picking automated guided vehicle.
Figure 3E:
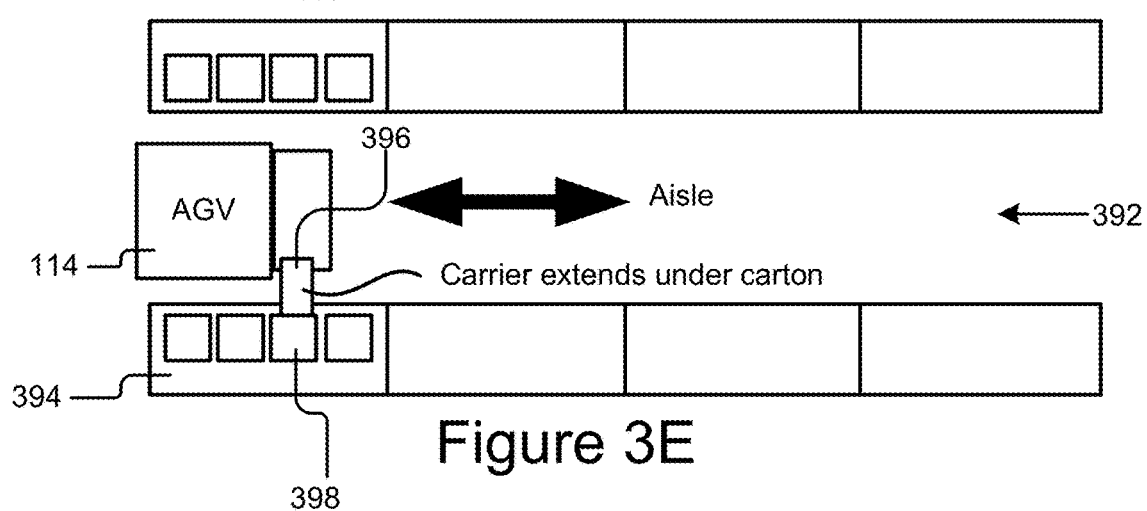
Figure 3F:
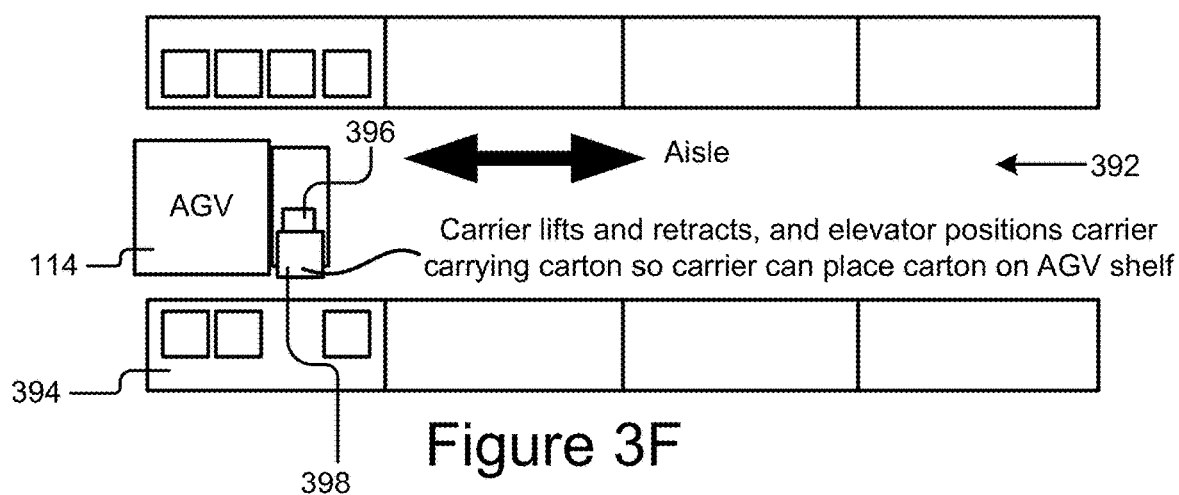

FIGS. 3D-3F are illustrations of example arrangements of storage shelves and interaction with the storage shelves by a picking AGV 114. In particular, FIGS. 3D-3F depict an example scenario in which a picking AGV 114 may move down a length of an aisle 392 flanked by shelving units (e.g., in a high-density storage area 304), may stop in front of a target storage shelving unit 394 to retrieve a container 398, such as a modular storage unit 602 or other item. While the picking AGV 114 is positioned such that the left side or the right side of the picking AGV 114 faces a face of the target shelving unit 394. One or more controllers of the picking AGV 114 may instruct an extender (e.g., the CHM 716 or a component thereof, as described elsewhere herein) to raise or lower the carrying surface 396 vertically and then move the carrying surface 396 sideways relative to the direction of movement of the picking AGV 114 (e.g., in the aisle 392) to engage with the container 398. The extender may be mountable at a proximal end to a frame of a picking AGV 114 proximate to an AGV item storage rack coupled with the picking AGV 114 and may have three or more degrees of freedom for retrieving and placing a container 398 on the item storage rack, for example, as described in reference to FIG. 7A.

For example, the picking AGV 114, may determine which storage shelf on a target storage shelving unit 394 to align a carrying surface 396 of the extender with (based on control instructions received from the REX 132), may elevate the carrying surface 396 to a height based on the height of the storage shelf or a handling mechanism of the container 398. In some instances, the picking AGV 114 may raise the carrying surface 396 toward the storage shelf and stop once a scanner (e.g., coupled with the extender or carrying surface 396) of the picking AGV 114 detects a shelf position marker (e.g., using the marker's unique identification code scanned from the marker and compared to control instructions received from the REX 132, depending on the implementation).

In some implementations, the picking AGV 114 may adjust the extender so that the carrying surface 396 may extend underneath the container 398, as illustrated in FIG. 3E. In some implementations, the extender may engage the carrying surface 396 with the container 398 on a target shelf of the target shelving unit 394. The extender may lift the container 398 off the target shelf by the carrying surface 396 until the container 398 is supported completely by the carrying surface 396, retract the carrying surface 396 and move the carrying surface 396 and container 398 (e.g., along X, Y, Z planes) from the first target shelf to a second target shelf (e.g., on a storage rack coupled with the picking AGV 114 or another target shelf in the operating environment). For instance, the extender may raise or lower the carrying surface 396 to align it with a destination AGV shelf on the an AGV rack, and then extend the carrying surface 396 toward the AGV shelf of the picking AGV 114 to set the container 398 on the destination AGV shelf. In some instances, the extender may disengage the carrying surface 396 from the container 398 once the container 398 is resting on the AGV shelf.

Figure 4A:
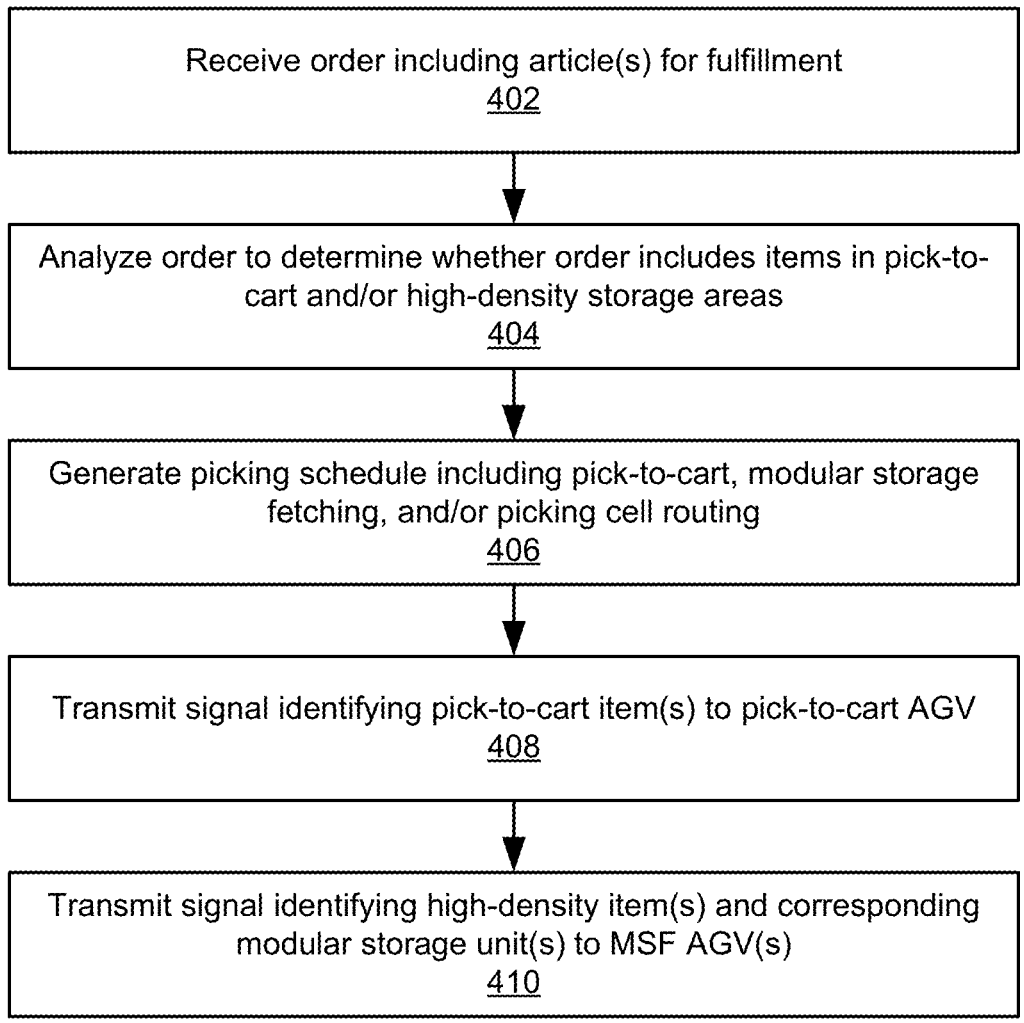
FIG. 4A is a flowchart of an example method for receiving and routing order data.

FIGS. 4A-4D are example methods for fulfilling an order in a hybrid modular storage fetching system. FIG. 4A is a flowchart of an example method for receiving and routing order data 126. At 402, the WES 102 may receive an order including items for distribution/fulfillment. The order may be reflected in order data 126 having a unique identification code (e.g., unique product codes, stock keeping units, etc.) for an item and a quantity associated with that item. The order may be assigned a carton (e.g., of a particular size, dimension, etc.) for picking and/or shipping or, in some instances, split into multiple cartons.

At 404, the WES 102 may analyze the order to determine whether the order includes items in pick-to-cart 302 and/or high-density storage areas 304. For example, a unique identification code of the items in the order may be matched against information in the data store 120 to evaluate the location (e.g., the particular zone, bay, shelf, modular storage unit 602, etc.) and quantity of the item in the inventory of the distribution facility.

At 406, the WES 102 may generate a picking schedule including pick-to-cart, MSF, and/or pick-cell routing, as described above. The generated picking schedule may indicate timing, a particular cart AGV 116 to retrieve pick-to-cart items, a particular picking AGV 114 to retrieve items in high-density storage, and a particular pick-cell station 316 in which the items from each zone may be combined in a carton. In some implementations, the picking schedule may also indicate an induction station, finalizing area 314, particular path through the distribution facility, particular pickers or operators assigned to the orders, etc.

At 408, the dispatch system 106 may transmit a signal identifying pick-to-cart items, item locations, and, in some implementations, identification of a designated pick-cell station 316 and time window for the items to be at the designated pick-cell station 316, to a cart AGV 116. It should be noted that other information, such as routing directions, priority, traffic of other AGVs, etc., may also be provided to the cart AGV 116 and/or a computing device of picker(s) associated with the cart AGV 116 to refine the routing and autonomous navigation of the cart AGV 116.

At 410, the dispatch system 106 may transmit a signal identifying high-density items, corresponding modular storage units 602, locations of the corresponding modular storage units 602, etc., to one or more picking AGVs 114 (e.g., multiple picking AGVs 114 may be employed to distribute the work of modular storage unit 602 transport). Other information such as identification of a designated pick-cell station 316 and time window for the items to be at the designated pick-cell station 316, routing directions, priority, traffic of other AGVs, modular storage unit 602 dimensions, etc., may also be transmitted in the signal to the picking AGV(s) 114.

Figure 4B:
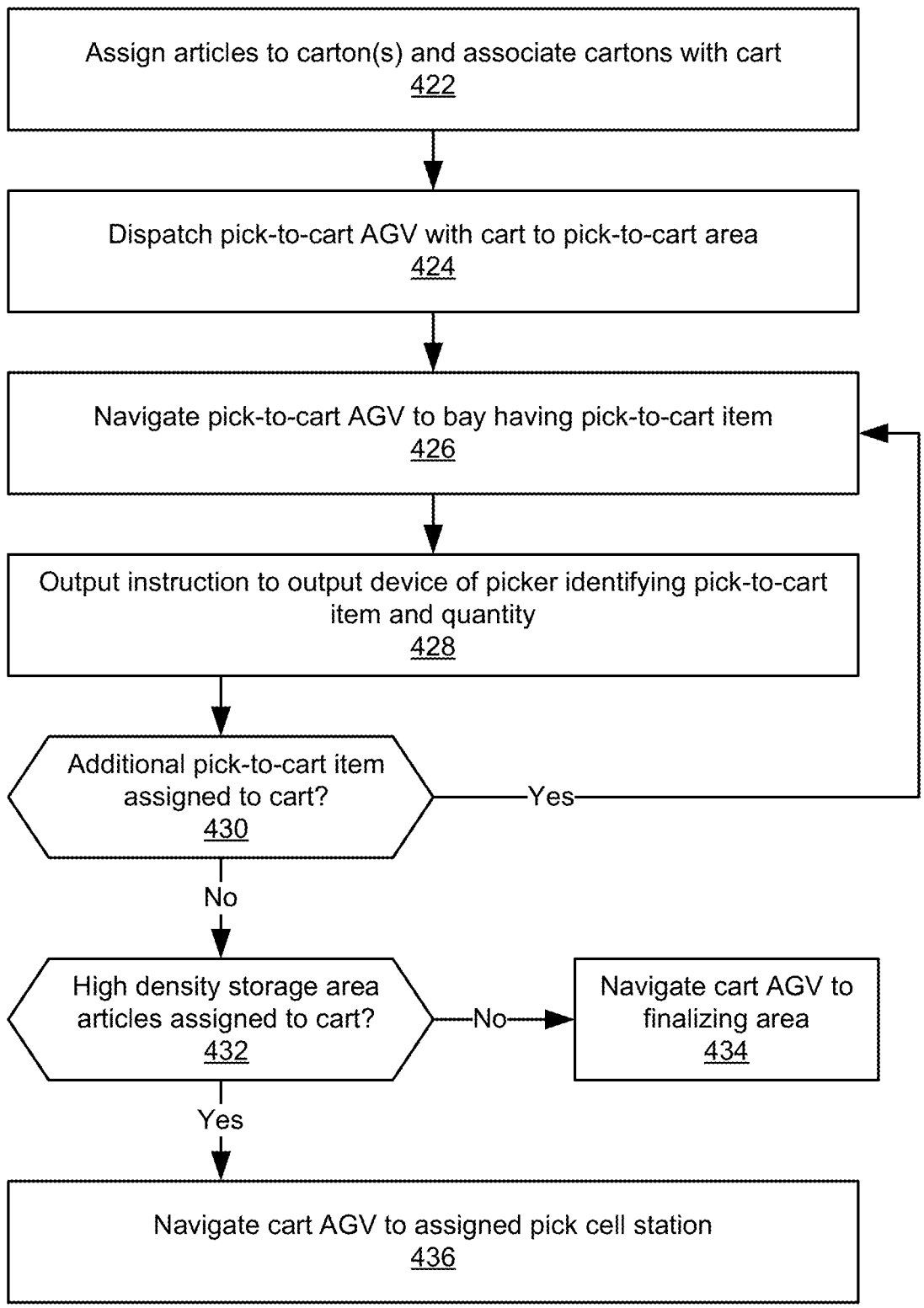
FIG. 4B is a flowchart of an example method for picking pick-to-cart items using a cart automated guided vehicle.

FIG. 4B is a flowchart of an example method for picking pick-to-cart items using a cart AGV 116. At 422, the WES 102 may assign items to carton(s) and associate the cartons with a cart in the database, and at 424, the dispatch system 106 may dispatch a cart AGV 116 with the cart to a pick-to-cart area 302, for example, as described above. In some implementations, dispatching the cart AGV 116 may include connecting a connectable cart to the cart AGV 116. For example, a cart AGV 116 may include a coupling mechanism that detachably couples the cart AGV 116 to a connectable cart. The coupling mechanism may mate with a corresponding coupling component of the connectable cart, so that when the cart AGV 116 is under or adjacent to the connectable cart, the coupling mechanism may attach the connectable cart, for instance, in response to a signal received from the dispatch system 106. The cart AGV 116 may then pull or push the connectable cart throughout an operating environment, such as the distribution facility described in reference to FIG. 3A.

At 426, the cart AGV 116 may navigate to a bay (e.g., a shelving bay) where a pick-to-cart item is stored. For example, a guidance system coupled with the cart AGV 116 may read navigation markers and follow them until a destination defined by the REX 132 (or another component of the system 100) is reached. For instance, the cart AGV 116 may stop adjacent to the location where the item is stored (e.g., in front of a storage shelving unit).

At 428, the picking system 108 may output an instruction to an output device of a picker identifying the item and quantity to be picked at that location. In some implementations, the picking system 108 may coordinate lights or screens on the cart indicating into which carton an item is to be placed and/or lights on a shelving bay/location of the item in the pick-to-cart area 302 indicating the storage location of the item. Other systems, such as audio (e.g., pick-to-voice), a mobile computing device indicating the location of the item, etc., are possible.

At 430, the picking system 108 and/or cart AGV 116 may determine whether there are additional items in the pick-to-cart area 302 assigned to the cart and, in response to determining that there is an additional item, may return to 426 to navigate to the next location of an item. In some implementations, the order of locations visited by the cart AGV 116 is based on a picking list configured to order the picking according to a designated path through the pick-to-cart area 302. In some implementations, the output, at 428, may indicate that an item at a given location is to be picked into multiple cartons (e.g., which cartons may correspond to separate orders) on the cart.

At 432, in response to a negative determination at 403, the picking system 108 may determine whether there are items in the high-density storage area 304 also assigned to one or more cartons transported by the cart AGV 116 (and/or whether the cart is scheduled to be delivered to a pick-cell station 316). At 434, if there are no items to be added to the cartons from the high-density storage area 304 (or if, for example, these items are to be added at the finalizing area 314), the cart AGV 116 may autonomously navigate to a finalizing area 314. At 436, if, however, there are additional items to be added to one or more of the cartons transported by the cart AGV 116 at a pick-cell station 316, the cart AGV 116 may autonomously navigate to an assigned pick-cell station 316 to receive those items. This may be done according to (e.g., at a time window set by) a picking schedule, in coordination with an availability at the pick-cell station 316, and/or in coordination with one or more picking AGVs 114 delivering items to the assigned pick-cell station 316 to be picked into cartons on the cart AGV 116.

Figure 4C:
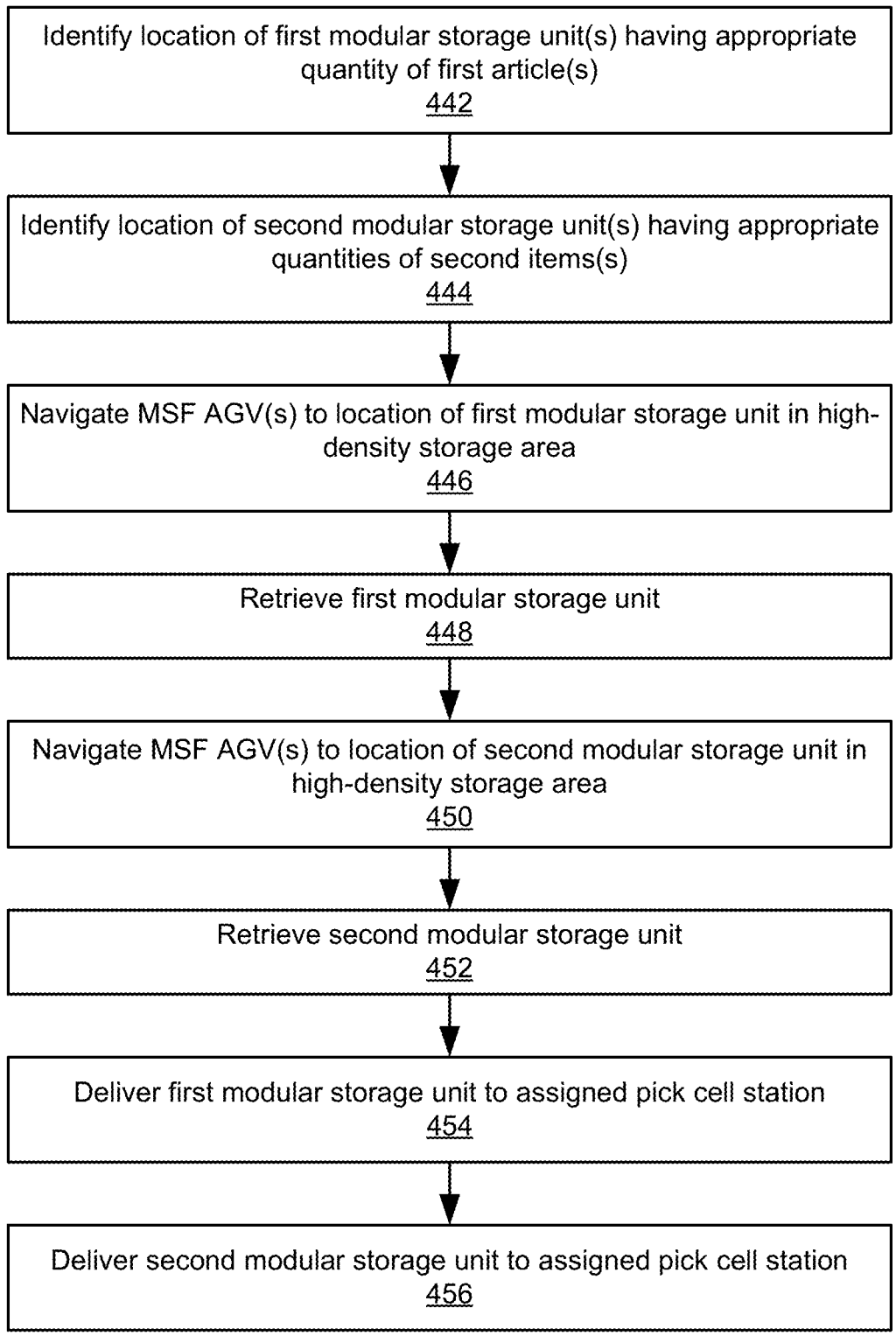
FIG. 4C is a flowchart of an example method for retrieving items in modular storage units from a high-density storage area using a modular storage fetching automated guided vehicle.

FIG. 4C is a flowchart of an example method for retrieving items in modular storage units 602 from a high-density storage area 304 using a picking AGV 114. The method depicted in FIG. 4C may be executed in coordination with the method depicted in 4B, as well as the other methods described herein.

At 442, the WES 102 may identify a location of a first modular storage unit 602 having an appropriate quantity of first items in response to receiving a signal to retrieve those items from high-density storage (or another current location of a modular storage unit 602, such as a pick-cell station 316, replenishment area 318, etc.). As described above, the quantity of particular items stored in a modular storage unit 602 and the current location (and, in some instances, schedule of future locations) of the modular storage unit 602 are stored in the data store 120. In some implementations, a particular carton, order, or plurality of orders assigned to a cart may require multiple of a particular item. The WES 102 may verify that a sufficient quantity of the item is located in a particular modular storage unit 602 prior to signaling a picking AGV 114 to retrieve the particular modular storage unit 602. If a particular modular storage unit 602 does not have a sufficient quantity of an item to fill all designated cartons, the picking AGV 114 may retrieve a different modular storage unit 602 (e.g., having a sufficient quantity of the item), multiple modular storage units 602, or may send an error for a replenishment system/area, a human operator, or other system to remedy the error.

At 444, the WES 102 may identify a location of second modular storage unit(s) 602 having appropriate quantities of second item(s). A set of cartons transported by a cart AGV 116 may include any number of different items to be retrieved from high-density storage by a picking AGV 114.

At 446, the picking AGV(s) 114 (e.g., multiple picking AGVs 114 may be used) may autonomously navigate to a location of a first modular storage unit 602 in a high density storage area, and at 448, the picking AGV 114 may retrieve the first modular storage unit 602 (e.g., as described in reference to FIGS. 7A-7I).

At 450, a picking AGV 114 may then autonomously navigate to a location of a second modular storage unit 602 in the high-density storage area 304 and retrieve a second modular storage unit 602 (e.g., according to the method described in FIG. 2B). The path of a picking AGV 114 may be determined to efficiently retrieve each modular storage unit 602. Additionally, the particular modular storage unit 602 (e.g., when multiple modular storage units 602 have a certain item) may be selected based on the most efficient location for the picking AGV 114 to retrieve and/or proximity to an assigned pick-cell station 316.

At 454, the picking AGV 114 may autonomously deliver the first modular storage unit 602 to a pick-cell station assigned for the first modular storage unit 602 and, at 456, the picking AGV 114 may autonomously deliver the second modular storage unit 602 to a pick-cell station 316 assigned for the second modular storage unit 602. In some implementations, the pick-cell station 316 for the first and second modular storage units 602 may be the same pick-cell station 316. In some implementations, the pick-cell stations 316 for the different storage units may be different. For example, a picking AGV 114 may deliver a first modular storage unit 602 to a first pick-cell station 316 and then autonomously navigate to a second pick-cell station 316 to deliver the second modular storage unit 602.

Figure 4D:
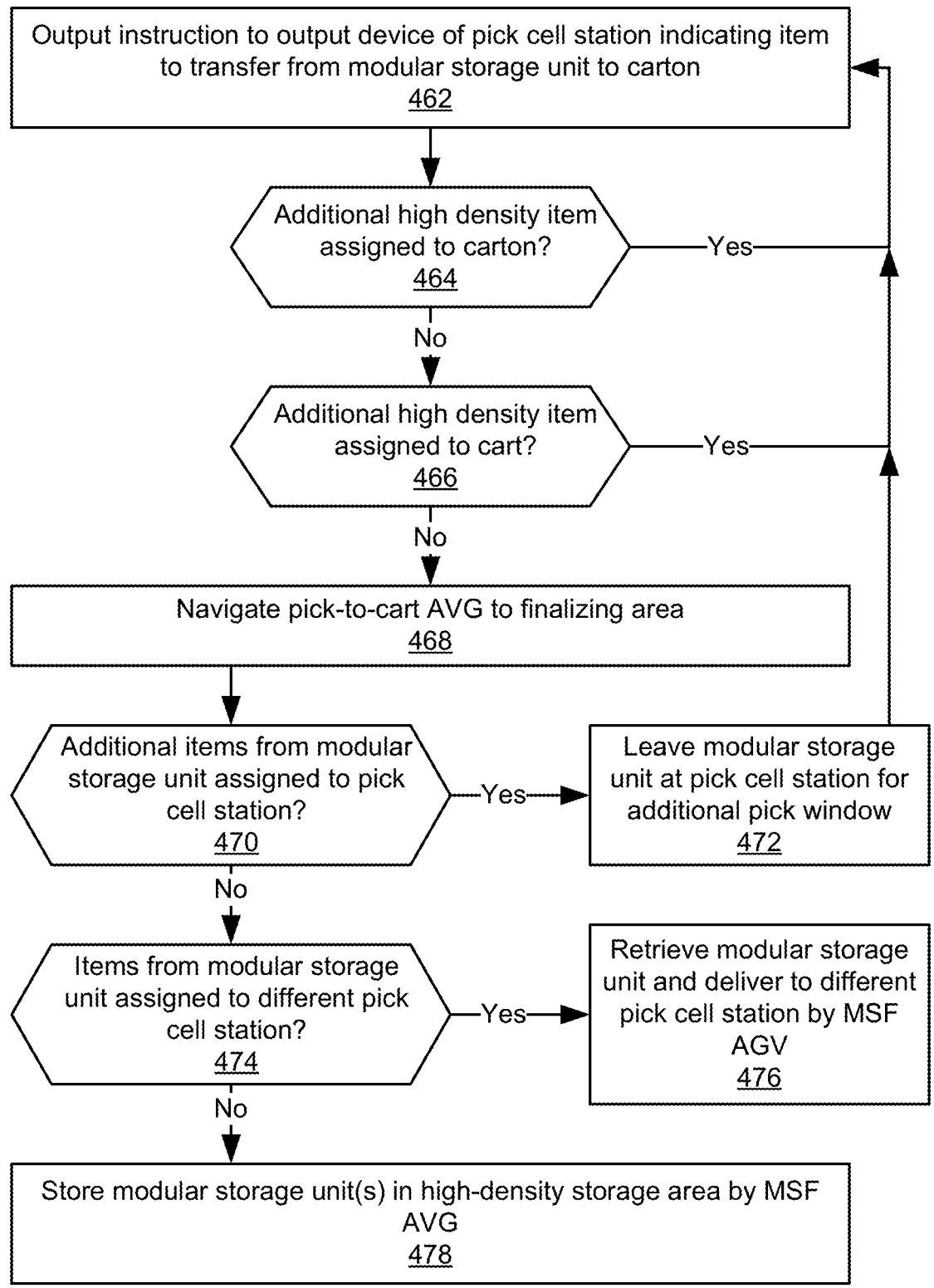
FIG. 4D is a flowchart of an example method for combining items from different zones of the distribution facility at a pick-cell station.

FIG. 4D is a flowchart of an example method for combining items from different zones of the distribution facility at a pick-cell station 316. Once the cart AGV 116 has transported the cartons to the pick-cell station 316 and the picking AGV(s) 114 have transported the modular storage units 602 to the pick-cell station 316, the picking system 108 (or another component) may output, at 462, instructions to an output device of a pick-cell station 316 indicating an item to transfer from a modular storage unit 602 to a particular carton. In some implementations, the output device or another computing device may also receive confirmatory input indicating that the item has been placed in a designated carton.

At 464, the picking system 108 determines whether there are additional items from the modular storage units 602 at the pick-cell station 316 assigned to a particular carton. If there are addition items to be picked for a carton, the method may return to 462 for the next item assigned to a carton. If there are no more items to be picked for a particular carton, the picking system 108 may determine, at 466, whether there are additional items from modular storage units 602 assigned to the set of cartons in the cart (e.g., brought by the cart AGV 116 to the particular pick-cell station 316). If there are additional items for additional cartons, the method returns to 462 for those cartons and items and iterates accordingly. It should be noted that the order of the picking, output, confirmation, etc., process, may be changed without departing from the scope of this disclosure.

If the picks for a set of cartons on a cart are complete at the pick-cell station 316, at 468, the cart AGV 116 may autonomously navigate to a finalizing area 314, for instance, where the cart AGV 116 may decouple from the connectable cart and the cartons on the connectable cart may be shipped either manually or by a machine for closing the cartons and removing them from the cart.

A picking AGV 114 may move one or more of the modular storage units 602 from the pick-cell station 316. For example, at 470, a picking system 108 may determine whether additional items from a particular modular storage unit 602 are assigned to the pick-cell station 316 in a subsequent picking window (e.g., for a subsequent cart AGV 116 arriving at the pick-cell station 316). If the modular storage unit 602 (e.g., items remaining in the modular storage unit 602) will be used again at the pick-cell station 316, at 472, the modular storage unit 602 may be left at the pick-cell station 316 for an additional pick window.

At 474, the WES 102 or picking system 108 may determine whether items from a particular modular storage unit 602 are assigned to a different pick-cell station 316 in a subsequent pick window and, if so, at 476, may direct the picking AGV 114 to retrieve the modular storage unit 602 from the current pick-cell station 316 and deliver it to the different pick-cell station 316.

At 478, the picking AGV 114 may retrieve one or more modular storage unit(s) 602 from the pick-cell station 316, autonomously navigate to a location in the high-density storage area 304, and store the modular storage unit 602 at that location. The locations at which the modular storage units 602 are stored may be determined based on availability, proximity to a pick-cell area 310, proximity to frequently co-ordered items, frequency with which the items in the modular storage units 602 are retrieved, or any other schema.

In some implementations, if all of a particular item in a modular storage unit 602 have been picked from the modular storage unit 602 (e.g., it is empty), then the picking AGV 114 may autonomously deliver the modular storage unit 602 to a replenishment area 318.

Figure 5B:
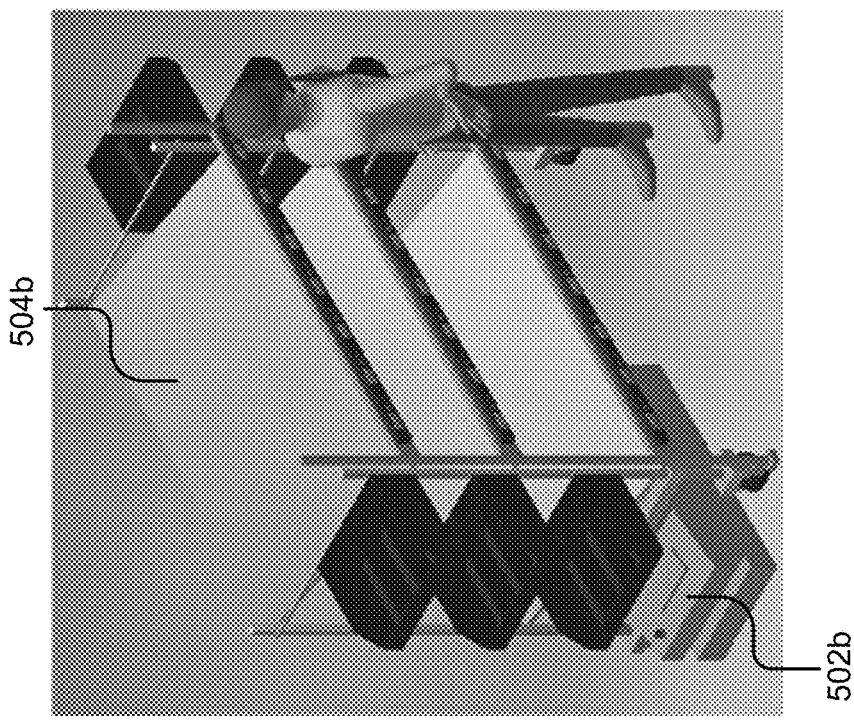
FIGS. 5A and 5B are illustrations of example cart automated guided vehicles.
Figure 5A:
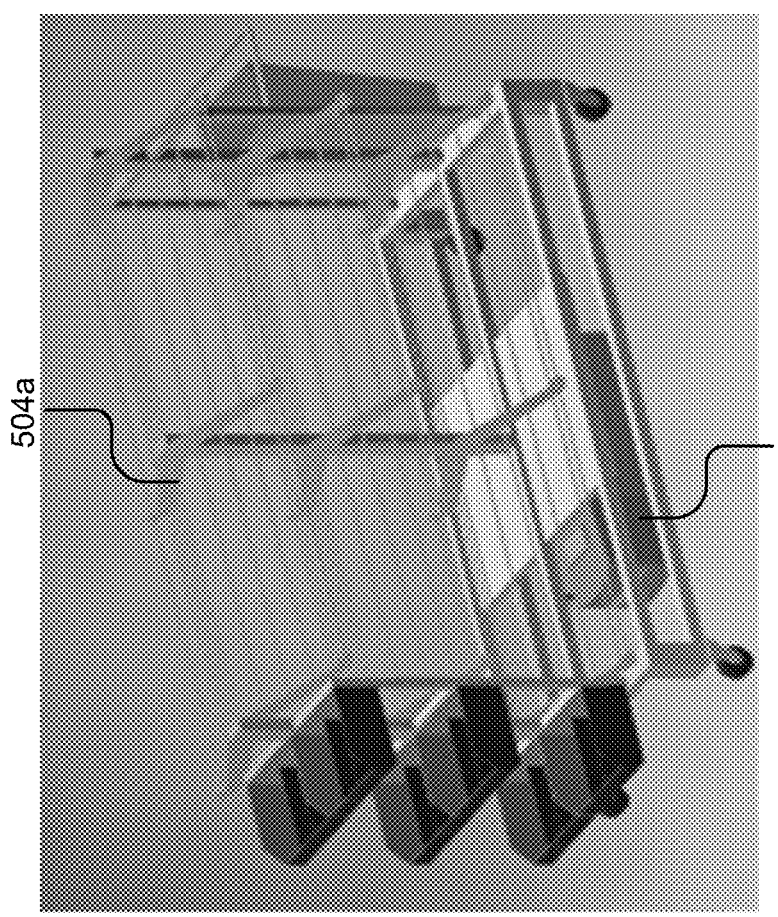

FIGS. 5A and 5B are illustrations of example cart AGVs 502a and 502b (e.g., also referred to herein as 116). The example cart AGVs may include a cart AGV 502 or robot configured to autonomously transport pick-to-cart items, as described above. The cart AGV 502 may include or be adapted to autonomously transport a carton holder 504a or 504b (e.g., a cart or shelves) that is adapted to hold cartons (not shown in FIG. 5A or 5B). For example, a cart AGV 502 may push/pull a carton holder 504. In some implementations, a carton may be a box placed on a shelf of the carton holder 504.

As illustrated in FIGS. 5A and 5B, the cart AGV 502 may include a substantially rectangular body and may include or be couplable to a connectable cart having shelves (e.g., the carton holder 504a or 504b). The cart AGV 502 may couple to a connectable cart via a coupling mechanism and matching coupling component (e.g., a latch mechanism coupling the cart AGV 502 to the connectable cart). In some instances, the shelves may be angled for easy loading of cartons to be filled with picked items.

In some implementations, the cart AGV 502 may also include a guidance system that may detect, for instance, a human picker associated with the cart AGV 502 (e.g., via a tracking device on the picker, optical recognition, etc.), determine the picker's position, and reposition itself automatically based on the picker's position by comparing the cart AGV's 502 position and the picker's position, and a pre-determined offset (e.g., a distance in front of, behind, and/or next to the picker). This advantageously allows the cart AGV 502 to follow the picker.

Figure 5C:
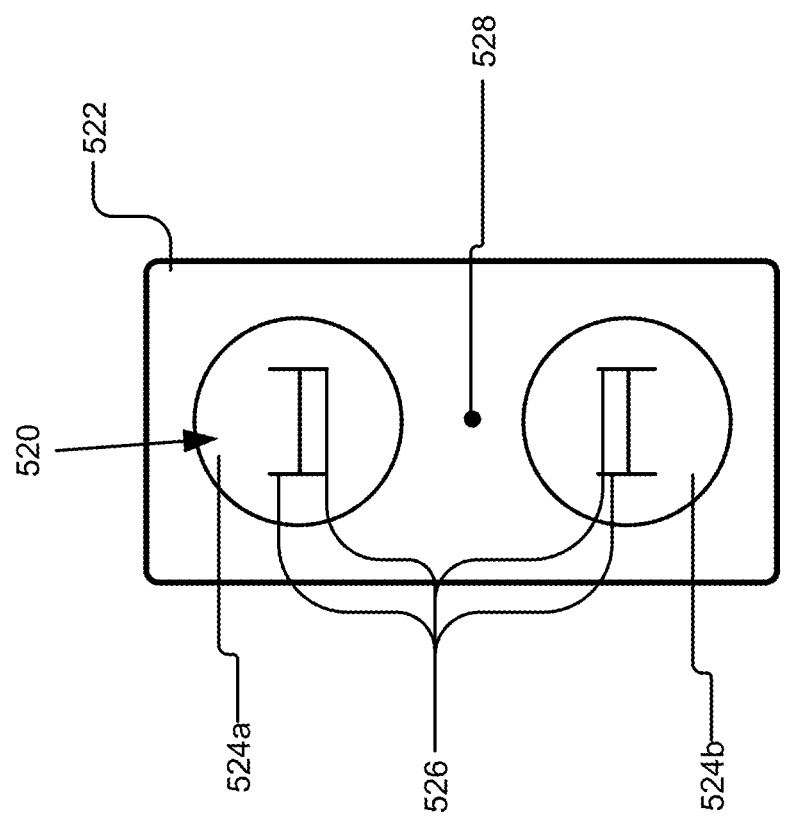
FIGS. 5C and 5D are illustrations of example automated guided vehicle drive units.
Figure 5D:
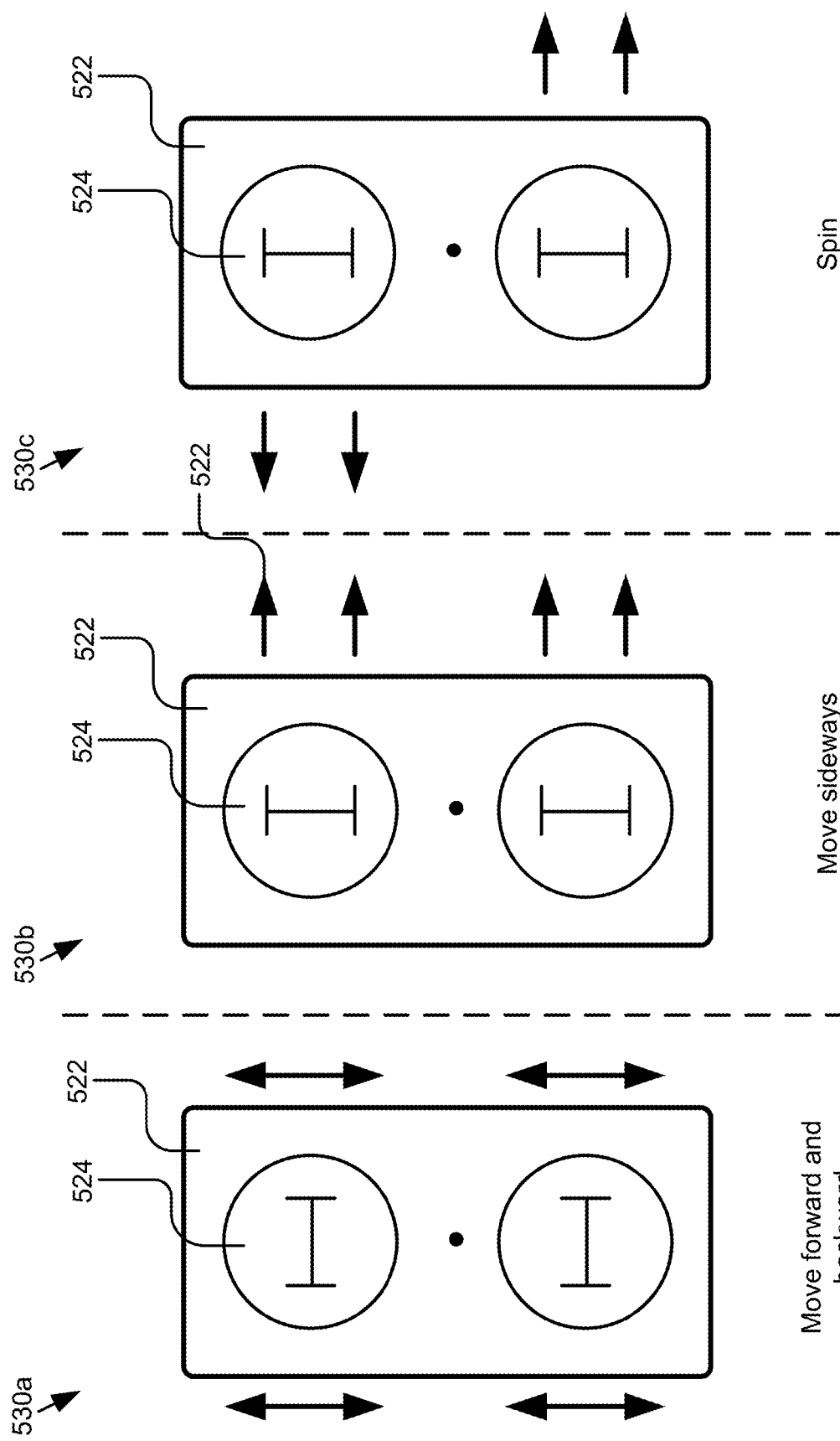

FIGS. 5C and 5D are bottom-up illustrations of example AGV drive units 520. FIGS. 5C and 5D illustrate an example AGV 522, which may represent a cart AGV 116 or, in some instances, a picking AGV 114. For instance, FIGS. 5C and 5D depict example wheel configurations of a cart AGV 116 and freedom of movement allowed by the AGV drive units 520.

A drive unit 520 of the AGV 522 may include one or more turntables 524a and 524b coupled to a bottom surface of the AGV 522 and one or more drive motors coupled to the turntables 524. The turntables 524 may each include wheels 526 coupled to drive motors. For instance, the AGV 522 may include two turntables 524a and 524b each of which include one or more drive motors, each of the drive motors coupled to one or more wheels 526, tracks, treads, etc. In some implementations, the wheels 526 may be located proximate the corners of the frame, etc., to provide stability to the AGV 522 or may include additional casters, for example, to provide additional stability to the AGV 522.

The turntables 524 may be motorized and coupled to a controller of the AGV 522 allowing the wheels 526 to rotate (e.g., 90 degrees, 360 degrees, more than 360 degrees), depending on the implementation. For instance, the wheels 526 may pivot about a center of a turntable 524. Further, the wheels 526 may pivot collaboratively to spin the AGV 522 around the center axis 528 and/or maneuver the AGV 522 along essentially any X, Y trajectory (forward, backward, sideways, etc.).

FIG. 5D illustrates three situations, 530a, 530b, and 530c, showing example movement of the AGV 522 using the example drive units 520. The arrows illustrated next to the AGV 522 in each of 530a, 530b, and 530c show the direction of travel of the wheels 526 of the AGV 522. In 530a, both of the turntables 524 of the example AGV 522 are rotated, so that the wheels 526 are aligned along a front-back direction (depending on the configuration of the AGV 522), which allows the AGV 522 to move forward or backward. In 530b, the turntables 524 are rotated 90 degrees from the front-back direction, so that when the wheels 526 on both turntables 524 move the same direction, the AGV 522 moves sideways relative to the front-back direction. In 530c, the turntables 524 are rotated 90 degrees from the front-back direction, but the wheels 526 are illustrated as moving in opposite directions, thereby causing the AGV 522 to rotate about the center axis 528.

Figures 6A, 6B:
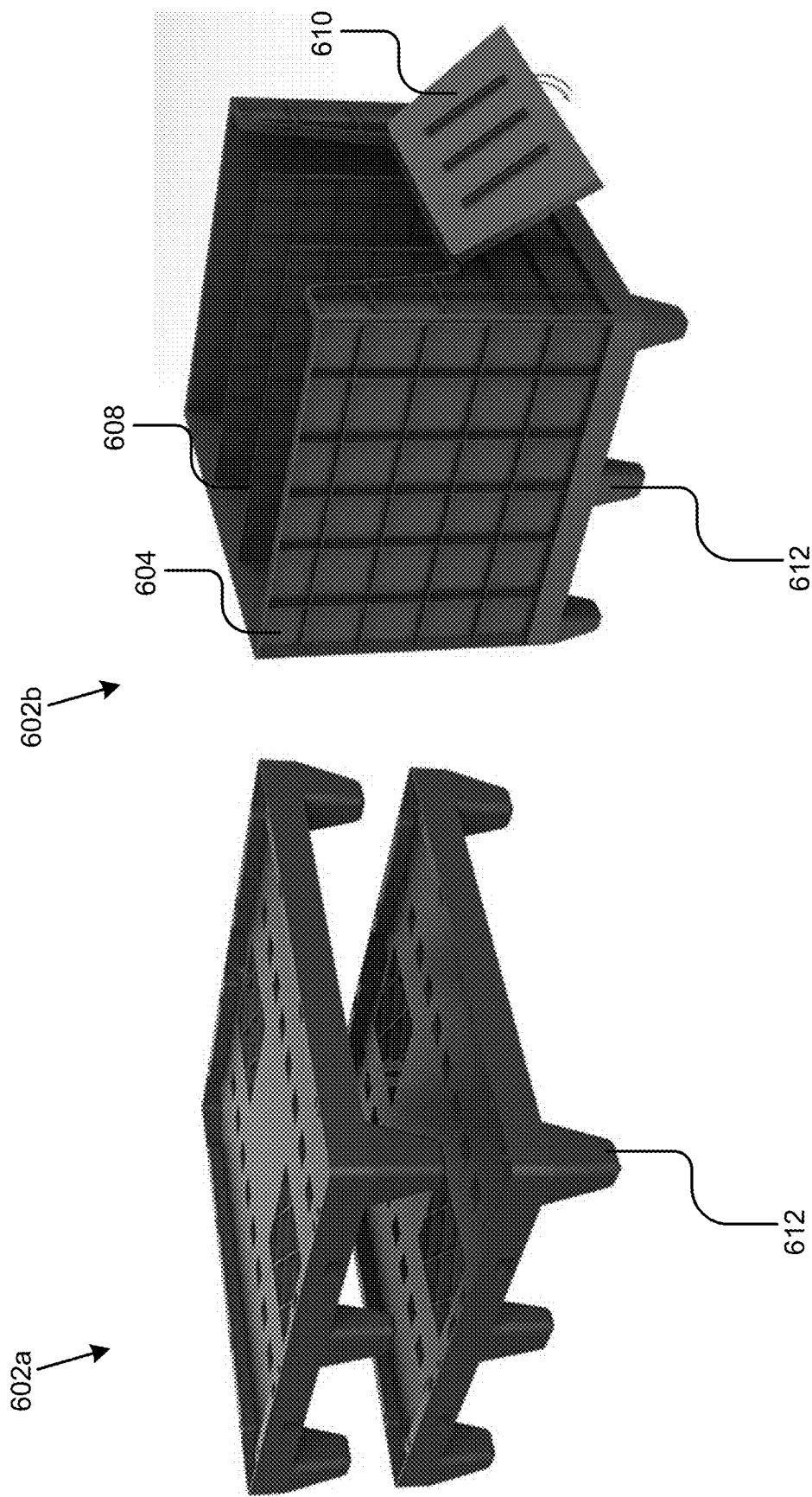
FIGS. 6A-6B are illustrations of example modular storage units.

FIGS. 6A-6B are illustrations of example modular storage units 602a and 602b (also referred to herein as modular containers). In some implementations, the modular storage units 602 are containers or sets of containers that may be moved between storage shelves, pick cells 382, etc. Modular storage units 602 may have various heights and widths (e.g., 2 to 24 inches high, and 1, 2, or 4 feet wide) and depths equal to the depths of shelving units (e.g., 18 to 24 inches). For example, the modular storage units 602 may be sized and configured to hold items commonly stocked in a fulfillment or distribution facility while also fitting onto standard shelves. A modular storage unit 602 may include a holding structure (e.g., a pallet as in 6A or a container as in 6B) adapted to hold items. The holding structure may be adapted to interface with a CHM 716 and carrying surface 396 (e.g., a fork 720) of a picking AGV 114.

As illustrated in FIG. 6A, a modular storage unit 602a may comprise a pallet or tote, which may be a holding vessel to support items designed to be picked up by a picking AGV 114 using its CHM 716. For example, a modular storage unit 602a may include a pallet and a holding structure that supports items designed to be picked up by an AGV with forks or another carrying surface 396. In some implementations, a pallet may be stackable. In some implementations, a pallet may be attachable to a container to form a modular storage unit 602 such as the example depicted in FIG. 6B.

FIG. 6B illustrates another example modular storage unit 602b. As illustrated, a modular storage unit may include sides 604 and one or more divisions 608 dividing the modular storage unit 602b into multiple compartments. Further, in some implementations, a modular storage unit 602b may include a door 610, which may be opened and closed by a picker to provide easy access to items stored in the compartments. In some implementations, a picking AGV 114 may automatically position the door 610 toward the center of a pick-cell station 316 to allow access by a picker.

In some implementations, a modular storage unit 602 may include supports 612 that hold the modular storage unit 602 on a shelf, so that a carrying surface 396 of the CHM 716 may slide under the modular storage unit 602 to pick the modular storage unit 602 up, as described elsewhere herein. In some implementations, a modular storage unit 602 may include a handling component that interacts with a carrying surface 396 of a picking AGV 114 to remove the modular storage unit 602 from a storage shelf. The handling component may be positioned on bottom, top, side, or front of the modular storage unit 602. For example, a handling component may include a latch, French cleat, slots or arms for receiving prongs of the carrying surface 396 (e.g., a fork 720), a bottom surface, indentation(s), preconfigured channel(s), or other structures or formations that may be used by the carrying surface 396 to support the modular storage unit 602. Accordingly, a carrying surface 396 of a picking AGV 114 may be compatibly engageable with the coupling portion of the modular storage unit 602 to lift the modular storage unit 602 from a first target shelving unit, retain the modular storage unit 602 during handling, and place the modular storage unit 602 on a second target shelving unit.

FIGS. 7A-7J are illustrations of example picking AGVs 702a, 702b, 702c, 702d, and 702f (the picking AGVs 702a-702f are example implementations of the picking AGV 114 described elsewhere herein). The example picking AGVs 702a-702f may reach and retrieve different sizes of modular storage units 602 (e.g., pallets, totes, containers, or other items, etc.) from different levels of storage shelves using a CHM 716 and a carrying surface 396.

Figure 7A:
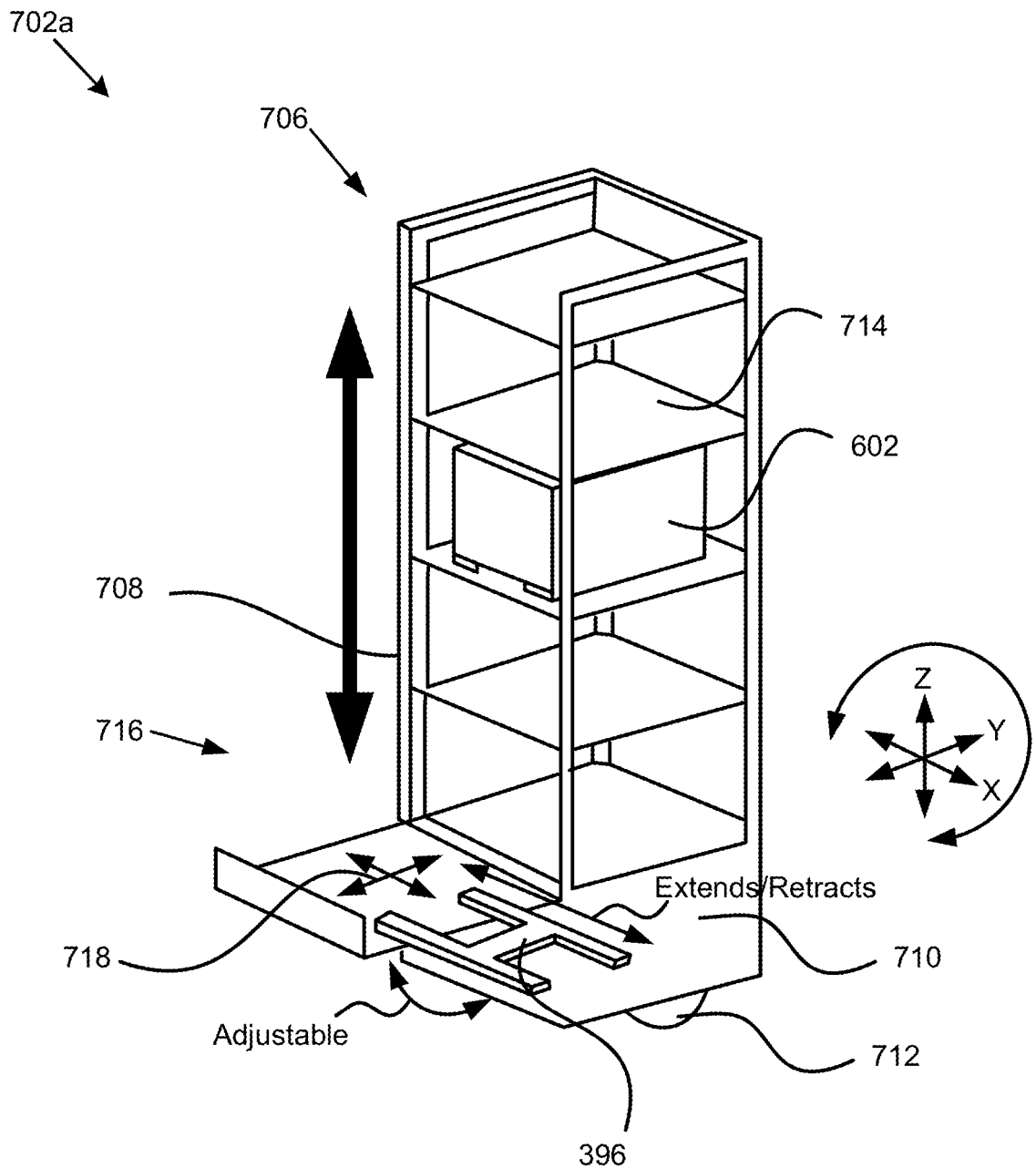
FIGS. 7A-7J are illustrations of example picking automated guided vehicles.

FIG. 7A depicts an example picking AGV 702a, which may include an AGV body 710, a drive unit 712 housed within or coupled to the body 710, a power source (not shown) housed within or coupled to the body 710, an AGV item storage rack 706 with one or more AGV shelves 714, a CHM 716, a carrying surface 396, a guidance system (not shown), and one or more controllers (not shown), although other configurations are possible and contemplated herein. For instance, the example picking AGVs 702b-702f may include one or more of the components described in reference to the picking AGV 702a and/or the picking AGV 702a may include one or more of the components described in reference to picking AGVs 702b-702f.

The body 710 may include a front, a rear opposing the front, a left side extending from the front to the rear, and a right side opposing the left side and extending from the front to the rear. While various shapes and construction materials to the body 710 are possible, the body 710 may be configured to fit between rows of storage shelving in a high-density storage area 304. The body 710 may be configured to house a drive unit 712, power source, controller, and/or other components of the picking AGV 702a.

The drive unit 712 may be coupled to the body 710 and configured to receive power from the power source to provide motive force to the picking AGV 702a and propel the picking AGV 702a within an operating environment. In some implementations, the drive unit 712 may receive instructions from one or more controllers instructing the drive unit 712 to cause the picking AGV 702a to move forward, backward, sideways, turn, or perform another movement. In some implementations, the drive unit 712 may include electric motors and wheels, although other configurations, such as treads are possible. For example, the drive unit 712 may be configured as illustrated in FIGS. 5C and 5D.

The drive unit 712 may be wirelessly coupled via a controller to a wireless interface and a wireless communications network to receive control signals from the dispatch system 106 and/or other components of the system 100. In some implementations, the drive unit 712 may be controlled as described in elsewhere herein, which may be executed using a distributed computing system comprising AGVs, servers, controllers, etc., for example, as shown in the system depicted in FIG. 1.

The power source may be coupled to the components of the picking AGV 702a to provide power to the components, for example, the power source may provide power to the CHM 716, the drive unit 712, a controller, or another component of the picking AGV 702a. The power source may include a battery, a wire, contact track in the operating environment, induction charger, alternator or gas generator, etc.

Some implementations of the picking AGV 702 may include an AGV item storage rack 706 (also referred to as AGV rack 706), such as illustrated coupled with the example picking AGVs 702a-702c. While the AGV rack 706 is illustrated as coupled to the top of the body 710, other configurations are possible, for example, the AGV rack 706 may be coupled in front of, behind, to the side of, or even towed or pushed by the picking AGV 706. The AGV rack 706 may be positioned proximate to the CHM 716, so that the shelves 714 are within reach of the CHM 716 for the CHM 716 to place items on the shelves 714.

The AGV rack 706 may include a single shelf 714 or a plurality of shelves 714 coupled to a frame. The shelves 714 may include flat surfaces, bays, containers, or other mechanisms for holding a modular storage unit 602 or other item. At least one of the shelves 714, where equipped, is capable of storing the item during transit of the picking AGV 702a.

The plurality of shelves 714 may be vertically arranged and, in some implementations, one or more of the shelves 714 may have an adjustable height (e.g., adjusted manually or automatically using a motor coupled with the picking AGV 702a) on the AGV rack 706. In some implementations, a controller of the picking AGV 702a may determine a current height of a particular shelf of the plurality of shelves 714, for example, using an optical scanner or retrieving a stored height of an the particular shelf from a database (e.g., on the data store 120). For example, one or more of the shelves 714 may include a marker readable by an optical scanner coupled with the CHM 716 or carrying surface 396 to indicate to the CHM 716 a location or identification of the a particular shelf. In some implementations, a controller of the picking AGV 702a may store a shelf identifier for a shelf 714 in association with a height or size of the shelf 714, or an identifier of an item or modular storage unit 602 stored on the shelf 714.

In some implementations, a shelf 714 onto which an item is placed may be selected based on the size, height, weight capacity, or other attributes of the shelf 714. For example, a modular storage unit 602 of a given size may be placed on a shelf 714 having a corresponding size. In another example, a modular storage unit 602 having a threshold weight may be placed on a lower shelf 714 of the AGV rack 706 than a modular storage unit 602 having a lighter weight than the threshold.

The container handling mechanism or CHM 716 may include an extender for extending a carrying surface 396 from a picking AGV 702 to a storage shelving unit that is separate from the picking AGV 702. The CHM 716 may have three or more degrees of freedom to move the carrying surface 396 along three or more axes thereby allowing the CHM 716 to retrieve an item from a first target shelving unit using the carrying surface 396 and the three or more degrees of freedom and place the item on a second target shelving unit, as described in further detail in reference to FIG. 2B.

In some implementations, the CHM 716 may include a mast having an elevator 708 coupled with the body 710 and/or AGV rack 706. The elevator 708 lifts and lowers a platform 718 supporting a carrying surface 396. The elevator 708 moves the CHM 716 along a Z axis to lift and set down the container.

In some implementations, the platform 718 extends or retracts the carrying surface 396 horizontally between the picking AGV 702a and a storage shelving unit. In some implementations, the platform 718 may also extend or retract the carrying surface 396 into or out of one or more of the AGV shelves 714 to place an item on one of the AGV shelves 714. The CHM 716 includes a moveable platform 718 having a carrying surface 396 capable of translating along a plane in two or more dimensions and/or rotating about a vertical axis. For example, the platform 718 (or other component of the CHM 716, depending on the implementation) may translate the carrying surface 396 along any X and Y coordinates (e.g., sideways/left and right relative to the front of the picking AGV 702a; forward and backward relative to the front of the picking AGV 702a; etc.). This allows the CHM 716 to retrieve an item from a storage shelf and move it to and place it on an AGV shelf 714 supported by the frame, and vice versa. The CHM 716 may be adjustable to translate between an X axis, Y axis, a combination, etc.

In some implementations, the platform 718 may comprise two platforms coupled to one another, a first of which moves along a first horizontal axis and a second of which moves along a second horizontal axis perpendicular to the first horizontal axis. For instance, the first platform may be coupled with the elevator 708 and the second platform, so that the first platform may move the second platform along the first horizontal axis. The second platform may be coupled with the first platform and the carrying surface 396, so that the second platform may move the carrying surface 396 along the second horizontal axis.

The CHM 716 may be capable of moving items between the different shelves 714 in the AGV rack 706, one or more storage shelving units in a high-density storage area 304, one or more pick cells 382 in a pick-cell station 316, and, in some instances, to or from other target shelves (e.g., in an induction area 308, replenishment area 318, etc.).

In some implementations, the picking AGV 702a may include a scanner coupled with the carrying surface 396, platform 718, etc., that can read signatures or markers to determine location. For example, the scanner may be an optical scanner configured to read visual identifiers (e.g., labels including a QR code, bar code, etc.) to determine which shelf 714 the CHM 716 or the carrying surface 396 is aligned with. The optical scanner may scan a shelf marker on one or more of the AGV shelf 714 or a detached storage shelf. The shelf marker may indicate a position and/or identification code of shelves and/or modular storage units 602, for example.

In some implementations, the elevator 708 may include positional sensors to determine the position of CHM 716 and/or align the carrying surface 396 with a target shelf (whether an external or integrated with the picking AGV 702a).

The carrying surface 396 may be coupled to or integrated with the CHM 716 and is configured to support a modular storage unit 602 or other item. In some implementations, the carrying surface 396 is connected at a distal end of the CHM 716 or extender. The carrying surface 396 may be movable by the CHM 716 vertically parallel relative to a face of the AGV rack 706, perpendicularly relative to the face of the AGV rack 706, and horizontally parallel relative to the face of the AGV rack 706. The carrying surface 396 may be extendable by the CHM 716 using the three or more degrees of freedom to retrieve a certain item or modular storage unit 602 from a separate shelving unit located within reaching distance of the CHM 716 and retractable using the three or more degrees of freedom to place the certain item on one of the AGV shelves 714 of the AGV rack 706.

In some implementations, the carrying surface 396 may be adapted to interface with a modular storage unit 602, as described in reference to FIG. 2B. For example, the carrying surface 396 is compatibly engageable with a handling component of the modular storage unit 602 to lift the modular storage unit 602 from the separate shelving unit, retain the modular storage unit 602 during handling, and place the modular storage unit 602 on the one of the shelves 714 of the AGV rack 706.

In some implementations, the carrying surface 396 may include forks 720, such as those depicted in FIGS. 7D-7J, which are designed to engage with a corresponding support structure (e.g., the handling component or supports 612) of the modular storage unit 602. The carrying surface 396, including the forks 720, may be made of any material, such as plastic or metal, which is sufficiently strong to support a modular storage unit 602 or other item.

The picking AGV 702a may include a guidance system that determines a location of the picking AGV 702a within the operating environment. For instance, the guidance system may include one or more sensors that detect and process navigation markers (e.g., QR codes, RFID labels, etc.) to locate the picking AGV 702a as the picking AGV 702a traverses the operating environment. The guidance system may be coupled to a controller of the picking AGV 702a, which may, in some instances, include local object detection intelligence and processing to avoid collision with other objects (e.g., AGVs, humans, items, storage shelving units, etc.) in the operating environment.

The picking AGV 702a may include one or more controllers coupled with the guidance system, CHM 716, drive unit 712, dispatch system 106, etc., to perform the operations described herein. For instance, the one or more controllers may receive a signal from the REX 132 (e.g., via the dispatch system 106) and signal the drive unit 712 to propel the picking AGV 702a. The one or more controllers may communicate with the guidance system to determine a location of the picking AGV 702a within the operating environment and, using the drive unit 712, navigate through the operating environment. The one or more controllers may receive a signal from the REX 132 indicating to retrieve a particular item from a target storage unit, in response to which, the one or more controllers may instruct the drive unit 712 to position the CHM 716 adjacent to the target shelving unit using the current location determined by the guidance system and then direct the CHM 716 to retrieve the item, for example, as described in reference to FIG. 2B.

Figure 7C:
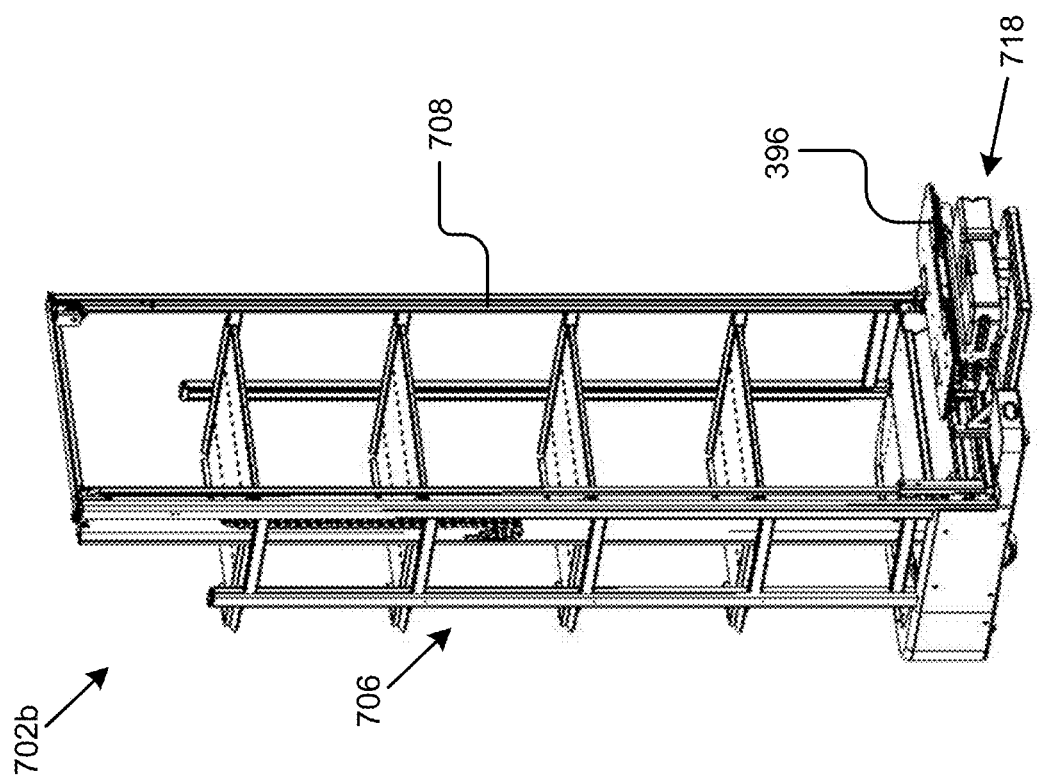
Figure 7B:
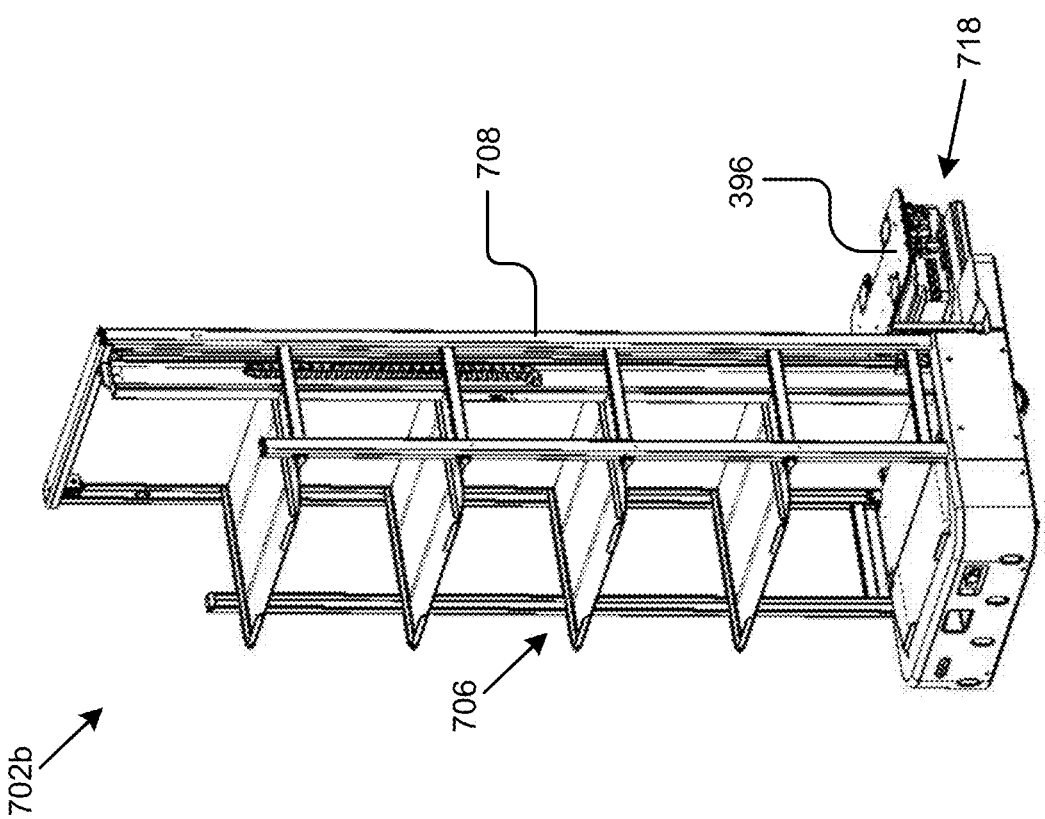
Figure 7D:
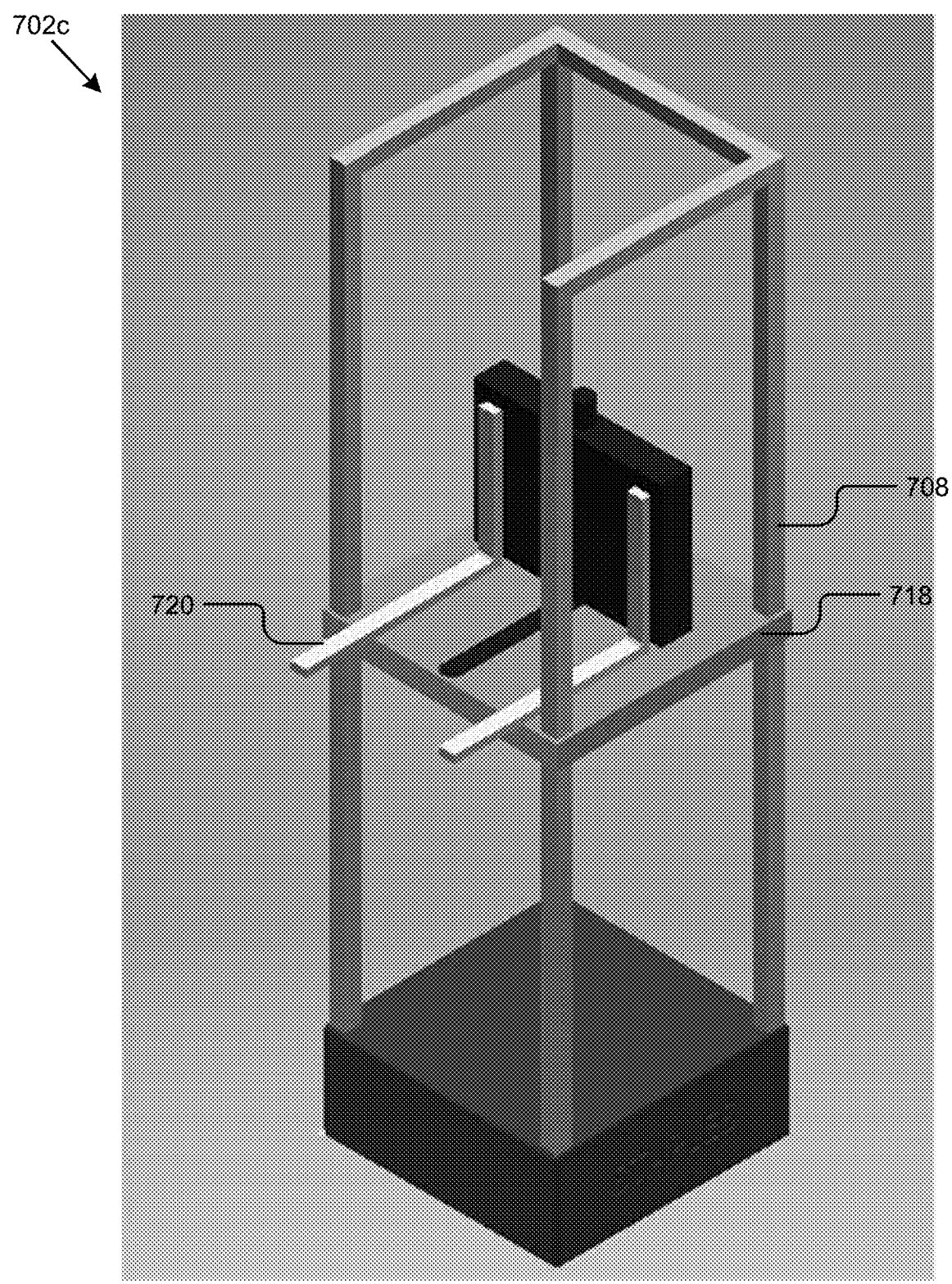

FIGS. 7B and 7C illustrate another example picking AGV 702b. As illustrated, the picking AGV 702b may include an AGV item storage rack 706 with a plurality of shelves arranged vertically. The CHM 716 of the picking AGV 702b may also include a mast having an elevator 708 and a platform 718, which may be raised or lowered using the elevator 708. The platform 718 may extend the carrying surface 396 along a first direction toward the AGV rack 706 or, perpendicularly to the first direction, toward a storage shelving unit adjacent to the picking AGV 702b.

Figure 7E:
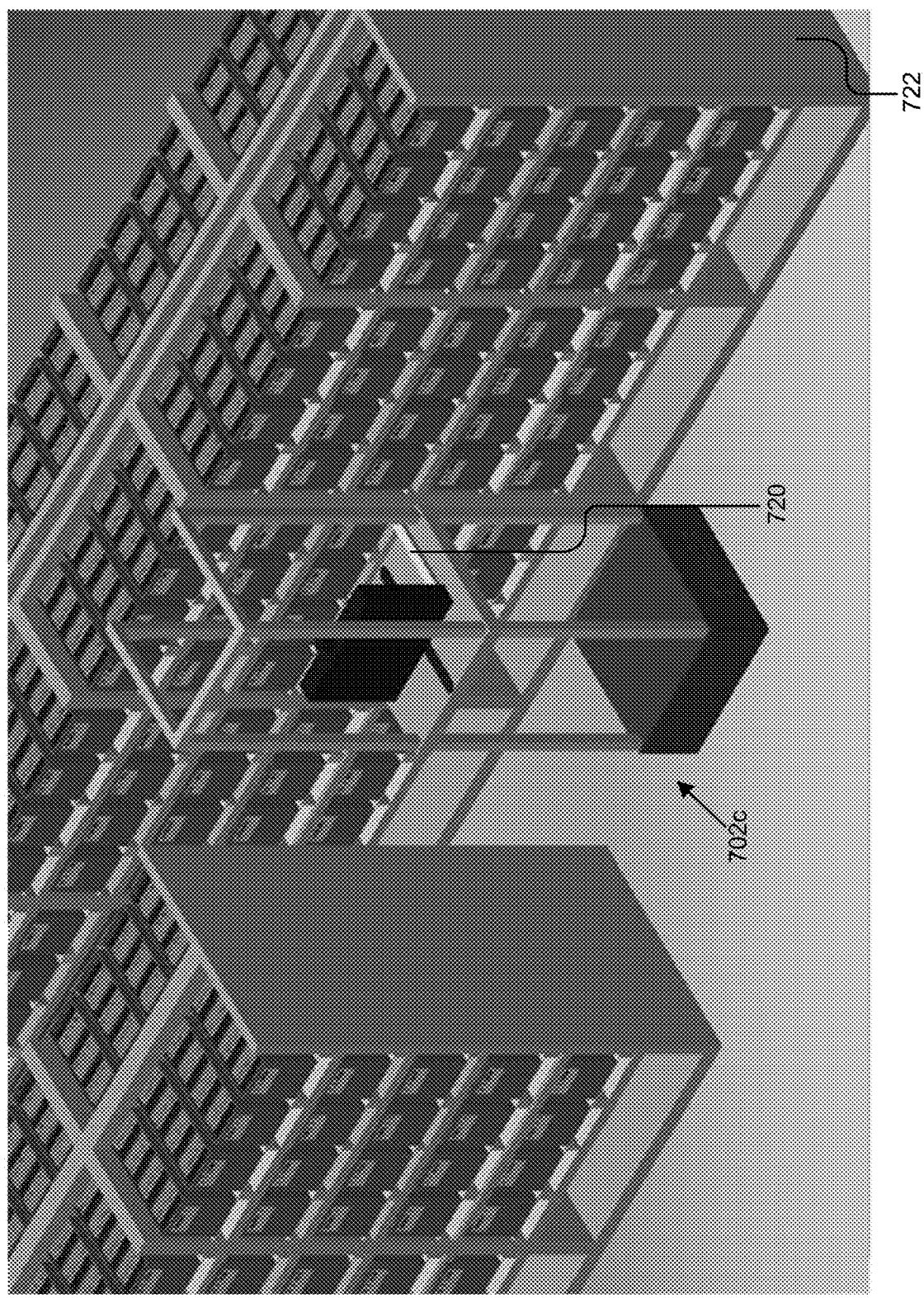
Figure 7G:
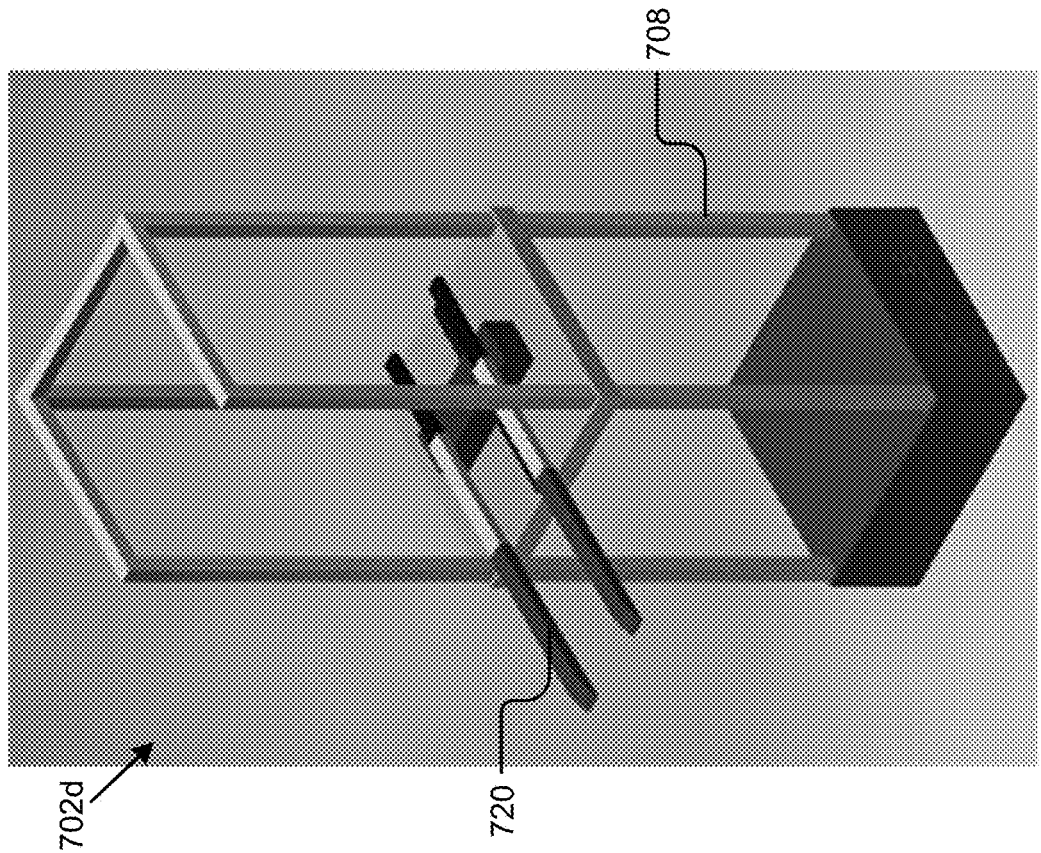
Figure 7F:
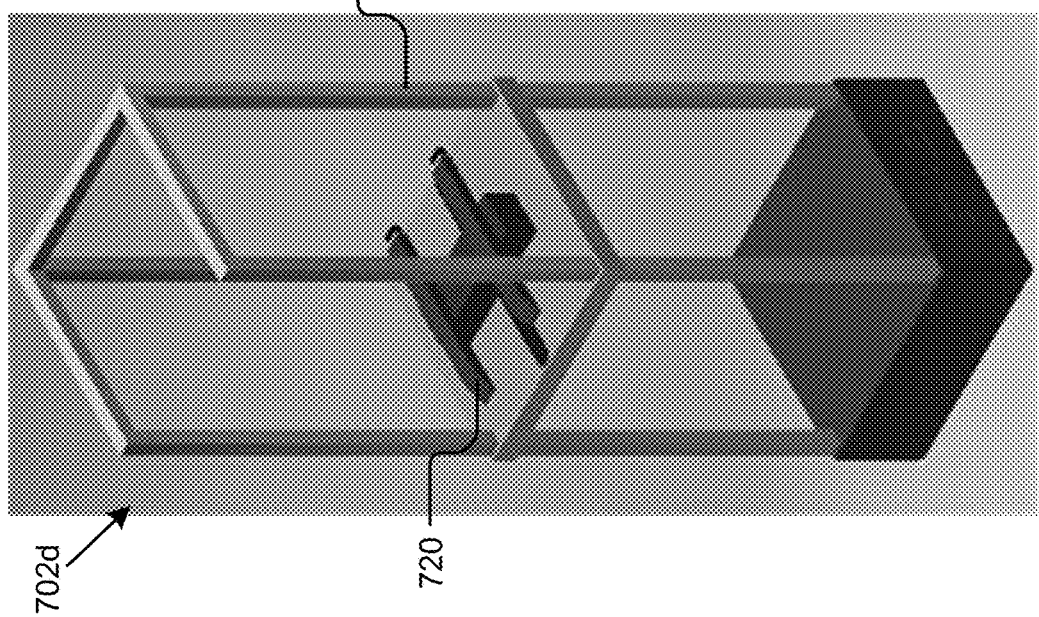

The example picking AGVs 702c and 702d depicted in FIGS. 7D-7G may include an elevator 708 that raises or lowers a platform 718. The example platform 718 of the picking AGV 702c may support a carrying surface 396 in the form of forks 720. The forks 720 may extend outward from the picking AGV 702c to interface with a modular storage unit 602 in a shelving unit 722, as illustrated in FIG. 7E, and may be retractable, so the forks 720 may be placed at any desired height and maneuvered underneath a modular storage unit 602 and to lift the modular storage unit 602 from a shelving unit 722 during extraction of the modular storage unit 602 from the shelving unit 722.

In some implementations, the platform 718 may be configured to rotate a carrying surface 396, such as the forks 720 so that the forks 720 may extend or be extended about a horizontal plane, as described above. For instance, the forks 720 may extend and then retract along a first horizontal axis to retrieve a modular storage unit 602, as described above. Once the forks 720 have retracted, the platform 718 may rotate the forks 720, so that they may be extended along a second horizontal axis, for example, to place the modular storage unit 602 on an AGV shelf.

Figure 7H:
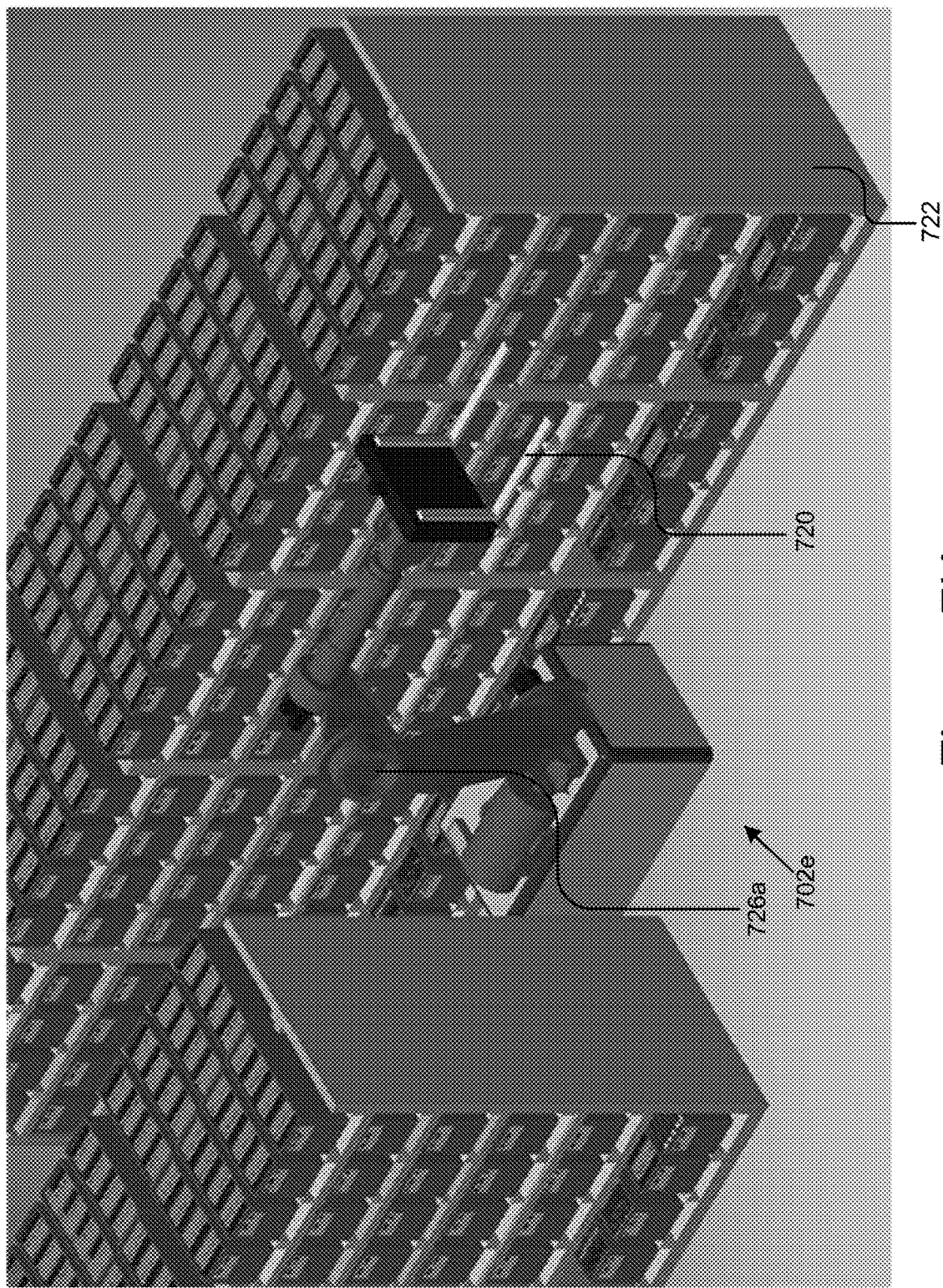
Figure 7I:
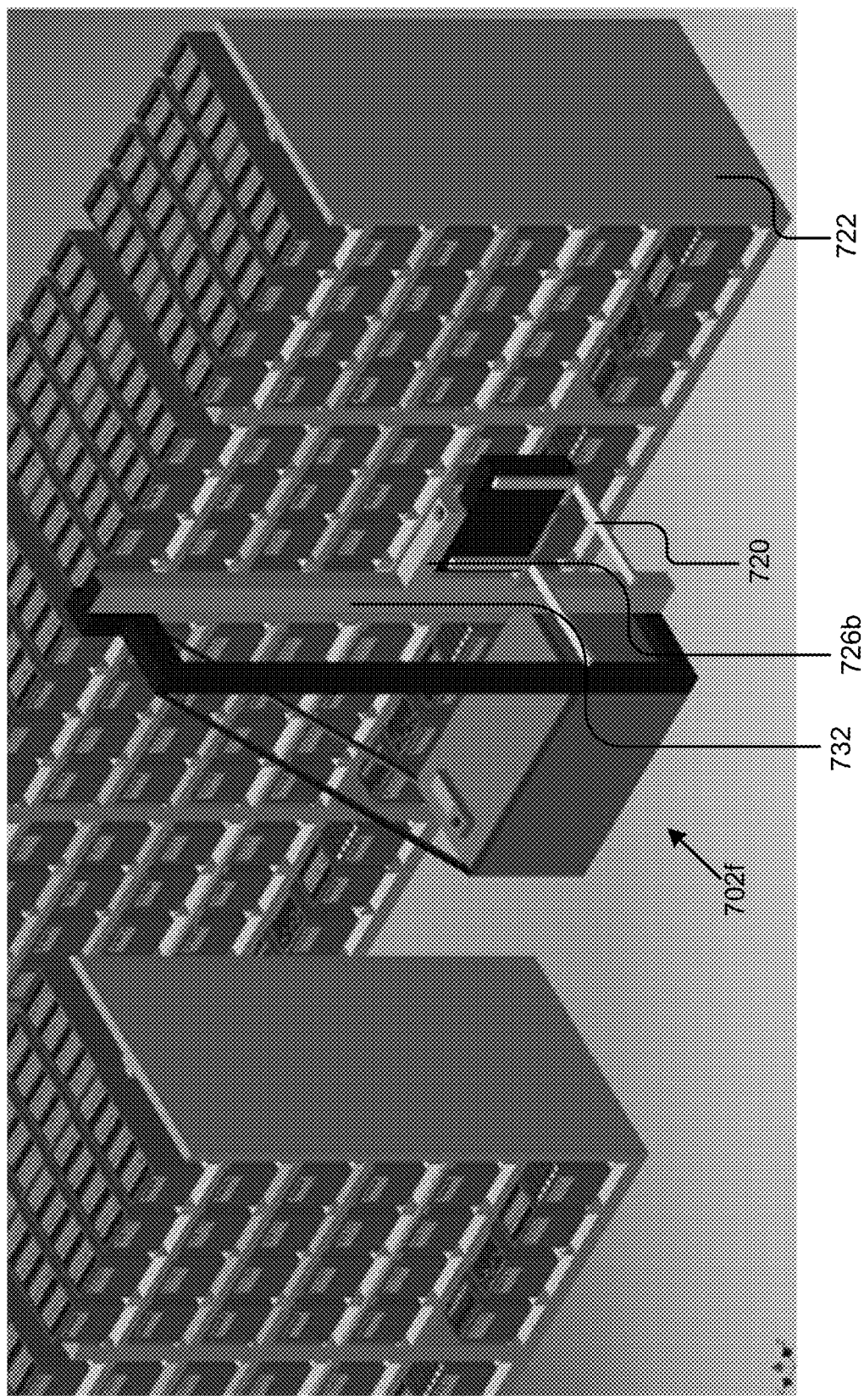
Figure 7J:
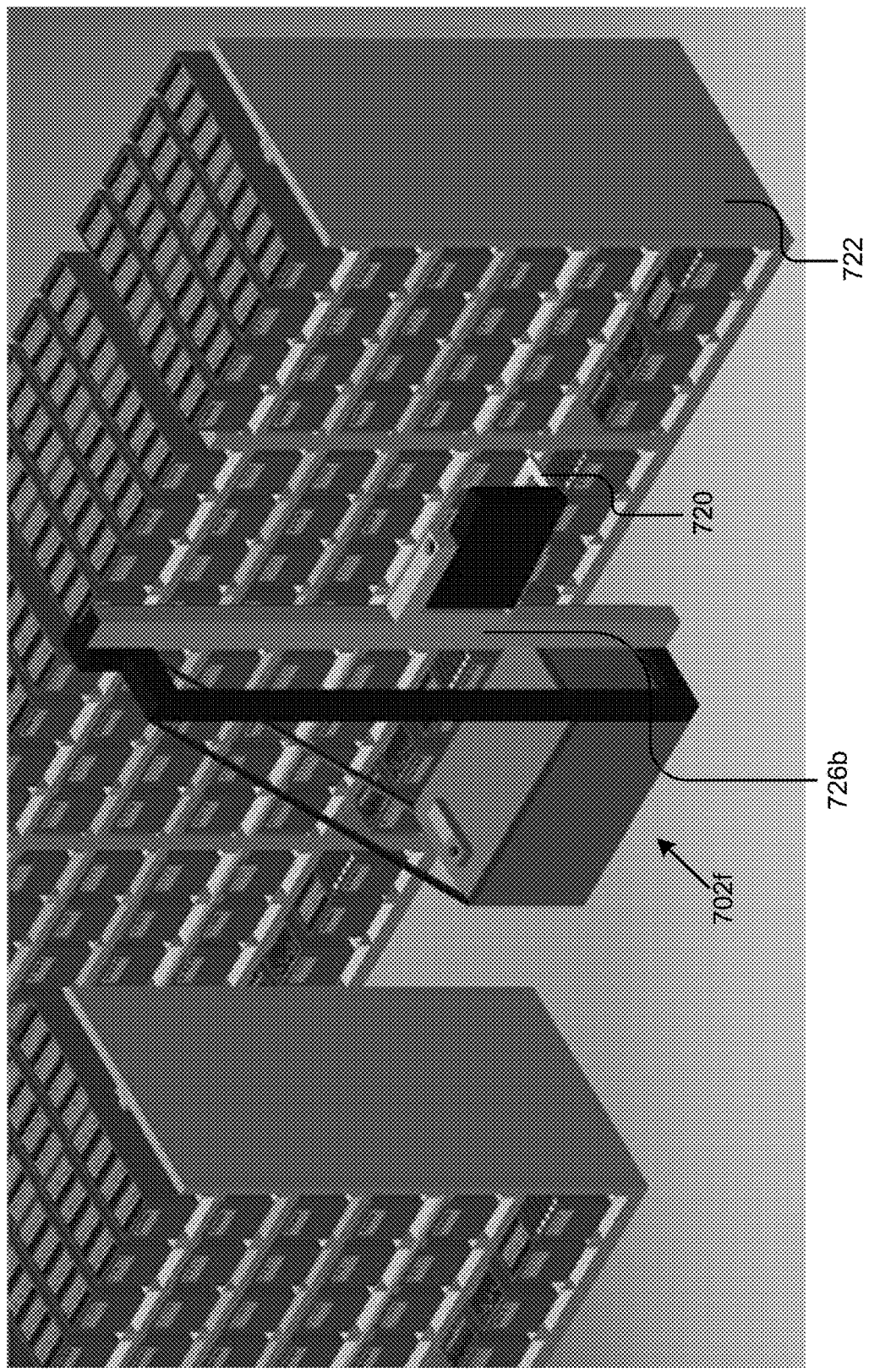

As illustrated in FIGS. 7H-7J, the CHM 716 may include a robotic arm 726 or 726b, which moves a carrying surface 396, such as the forks 720 illustrated in FIGS. 7H-7J. The robotic arm 726 may pivotable or otherwise articulable to extend the forks 720 underneath a modular storage unit 602 in order to lift the modular storage unit 602 from a shelving unit 722. In some implementations, such as is illustrated in FIG. 7I, a CHM 716 of the picking AGV 702f may include a mast coupling an elevator 708 to the picking AGV 702f. The elevator 708 may raise or lower the robotic arm 726 to interact with various shelves of a shelving unit 722.

Although the example picking AGVs 702c-702f, are not illustrated as including AGV shelves, it should be noted that they may include AGV shelves, as described elsewhere herein, depending on the implementation.

Figure 8:
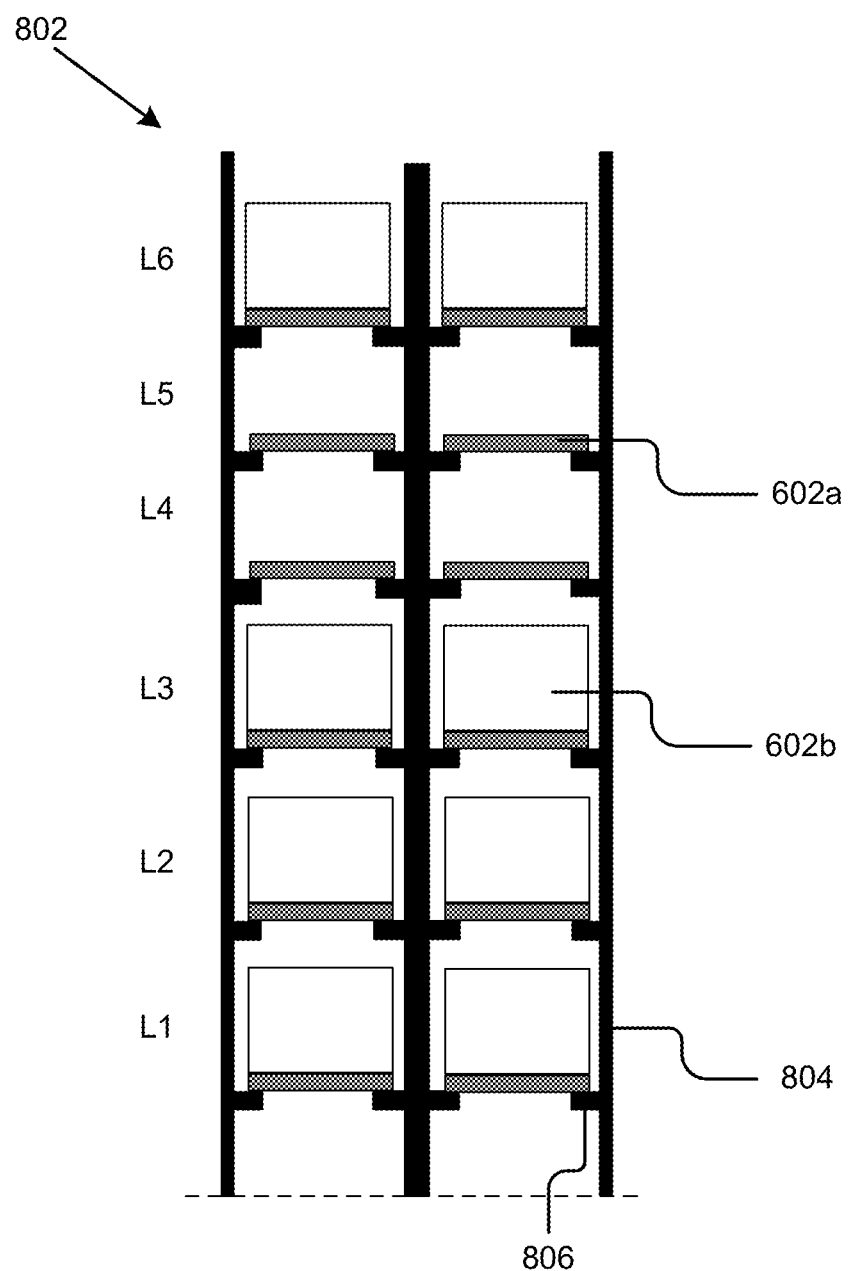
FIGS. 8 and 9 are illustrations of example modular storage units on storage shelving units.

FIG. 8 is an illustration of example modular storage units 602a and 602b on storage shelving units 802. As illustrated in FIG. 8, a modular storage unit 602 may have a flat or other shaped bottom which may be configured to rest on a shelf, such as the partial shelf 806 illustrated in FIG. 8.

In some implementations, the storage shelving unit 802 may include one or more support members 804, such as poles, beams, planks, etc., which are attached to and provide support to partial shelves 806. For instance, the a partial shelf 806 may extend only partially underneath the modular storage units 602, so that a carrying surface 396 may more easily fit under the modular storage unit 602 to lift the modular storage unit 602 from the partial shelf 806, as described elsewhere herein.

In some implementations, the storage shelving unit 802 may include several partial shelves 806 vertically arranged on the support members 804 in order to create a plurality of levels of the storage shelving unit 802 from which modular storage units 602 can be retrieved by a picking AGV 114.

Figure 9:
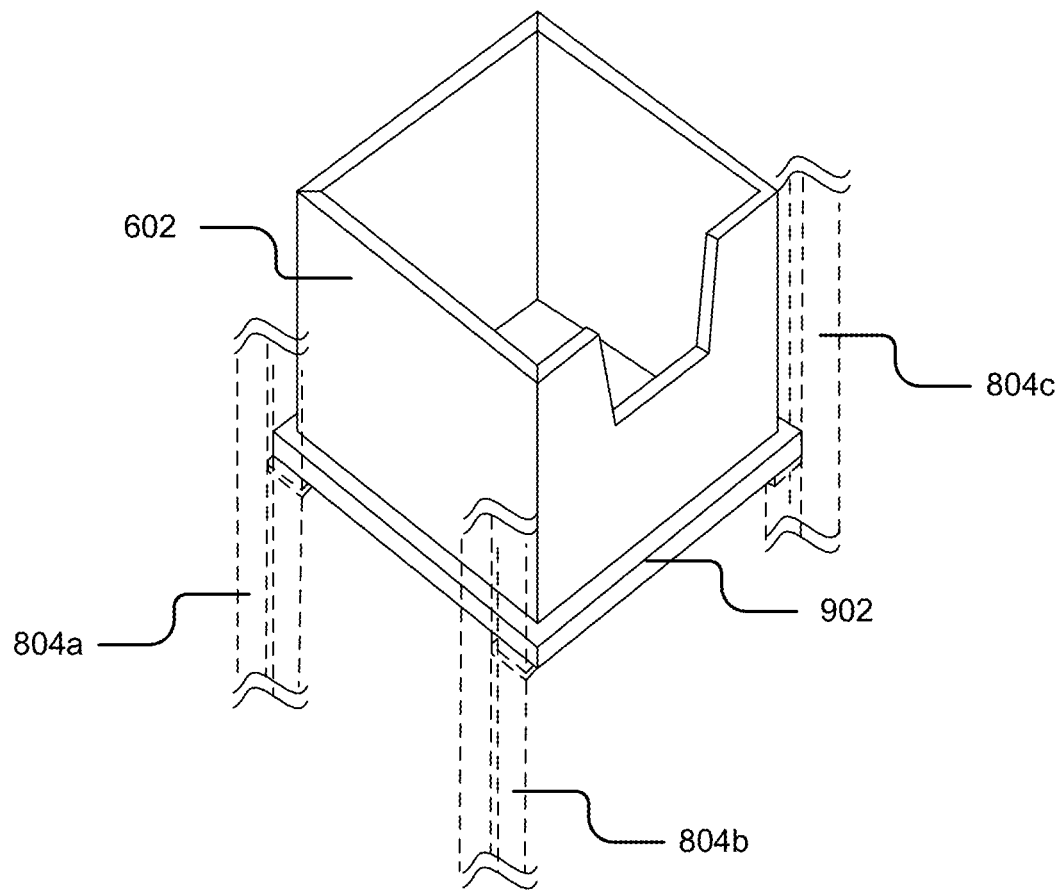

FIG. 9 is an illustration of an example modular storage unit 602 supported by support members 804a, 804b, and 804c (e.g., a fourth support member 804 may be hidden in FIG. 9). In some implementations, a partial shelf 806 may be attached to a single support member 804 or may extend between two or more support members 804. For instance, as illustrated in FIG. 9, a partial shelf 806a, 806b, and 806c (e.g., a fourth support member 804 may be hidden in FIG. 9) may be attached to each of the support members 804a, 804b, and 804c and may be configured to each support a corner of the modular storage unit 602, for example.

In the depicted implementation, the modular storage unit 602 includes a base member 902. The base member 902 may be attached to or integrated with the modular storage unit 602 and may extend between the partial shelves 806 to support the modular storage unit 602 when the modular storage unit 602 is stored in the storage shelving unit 802.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. An automated guided vehicle (AGV) comprising:
a drive unit that provides motive force to propel the AGV within an operating environment;
a container handling mechanism (CHM) including a horizontal platform and a carrying surface, the CHM having three or more degrees of freedom to move the carrying surface along three or more axes, the CHM retrieving an item from a first target shelving unit using the carrying surface and the three or more degrees of freedom and placing the item on a second target shelving unit, the horizontal platform configured to support and extend the carrying surface from a retracted state above the horizontal platform to an extended state, the horizontal platform sliding the carrying surface from the retracted state horizontally along a second axis to the extended state at the first target shelving unit, the horizontal platform sliding the carrying surface from the retracted state horizontally along a third axis to the extended state at the second target shelving unit; and
a power source coupled to provide power to the drive unit and the CHM.

2. The AGV of claim 1, further comprising:
an item storage rack positioned proximate the CHM, the item storage rack including a plurality of shelves, at least one shelf of the plurality of shelves capable of storing the item during transit of the AGV, the CHM being capable of moving the item between the first target shelving unit, one or more of the plurality of shelves of the item storage rack, and the second target shelving unit.

3. The AGV of claim 1, further comprising:
an item storage rack including a plurality of shelves that are vertically arranged on the item storage rack, a first shelf of the plurality of shelves having an adjustable height on the item storage rack, and
one or more controllers that
determine a current height of the first shelf of the plurality of shelves, and
instruct the CHM to place the item on the first shelf of the plurality of shelves at the current height.

4. The AGV of claim 1, wherein the CHM includes:
a mast; and
the horizontal platform extendably connecting the carrying surface to the mast, the mast moving the carrying surface vertically, via the horizontal platform.

5. The AGV of claim 1, wherein:
the item includes a modular container having a coupling portion, and
the carrying surface is compatibly engageable with the coupling portion of the modular container to lift the modular container from the first target shelving unit, retain the modular container during handling, and place the modular container on the second target shelving unit.

6. The AGV of claim 1, further comprising:
one or more controllers communicatively coupled to the CHM and the drive unit, the one or more controllers:
signaling the CHM to retrieve the item from the first target shelving unit,
signaling the drive unit to propel the AGV from a first location to a second location in the operating environment, the first target shelving unit being located at the first location and the second target shelving unit being located at the second location, and
signaling the CHM to place the item on the second target shelving unit.

7. The AGV of claim 6, wherein the one or more controllers:
determine a current location of the item within the operating environment, the current location indicating a current placement of the first target shelving unit within the operating environment, and
instruct the drive unit to position the CHM adjacent to the first target shelving unit using the current location.

8. The AGV of claim 1, wherein:
the AGV has a front, a rear opposing the front, a left side extending from the front to the rear, and a right side opposing the left side and extending from the front to the rear,
the second target shelving unit comprises an item storage rack mounted to the AGV, and
while the AGV is positioned such that the left side or right side faces a face of the first target shelving unit, one or more controllers instruct the CHM to:
engage, by the CHM, the carrying surface with the item on a first target shelf of the first target shelving unit,
lift the item off the first target shelf by the carrying surface and the CHM,
move the item, by the carrying surface and the CHM, from the first target shelf to a second target shelf of the item storage rack,
set the item on the second target shelf by the carrying surface and the CHM, and
disengage, by the CHM, the carrying surface from the item.

9. The AGV of claim 1, further comprising:
a guidance system that determines a location of the AGV within the operating environment, the guidance system including one or more sensors that detect and process navigation markers to locate the AGV as the AGV traverses the operating environment.

10. The AGV of claim 1, further comprising an optical scanner coupled to the CHM that scans a shelf marker on one or more of the first target shelving unit and the second target shelving unit, the shelf marker indicating a position of the one or more of the first target shelving unit and the second target shelving unit.

11. A method comprising:
navigating an automated guided vehicle (AGV) in an operating environment to a location proximate a storage shelving unit having a storage shelf supporting an item;
extending a carrying surface of a container handling mechanism (CHM) of the AGV along a second axis relative to a forward direction of travel of the AGV using a horizontal platform of the CHM, the CHM having three degrees of freedom corresponding to three axes of movement relative to a housing of the AGV, a first axis of the three axes extending along the forward direction of travel, the second axis of the three axes extending along a horizontal direction perpendicular to the first axis, and a third axis of the three axes extending along a vertical direction perpendicular to both the first axis and the second axis, the horizontal platform configured to support, rotate, and extend the carrying surface from a retracted position above the horizontal platform along a direction of extension to an extended position, the horizontal platform sliding the carrying surface from the retracted position horizontally along the second axis to the extended position at the storage shelf;
lifting the carrying surface to lift the item along at least the third axis from the storage shelf, the carrying surface supporting the item;
retracting the carrying surface along at least the second axis from the storage shelf;
raising the carrying surface along at least the third axis to situate the item proximate to an AGV shelf included on the AGV;
rotating, by the horizontal platform, the carrying surface about the third axis at the retracted position to align the direction of extension with the AGV shelf;
moving the carrying surface along at least the first axis until the item is positioned above the AGV shelf, the horizontal platform sliding the carrying surface from the retracted position horizontally along the first axis to the extended position at the AGV shelf; and
lowering the carrying surface along at least the third axis to place the item on the AGV shelf.

12. The method of claim 11, further comprising:
determining, by a guidance system, a location of the AGV within the operating environment, the guidance system including one or more sensors that detect and process navigation markers to locate the AGV as the AGV traverses the operating environment; and
navigating, using the guidance system, the AGV from the location to a different location in the operating environment using the guidance system.

13. The method of claim 12, further comprising:
determining a location of the storage shelf by scanning a shelf marker on the storage shelf by an optical scanner coupled to the CHM.

14. The method of claim 11, wherein the AGV includes a storage rack including a plurality of AGV shelves, the plurality of AGV shelves including the AGV shelf.

15. The method of claim 14, further comprising:
extending the carrying surface along the second axis toward a second storage shelf of a second storage unit, the second storage shelf supporting a second item;
lifting the carrying surface to lift the second item along at least the third axis from the second storage shelf, the carrying surface supporting the second item;
retracting the carrying surface along at least the second axis from the second storage shelf;
raising the carrying surface along at least the third axis to situate the second item proximate to a second AGV shelf of the plurality of AGV shelves of the storage rack;
moving the carrying surface along at least the first axis until the second item is positioned above the second AGV shelf; and
lowering the carrying surface along at least the third axis to place the second item on the second AGV shelf.

16. The method of claim 14, further comprising:
adjusting a height of the AGV shelf to accommodate a size of the item.

17. The method of claim 11, further comprising
navigating the AGV to a different location within the operating environment, the different location within the operating environment including a pick-cell station, the pick-cell station receiving items from a plurality of AGVs; and
issuing instructions to a picker at the pick-cell station to place the item in a given carton with one or more other items.

* * * * *